(12) United States Patent
Egoyants et al.

(10) Patent No.: US 12,041,968 B2
(45) Date of Patent: Jul. 23, 2024

(54) HEATING SMOKEABLE MATERIAL

(71) Applicant: Nicoventures Trading Limited, London (GB)

(72) Inventors: Petr Egoyants, St. Petersburg (RU); Dmitry Volobuev, St. Petersburg (RU); Pavel Fimin, St. Petersburg (RU); Oleg Abramov, St. Petersburg (RU); Leonid Chechurin, St. Petersburg (RU); Luba Mitnik-Gankin, St. Petersburg (RU)

(73) Assignee: NICOVENTURES TRADING LIMITED, London (GB)

( * ) Notice: Subject to any disclaimer, the term of this patent is extended or adjusted under 35 U.S.C. 154(b) by 0 days.

(21) Appl. No.: 17/447,532

(22) Filed: Sep. 13, 2021

(65) Prior Publication Data

US 2021/0401048 A1 Dec. 30, 2021

Related U.S. Application Data

(63) Continuation of application No. 16/948,553, filed on Sep. 23, 2020, which is a continuation of application (Continued)

(30) Foreign Application Priority Data

Sep. 6, 2011 (RU) ............................ RU2011136869
Apr. 23, 2012 (GB) ...................................... 1207054

(51) Int. Cl.
*A24F 47/00* (2020.01)
*A24F 40/46* (2020.01)
(Continued)

(52) U.S. Cl.
CPC ............ *A24F 40/46* (2020.01); *F16L 59/065* (2013.01); *H05B 1/0291* (2013.01); *H05B 3/44* (2013.01); *A24F 40/20* (2020.01); *A24F 40/57* (2020.01)

(58) Field of Classification Search
CPC .......... A24F 40/20; A24F 40/40; A24F 40/42; A24F 40/46
See application file for complete search history.

(56) References Cited

U.S. PATENT DOCUMENTS 219,628 A 9/1879 Edison
219,634 A 9/1879 Gifford
(Continued)

FOREIGN PATENT DOCUMENTS

AT 262137 B 5/1968
AT 306224 B 3/1973
(Continued)

OTHER PUBLICATIONS

Vietnam Opposition for Application No. PCT/EP2013/057539, mailed on Jun. 29, 2018, 29 pages.
(Continued)

*Primary Examiner* — Eric Yaary
(74) *Attorney, Agent, or Firm* — Husch Blackwell LLP

(57) ABSTRACT

An apparatus comprising a heater configured to heat smokeable material to volatilize at least one component of the smokeable material, wherein the heater is elongate and comprises a plurality of independently controllable heating regions arranged sequentially along a longitudinal axis of the heater.

20 Claims, 10 Drawing Sheets

Related U.S. Application Data

No. 14/127,144, filed as application No. PCT/EP2012/066524 on Aug. 24, 2012, now abandoned.

(51) Int. Cl.

| | | |
|---|---|---|
| *F16L 59/065* | (2006.01) | |
| *H05B 1/02* | (2006.01) | |
| *H05B 3/44* | (2006.01) | |
| *A24F 40/20* | (2020.01) | |
| *A24F 40/57* | (2020.01) | |

(56) References Cited

U.S. PATENT DOCUMENTS

| | | |
|---|---|---|
| 219,635 A | 9/1879 | Giles |
| 219,643 A | 9/1879 | Mattoni |
| 844,272 A | 2/1907 | Fate |
| 912,986 A | 2/1909 | Aschenbrenner |
| 1,071,817 A | 9/1913 | Stanley |
| 1,771,366 A | 7/1930 | Wyss et al. |
| 1,886,391 A | 11/1932 | Henri |
| 2,057,353 A | 10/1936 | C. L. , Jr. |
| 2,104,266 A | 1/1938 | McCormick |
| 2,462,563 A | 2/1949 | Seyforth |
| 2,473,325 A | 6/1949 | Aufiero |
| 2,689,150 A | 9/1954 | Croce |
| 2,809,634 A | 10/1957 | Hirotada |
| 2,888,208 A | 5/1959 | Rene |
| 3,040,991 A | 6/1962 | Rene |
| 3,043,524 A | 7/1962 | Sonia |
| 3,111,396 A | 11/1963 | Ball |
| 3,144,174 A | 8/1964 | Henry |
| 3,225,954 A | 12/1965 | Herrick et al. |
| 3,258,015 A | 6/1966 | Drummond et al. |
| 3,265,236 A | 8/1966 | Norman et al. |
| 3,289,949 A | 12/1966 | Willy |
| 3,347,231 A | 10/1967 | Chien-Hshuing |
| 3,402,724 A | 9/1968 | Blount et al. |
| 3,431,393 A | 3/1969 | Katsuda |
| 3,433,632 A | 3/1969 | Elbert et al. |
| 3,521,643 A | 7/1970 | Toth |
| 3,522,806 A | 8/1970 | Szekely |
| 3,604,428 A | 9/1971 | Moukaddem |
| 3,647,143 A | 3/1972 | Gauthier et al. |
| 3,658,059 A | 4/1972 | Steil |
| 3,733,010 A | 5/1973 | Riccio |
| 3,804,100 A | 4/1974 | Fariello |
| 3,805,806 A | 4/1974 | Grihalva |
| 3,856,185 A | 12/1974 | Riccio |
| 3,864,326 A | 2/1975 | Babington |
| 3,889,690 A | 6/1975 | Guarnieri |
| 3,913,843 A | 10/1975 | Cambio |
| 3,943,942 A | 3/1976 | Anderson et al. |
| 3,964,902 A | 6/1976 | Fletcher et al. |
| 4,009,713 A | 3/1977 | Simmons et al. |
| 4,017,701 A | 4/1977 | Mittelmann |
| 4,031,906 A | 6/1977 | Knapp |
| 4,094,119 A | 6/1978 | Sullivan |
| 4,145,001 A | 3/1979 | Weyenberg et al. |
| 4,149,548 A | 4/1979 | Bradshaw |
| 4,161,283 A | 7/1979 | Hyman |
| 4,171,000 A | 10/1979 | Uhle |
| 4,193,513 A | 3/1980 | Bull |
| 4,284,089 A | 8/1981 | Ray |
| 4,299,274 A | 11/1981 | Campbell |
| 4,299,355 A | 11/1981 | Haekkinen |
| 4,303,083 A | 12/1981 | Burruss |
| 4,303,541 A | 12/1981 | Wasel-Nielen et al. |
| 4,393,884 A | 7/1983 | Jacobs |
| 4,412,930 A | 11/1983 | Koike et al. |
| 4,427,123 A | 1/1984 | Komeda et al. |
| 4,429,835 A | 2/1984 | Brugger et al. |
| 4,474,191 A | 10/1984 | Steiner |
| 4,503,851 A | 3/1985 | Braunroth |
| 4,588,976 A | 5/1986 | Jaselli |
| 4,628,187 A | 12/1986 | Sekiguchi et al. |
| 4,638,820 A | 1/1987 | Roberts et al. |
| 4,675,508 A | 6/1987 | Miyaji et al. |
| 4,676,237 A | 6/1987 | Wood et al. |
| 4,677,992 A | 7/1987 | Bliznak |
| 4,694,841 A | 9/1987 | Esparza |
| 4,734,097 A | 3/1988 | Tanabe et al. |
| 4,735,217 A | 4/1988 | Gerth et al. |
| 4,746,067 A | 5/1988 | Svoboda |
| 4,756,318 A | 7/1988 | Clearman et al. |
| 4,765,347 A | 8/1988 | Sensabaugh et al. |
| 4,765,348 A | 8/1988 | Honeycutt |
| 4,771,795 A | 9/1988 | White et al. |
| 4,776,353 A | 10/1988 | Lilja et al. |
| 4,819,665 A | 4/1989 | Roberts et al. |
| 4,827,950 A | 5/1989 | Banerjee et al. |
| 4,830,028 A | 5/1989 | Lawson et al. |
| 4,848,374 A | 7/1989 | Chard et al. |
| 4,885,129 A | 12/1989 | Leonard et al. |
| 4,892,109 A | 1/1990 | Strubel |
| 4,907,606 A | 3/1990 | Lilja et al. |
| 4,913,168 A | 4/1990 | Potter et al. |
| 4,917,119 A | 4/1990 | Potter et al. |
| 4,917,120 A | 4/1990 | Hill |
| 4,917,301 A | 4/1990 | Munteanu |
| 4,922,901 A | 5/1990 | Brooks et al. |
| 4,924,883 A | 5/1990 | Perfetti et al. |
| 4,938,236 A | 7/1990 | Banerjee et al. |
| 4,941,483 A | 7/1990 | Ridings et al. |
| 4,945,929 A | 8/1990 | Egilmex |
| 4,945,931 A | 8/1990 | Gori |
| 4,947,874 A | 8/1990 | Brooks et al. |
| 4,947,875 A | 8/1990 | Brooks et al. |
| 4,955,399 A | 9/1990 | Potter et al. |
| 4,978,814 A | 12/1990 | Honour |
| 4,979,521 A | 12/1990 | Davis et al. |
| 4,987,291 A | 1/1991 | McGaffigan et al. |
| 4,991,606 A | 2/1991 | Serrano et al. |
| 5,019,122 A | 5/1991 | Clearman et al. |
| 5,020,509 A | 6/1991 | Suzuki et al. |
| 5,027,837 A | 7/1991 | Clearman et al. |
| 5,040,551 A | 8/1991 | Schlatter et al. |
| 5,040,552 A | 8/1991 | Schleich et al. |
| 5,042,509 A | 8/1991 | Banerjee et al. |
| 5,046,514 A | 9/1991 | Bolt |
| 5,060,667 A | 10/1991 | Strubel |
| 5,060,671 A | 10/1991 | Counts et al. |
| 5,076,292 A | 12/1991 | Sensabaugh et al. |
| 5,080,115 A | 1/1992 | Templeton |
| 5,093,894 A | 3/1992 | Deevi et al. |
| 5,095,647 A | 3/1992 | Zobele et al. |
| 5,095,921 A | 3/1992 | Losee et al. |
| 5,096,921 A | 3/1992 | Bollinger et al. |
| 5,097,850 A | 3/1992 | Braunshteyn et al. |
| 5,099,861 A | 3/1992 | Clearman et al. |
| 5,105,831 A | 4/1992 | Banerjee et al. |
| 5,119,834 A | 6/1992 | Shannon et al. |
| 5,121,881 A | 6/1992 | Lembeck |
| 5,129,409 A | 7/1992 | White et al. |
| 5,133,368 A | 7/1992 | Neumann et al. |
| 5,143,048 A | 9/1992 | Cheney |
| 5,144,962 A | 9/1992 | Counts et al. |
| 5,146,934 A | 9/1992 | Deevi et al. |
| 5,159,940 A | 11/1992 | Hayward et al. |
| 5,167,242 A | 12/1992 | Turner et al. |
| 5,179,966 A | 1/1993 | Losee et al. |
| 5,188,130 A | 2/1993 | Hajaligol et al. |
| 5,190,060 A | 3/1993 | Gerding et al. |
| 5,203,355 A | 4/1993 | Clearman et al. |
| 5,224,498 A | 7/1993 | Deevi et al. |
| 5,230,715 A | 7/1993 | Iizuna et al. |
| 5,235,992 A | 8/1993 | Sensabaugh |
| 5,247,947 A | 9/1993 | Clearman et al. |
| 5,249,586 A | 10/1993 | Morgan et al. |
| 5,251,688 A | 10/1993 | Schatz |
| 5,261,424 A | 11/1993 | Sprinkel |
| 5,269,327 A | 12/1993 | Counts et al. |
| 5,271,980 A | 12/1993 | Bell |
| 5,272,216 A | 12/1993 | Clark et al. |
| 5,285,798 A | 2/1994 | Banerjee et al. |

(56) References Cited

U.S. PATENT DOCUMENTS

| | | | |
|---|---|---|---|
| 5,293,883 A | 3/1994 | Edwards | |
| 5,303,720 A | 4/1994 | Banerjee et al. | |
| 5,305,733 A | 4/1994 | Walters | |
| 5,312,046 A | 5/1994 | Knoch et al. | |
| 5,322,075 A | 6/1994 | Deevi et al. | |
| 5,327,915 A | 7/1994 | Porenski et al. | |
| 5,331,979 A | 7/1994 | Henley | |
| 5,345,951 A | 9/1994 | Serrano et al. | |
| 5,353,813 A | 10/1994 | Deevi et al. | |
| 5,357,984 A | 10/1994 | Farrier et al. | |
| 5,369,723 A | 11/1994 | Counts et al. | |
| 5,372,148 A | 12/1994 | McCafferty et al. | |
| 5,388,574 A | 2/1995 | Ingebrethsen | |
| 5,388,594 A | 2/1995 | Counts et al. | |
| 5,390,864 A | 2/1995 | Alexander | |
| 5,396,911 A | 3/1995 | Casey et al. | |
| 5,400,808 A | 3/1995 | Turner et al. | |
| 5,402,803 A | 4/1995 | Takagi | |
| 5,408,574 A * | 4/1995 | Deevi | A24F 40/46 392/404 |
| 5,412,183 A | 5/1995 | Buffenoir et al. | |
| 5,415,186 A | 5/1995 | Casey et al. | |
| 5,434,388 A | 7/1995 | Kralik et al. | |
| 5,443,560 A | 8/1995 | Deevi et al. | |
| 5,454,363 A | 10/1995 | Sata | |
| 5,461,695 A | 10/1995 | Knoch | |
| 5,468,936 A | 11/1995 | Deevi et al. | |
| 5,474,059 A | 12/1995 | Cooper | |
| 5,479,948 A | 1/1996 | Counts et al. | |
| 5,483,953 A | 1/1996 | Cooper | |
| 5,497,792 A | 3/1996 | Prasad et al. | |
| 5,499,636 A | 3/1996 | Baggett et al. | |
| 5,500,511 A | 3/1996 | Hansen et al. | |
| 5,501,236 A | 3/1996 | Hill et al. | |
| 5,502,743 A | 3/1996 | Conochie et al. | |
| 5,505,214 A | 4/1996 | Collins et al. | |
| 5,511,538 A | 4/1996 | Haber et al. | |
| 5,517,981 A | 5/1996 | Taub et al. | |
| 5,530,225 A | 6/1996 | Hajaligol | |
| 5,534,020 A | 7/1996 | Cheney et al. | |
| 5,538,020 A | 7/1996 | Farrier et al. | |
| 5,540,241 A | 7/1996 | Kim | |
| 5,549,906 A | 8/1996 | Santus | |
| 5,553,791 A | 9/1996 | Alexander | |
| 5,564,442 A | 10/1996 | MacDonald et al. | |
| 5,573,140 A | 11/1996 | Satomi et al. | |
| 5,573,692 A | 11/1996 | Das et al. | |
| 5,591,368 A | 1/1997 | Fleischhauer et al. | |
| 5,593,792 A | 1/1997 | Farrier et al. | |
| 5,613,504 A | 3/1997 | Collins et al. | |
| 5,613,505 A | 3/1997 | Campbell et al. | |
| 5,636,787 A | 6/1997 | Gowhari | |
| 5,645,749 A | 7/1997 | Wang | |
| 5,649,554 A | 7/1997 | Sprinkel et al. | |
| 5,659,656 A | 8/1997 | Das | |
| 5,665,262 A | 9/1997 | Hajaligol et al. | |
| 5,666,977 A | 9/1997 | Higgins et al. | |
| 5,687,912 A | 11/1997 | Denyer | |
| 5,692,291 A | 12/1997 | Deevi et al. | |
| 5,699,786 A | 12/1997 | Oshima et al. | |
| 5,711,292 A | 1/1998 | Hammarlund | |
| 5,726,421 A | 3/1998 | Fleischhauer et al. | |
| 5,736,110 A | 4/1998 | Angelillo et al. | |
| 5,742,251 A | 4/1998 | Gerber | |
| 5,743,251 A | 4/1998 | Howell et al. | |
| 5,771,845 A | 6/1998 | Pistien et al. | |
| 5,778,899 A | 7/1998 | Saito et al. | |
| 5,798,154 A | 8/1998 | Bryan | |
| 5,808,281 A | 9/1998 | Matsen et al. | |
| 5,837,088 A | 11/1998 | Palmgren et al. | |
| 5,845,649 A | 12/1998 | Saito et al. | |
| 5,865,185 A | 2/1999 | Collins et al. | |
| 5,865,186 A | 2/1999 | Volsey | |
| 5,878,752 A | 3/1999 | Adams et al. | |
| 5,902,501 A | 5/1999 | Nunnally et al. | |
| 5,921,233 A | 7/1999 | Gold et al. | |
| 5,935,486 A | 8/1999 | Bell et al. | |
| 5,938,125 A | 8/1999 | Ritsche et al. | |
| 5,958,273 A | 9/1999 | Koch et al. | |
| 5,984,953 A | 11/1999 | Sabin et al. | |
| 6,000,394 A | 12/1999 | Blaha-Schnabel et al. | |
| 6,026,820 A | 2/2000 | Baggett et al. | |
| 6,037,568 A | 3/2000 | Hatanaka et al. | |
| 6,040,560 A | 3/2000 | Fleischhauer et al. | |
| 6,041,790 A | 3/2000 | Smith et al. | |
| 6,053,176 A | 4/2000 | Adams et al. | |
| 6,058,711 A | 5/2000 | Maciaszek et al. | |
| 6,079,405 A | 6/2000 | Justo | |
| 6,085,741 A | 7/2000 | Becker | |
| 6,089,857 A | 7/2000 | Matsuura et al. | |
| 6,095,505 A | 8/2000 | Miller | |
| 6,113,078 A | 9/2000 | Rock | |
| 6,116,231 A | 9/2000 | Sabin et al. | |
| 6,125,853 A | 10/2000 | Susa et al. | |
| 6,129,080 A | 10/2000 | Pitcher et al. | |
| 6,155,268 A | 12/2000 | Takeuchi | |
| 6,158,676 A | 12/2000 | Hughes | |
| 6,164,287 A | 12/2000 | White | |
| 6,178,963 B1 | 1/2001 | Baik | |
| 6,209,457 B1 | 4/2001 | Kenworthy et al. | |
| 6,223,745 B1 | 5/2001 | Hammarlund et al. | |
| 6,224,179 B1 | 5/2001 | Wenning et al. | |
| 6,230,703 B1 | 5/2001 | Bono | |
| 6,234,459 B1 | 5/2001 | Rock | |
| 6,244,573 B1 | 6/2001 | Rock | |
| 6,248,257 B1 | 6/2001 | Bell et al. | |
| 6,267,110 B1 | 7/2001 | Tenenboum et al. | |
| 6,275,650 B1 | 8/2001 | Lambert | |
| 6,283,116 B1 | 9/2001 | Yang | |
| 6,289,889 B1 | 9/2001 | Bell et al. | |
| 6,297,483 B2 | 10/2001 | Sadahira et al. | |
| 6,315,366 B1 | 11/2001 | Post et al. | |
| 6,347,789 B1 | 2/2002 | Rock | |
| 6,376,816 B2 | 4/2002 | Cooper et al. | |
| 6,427,878 B1 | 8/2002 | Greiner-Perth et al. | |
| 6,595,209 B1 | 7/2003 | Rose et al. | |
| 6,598,607 B2 | 7/2003 | Adiga et al. | |
| 6,644,383 B2 | 11/2003 | Joseph et al. | |
| 6,648,306 B2 | 11/2003 | Rock | |
| 6,652,804 B1 | 11/2003 | Neumann et al. | |
| 6,669,176 B2 | 12/2003 | Rock | |
| 6,681,998 B2 | 1/2004 | Sharpe et al. | |
| 6,701,921 B2 | 3/2004 | Sprinkel et al. | |
| 6,708,846 B1 | 3/2004 | Fuchs et al. | |
| 6,723,115 B1 | 4/2004 | Daly | |
| 6,761,164 B2 | 7/2004 | Amirpour et al. | |
| 6,769,436 B2 | 8/2004 | Horian | |
| 6,790,496 B1 | 9/2004 | Levander et al. | |
| 6,799,572 B2 | 10/2004 | Nichols et al. | |
| 6,803,545 B2 | 10/2004 | Blake et al. | |
| 6,803,550 B2 | 10/2004 | Sharpe et al. | |
| 6,827,080 B2 | 12/2004 | Fish et al. | |
| 6,868,230 B2 | 3/2005 | Gerhardinger | |
| 6,886,556 B2 | 5/2005 | Fuchs | |
| 6,953,474 B2 | 10/2005 | Lu | |
| 6,968,888 B2 | 11/2005 | Kolowich | |
| 6,994,096 B2 | 2/2006 | Rostami et al. | |
| 7,012,227 B2 | 3/2006 | Tathgur et al. | |
| 7,041,123 B2 | 5/2006 | Stapf et al. | |
| 7,077,130 B2 | 7/2006 | Nichols et al. | |
| 7,081,211 B2 | 7/2006 | Li et al. | |
| 7,088,914 B2 | 8/2006 | Whittle et al. | |
| 7,100,618 B2 | 9/2006 | Dominguez | |
| 7,112,712 B1 | 9/2006 | Ancell | |
| 7,163,014 B2 | 1/2007 | Nichols et al. | |
| 7,185,659 B2 | 3/2007 | Sharpe | |
| 7,234,459 B2 | 6/2007 | Del | |
| 7,235,187 B2 | 6/2007 | Li et al. | |
| 7,263,282 B2 | 8/2007 | Meyer | |
| 7,290,549 B2 | 11/2007 | Banerjee et al. | |
| 7,303,328 B2 | 12/2007 | Faraldi et al. | |
| 7,335,186 B2 | 2/2008 | Oneil | |
| 7,373,938 B2 | 5/2008 | Nichols et al. | |
| 7,374,063 B2 | 5/2008 | Reid | |

(56) References Cited

U.S. PATENT DOCUMENTS

| | | |
|---|---|---|
| 7,400,940 B2 | 7/2008 | McRae et al. |
| 7,434,584 B2 | 10/2008 | Steinberg |
| 7,458,374 B2 | 12/2008 | Hale et al. |
| 7,540,286 B2 | 6/2009 | Cross et al. |
| 7,581,540 B2 | 9/2009 | Hale et al. |
| 7,581,718 B1 | 9/2009 | Chang |
| 7,585,493 B2 | 9/2009 | Hale et al. |
| 7,624,739 B2 | 12/2009 | Snaidr et al. |
| 7,645,442 B2 | 1/2010 | Hale et al. |
| 7,665,461 B2 | 2/2010 | Zierenberg et al. |
| 7,726,320 B2 | 6/2010 | Robinson et al. |
| 7,767,698 B2 | 8/2010 | Warchol et al. |
| 7,832,397 B2 | 11/2010 | Lipowicz |
| 7,832,410 B2 | 11/2010 | Hon |
| 7,834,295 B2 | 11/2010 | Sharma et al. |
| 7,913,688 B2 | 3/2011 | Cross et al. |
| 7,987,846 B2 | 8/2011 | Hale et al. |
| 7,992,554 B2 | 8/2011 | Radomski et al. |
| 8,061,361 B2 | 11/2011 | Maeder et al. |
| 8,079,371 B2 | 12/2011 | Robinson et al. |
| 8,081,474 B1 | 12/2011 | Zohni et al. |
| 8,118,021 B2 | 2/2012 | Cho et al. |
| 8,156,944 B2 | 4/2012 | Han |
| 8,342,184 B2 | 1/2013 | Inagaki et al. |
| 8,365,742 B2 | 2/2013 | Hon |
| 8,375,957 B2 | 2/2013 | Hon |
| 8,393,331 B2 | 3/2013 | Hon |
| 8,402,976 B2 | 3/2013 | Fernando et al. |
| 8,430,106 B2 | 4/2013 | Potter et al. |
| 8,439,046 B2 | 5/2013 | Peters et al. |
| 8,459,271 B2 | 6/2013 | Inagaki |
| 8,490,628 B2 | 7/2013 | Hon |
| 8,511,318 B2 | 8/2013 | Hon |
| 8,678,013 B2 | 3/2014 | Crooks et al. |
| 8,689,804 B2 | 4/2014 | Fernando et al. |
| 8,689,805 B2 | 4/2014 | Hon |
| 8,701,682 B2 | 4/2014 | Sherwood et al. |
| 8,707,967 B2 | 4/2014 | Li et al. |
| 8,752,545 B2 | 6/2014 | Buchberger |
| 8,757,404 B1 | 6/2014 | Fleckenstein |
| 8,807,140 B1 | 8/2014 | Scatterday |
| 8,833,364 B2 | 9/2014 | Buchberger |
| 8,899,238 B2 | 12/2014 | Robinson et al. |
| 8,948,578 B2 | 2/2015 | Buchberger |
| 9,060,388 B2 | 6/2015 | Liu |
| 9,084,440 B2 | 7/2015 | Zuber et al. |
| 9,125,437 B2 | 9/2015 | Kaljura |
| 9,302,522 B2 | 4/2016 | Sherwood et al. |
| 9,357,803 B2 | 6/2016 | Egoyants et al. |
| 9,414,619 B2 | 8/2016 | Sizer et al. |
| 9,414,629 B2 | 8/2016 | Egoyants et al. |
| 9,439,454 B2 | 9/2016 | Fernando et al. |
| 9,554,598 B2 | 1/2017 | Egoyants et al. |
| 9,609,894 B2 | 4/2017 | Abramov et al. |
| 9,623,205 B2 | 4/2017 | Buchberger |
| 9,668,516 B2 | 6/2017 | Sherwood et al. |
| 9,693,587 B2 | 7/2017 | Plojoux et al. |
| 9,955,726 B2 | 5/2018 | Brinkley et al. |
| 9,980,523 B2 | 5/2018 | Abramov et al. |
| 9,999,256 B2 | 6/2018 | Abramov et al. |
| 10,010,695 B2 | 7/2018 | Buchberger |
| 10,045,562 B2 | 8/2018 | Buchberger |
| 10,130,121 B2 | 11/2018 | Plojoux et al. |
| 10,130,780 B2 | 11/2018 | Talon |
| 10,524,516 B2 | 1/2020 | Alelov |
| 10,588,337 B2 | 3/2020 | Prestia et al. |
| 10,881,138 B2 | 1/2021 | Saleem et al. |
| 10,881,141 B2 | 1/2021 | Fraser et al. |
| 2001/0042546 A1 | 11/2001 | Umeda et al. |
| 2001/0042927 A1 | 11/2001 | Rock |
| 2001/0045424 A1 | 11/2001 | Cooper |
| 2001/0054421 A1 | 12/2001 | Jaser et al. |
| 2002/0005207 A1 | 1/2002 | Wrenn et al. |
| 2002/0016370 A1 | 2/2002 | Shytle et al. |
| 2002/0043260 A1 | 4/2002 | Layer et al. |
| 2002/0078951 A1 | 6/2002 | Nichols et al. |
| 2002/0078955 A1 | 6/2002 | Nichols et al. |
| 2002/0078956 A1 | 6/2002 | Sharpe et al. |
| 2002/0079309 A1 | 6/2002 | Cox et al. |
| 2002/0079377 A1 | 6/2002 | Nichols |
| 2002/0089072 A1 | 7/2002 | Rock |
| 2002/0121624 A1 | 9/2002 | Usui |
| 2002/0170666 A1 | 11/2002 | Tathgur et al. |
| 2003/0005620 A1 | 1/2003 | Ananth et al. |
| 2003/0007887 A1 | 1/2003 | Roumpos et al. |
| 2003/0049025 A1 | 3/2003 | Neumann et al. |
| 2003/0052196 A1 | 3/2003 | Fuchs |
| 2003/0079309 A1 | 5/2003 | Vandenbelt et al. |
| 2003/0097164 A1 | 5/2003 | Stapf et al. |
| 2003/0101984 A1 | 6/2003 | Li et al. |
| 2003/0105192 A1 | 6/2003 | Li et al. |
| 2003/0106551 A1 | 6/2003 | Sprinkel et al. |
| 2003/0106552 A1 | 6/2003 | Sprinkel et al. |
| 2003/0108342 A1 | 6/2003 | Sherwood et al. |
| 2003/0111637 A1 | 6/2003 | Li et al. |
| 2003/0146224 A1 | 8/2003 | Fujii et al. |
| 2003/0159702 A1 | 8/2003 | Lindell et al. |
| 2003/0200964 A1 | 10/2003 | Blakley et al. |
| 2003/0202169 A1 | 10/2003 | Liu |
| 2003/0209240 A1 | 11/2003 | Hale et al. |
| 2003/0217750 A1 | 11/2003 | Amirpour et al. |
| 2003/0226837 A1 | 12/2003 | Blake et al. |
| 2003/0230567 A1 | 12/2003 | Centanni et al. |
| 2004/0003820 A1 | 1/2004 | Iannuzzi |
| 2004/0031485 A1 | 2/2004 | Rustad et al. |
| 2004/0031495 A1 | 2/2004 | Steinberg |
| 2004/0065314 A1 | 4/2004 | Layer et al. |
| 2004/0068222 A1 | 4/2004 | Brian |
| 2004/0083755 A1 | 5/2004 | Kolowich |
| 2004/0096204 A1 | 5/2004 | Gerhardinger |
| 2004/0129793 A1 | 7/2004 | Nguyen et al. |
| 2004/0149296 A1 | 8/2004 | Rostami et al. |
| 2004/0149297 A1 | 8/2004 | Sharpe |
| 2004/0149737 A1 | 8/2004 | Sharpe et al. |
| 2004/0177849 A1 | 9/2004 | Del |
| 2004/0210151 A1 | 10/2004 | Tsukashima et al. |
| 2004/0226568 A1 | 11/2004 | Takeuchi et al. |
| 2004/0234699 A1 | 11/2004 | Hale et al. |
| 2004/0234914 A1 | 11/2004 | Hale et al. |
| 2004/0234916 A1 | 11/2004 | Hale et al. |
| 2004/0255941 A1 | 12/2004 | Nichols et al. |
| 2004/0261782 A1 | 12/2004 | Furumichi et al. |
| 2005/0007870 A1 | 1/2005 | Faraldi et al. |
| 2005/0016549 A1 | 1/2005 | Banerjee et al. |
| 2005/0025213 A1 | 2/2005 | Parks |
| 2005/0031798 A1 | 2/2005 | Tathgur et al. |
| 2005/0045193 A1 | 3/2005 | Yang |
| 2005/0063686 A1 | 3/2005 | Whittle et al. |
| 2005/0066735 A1 | 3/2005 | Beavis et al. |
| 2005/0079166 A1 | 4/2005 | Damani et al. |
| 2005/0098187 A1 | 5/2005 | Grierson et al. |
| 2005/0133029 A1 | 6/2005 | Nichols et al. |
| 2005/0145260 A1 | 7/2005 | Inagaki et al. |
| 2005/0194013 A1 | 9/2005 | Wright |
| 2005/0196345 A1 | 9/2005 | Diederichs et al. |
| 2005/0204799 A1 | 9/2005 | Koch |
| 2005/0211711 A1 | 9/2005 | Reid |
| 2005/0236006 A1 | 10/2005 | Cowan |
| 2005/0268911 A1 | 12/2005 | Cross et al. |
| 2006/0027233 A1 | 2/2006 | Zierenberg et al. |
| 2006/0032501 A1 | 2/2006 | Hale et al. |
| 2006/0043067 A1 | 3/2006 | Kadkhodayan et al. |
| 2006/0078477 A1 | 4/2006 | Althouse et al. |
| 2006/0102175 A1 | 5/2006 | Nelson |
| 2006/0118128 A1 | 6/2006 | Hoffmann et al. |
| 2006/0137681 A1 | 6/2006 | Von et al. |
| 2006/0191546 A1 | 8/2006 | Takano et al. |
| 2006/0196518 A1 | 9/2006 | Hon |
| 2006/0196885 A1 | 9/2006 | Leach et al. |
| 2006/0255029 A1 | 11/2006 | Bone |
| 2007/0014549 A1 | 1/2007 | Demarest et al. |
| 2007/0023043 A1 | 2/2007 | Von et al. |
| 2007/0028916 A1 | 2/2007 | Hale et al. |
| 2007/0031340 A1 | 2/2007 | Hale et al. |

(56) References Cited

U.S. PATENT DOCUMENTS

| | | |
|---|---|---|
| 2007/0045288 A1 | 3/2007 | Nelson |
| 2007/0062548 A1 | 3/2007 | Horstmann et al. |
| 2007/0074734 A1 | 4/2007 | Braunshteyn et al. |
| 2007/0102013 A1* | 5/2007 | Adams ............... A24F 40/485 131/273 |
| 2007/0102533 A1 | 5/2007 | Rosell et al. |
| 2007/0107879 A1 | 5/2007 | Radomski et al. |
| 2007/0125362 A1 | 6/2007 | Ford et al. |
| 2007/0131219 A1 | 6/2007 | Ford et al. |
| 2007/0138207 A1 | 6/2007 | Bonney et al. |
| 2007/0155255 A1 | 7/2007 | Galauner et al. |
| 2007/0175476 A1 | 8/2007 | Lipowicz |
| 2007/0204858 A1 | 9/2007 | Abelbeck |
| 2007/0204864 A1 | 9/2007 | Grychowski et al. |
| 2007/0204868 A1 | 9/2007 | Bollinger et al. |
| 2007/0222112 A1 | 9/2007 | Christ et al. |
| 2007/0235046 A1 | 10/2007 | Gedevanishvili |
| 2007/0267407 A1 | 11/2007 | Loveless et al. |
| 2007/0279377 A1 | 12/2007 | Hillis et al. |
| 2007/0283972 A1 | 12/2007 | Monsees et al. |
| 2007/0289720 A1 | 12/2007 | Sunol et al. |
| 2008/0027694 A1 | 1/2008 | Gitman |
| 2008/0031267 A1 | 2/2008 | Imao |
| 2008/0038363 A1 | 2/2008 | Zaffaroni et al. |
| 2008/0085139 A1 | 4/2008 | Roof |
| 2008/0092912 A1* | 4/2008 | Robinson ............... A24F 40/40 131/200 |
| 2008/0149118 A1 | 6/2008 | Oglesby et al. |
| 2008/0149622 A1 | 6/2008 | Weiss et al. |
| 2008/0156326 A1 | 7/2008 | Belcastro et al. |
| 2008/0216828 A1 | 9/2008 | Wensley et al. |
| 2008/0233318 A1 | 9/2008 | Coyle |
| 2008/0241255 A1 | 10/2008 | Rose et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2008/0312674 A1 | 12/2008 | Chen et al. |
| 2009/0015717 A1 | 1/2009 | Arnao et al. |
| 2009/0032034 A1 | 2/2009 | Steinberg |
| 2009/0056728 A1 | 3/2009 | Baker |
| 2009/0065011 A1 | 3/2009 | Maeder et al. |
| 2009/0071477 A1 | 3/2009 | Hale et al. |
| 2009/0078711 A1 | 3/2009 | Farone et al. |
| 2009/0090349 A1 | 4/2009 | Donovan |
| 2009/0090351 A1 | 4/2009 | Sunol et al. |
| 2009/0090472 A1 | 4/2009 | Radomski |
| 2009/0095287 A1 | 4/2009 | Emarlou |
| 2009/0095311 A1 | 4/2009 | Han |
| 2009/0107492 A1 | 4/2009 | Ooida |
| 2009/0114215 A1 | 5/2009 | Spallek et al. |
| 2009/0126745 A1 | 5/2009 | Hon |
| 2009/0127253 A1 | 5/2009 | Stark et al. |
| 2009/0151717 A1 | 6/2009 | Bowen et al. |
| 2009/0162294 A1 | 6/2009 | Werner |
| 2009/0180968 A1 | 7/2009 | Hale et al. |
| 2009/0188490 A1 | 7/2009 | Han |
| 2009/0199843 A1 | 8/2009 | Farone et al. |
| 2009/0217923 A1 | 9/2009 | Boehm et al. |
| 2009/0230117 A1 | 9/2009 | Fernando et al. |
| 2009/0241947 A1 | 10/2009 | Bedini et al. |
| 2009/0255923 A1 | 10/2009 | Buehrer et al. |
| 2009/0260641 A1 | 10/2009 | Monsees et al. |
| 2009/0260642 A1 | 10/2009 | Monsees et al. |
| 2009/0272379 A1 | 11/2009 | Thorens et al. |
| 2009/0280043 A1 | 11/2009 | Ferguson |
| 2009/0293892 A1 | 12/2009 | Williams et al. |
| 2009/0301363 A1 | 12/2009 | Damani et al. |
| 2009/0301471 A1 | 12/2009 | Stirzel |
| 2009/0302019 A1 | 12/2009 | Selenski et al. |
| 2009/0304372 A1 | 12/2009 | Gubler et al. |
| 2010/0006092 A1 | 1/2010 | Hale et al. |
| 2010/0025023 A1 | 2/2010 | Schmidt et al. |
| 2010/0031968 A1 | 2/2010 | Sheikh et al. |
| 2010/0043809 A1 | 2/2010 | Magnon |
| 2010/0059070 A1 | 3/2010 | Potter et al. |
| 2010/0065052 A1 | 3/2010 | Sharma et al. |
| 2010/0065653 A1 | 3/2010 | Wingo et al. |
| 2010/0068154 A1 | 3/2010 | Sharma et al. |
| 2010/0083959 A1 | 4/2010 | Siller |
| 2010/0089381 A1 | 4/2010 | Bolmer et al. |
| 2010/0108059 A1 | 5/2010 | Axelsson et al. |
| 2010/0126516 A1 | 5/2010 | Yomtov et al. |
| 2010/0147299 A1 | 6/2010 | Row et al. |
| 2010/0181387 A1 | 7/2010 | Zaffaroni et al. |
| 2010/0200006 A1 | 8/2010 | Robinson et al. |
| 2010/0236546 A1 | 9/2010 | Yamada et al. |
| 2010/0242974 A1 | 9/2010 | Pan |
| 2010/0242975 A1 | 9/2010 | Hearn |
| 2010/0258585 A1 | 10/2010 | Jamison |
| 2010/0268212 A1 | 10/2010 | Manwaring et al. |
| 2010/0300467 A1 | 12/2010 | Kuistila et al. |
| 2010/0307518 A1 | 12/2010 | Wang |
| 2010/0313901 A1 | 12/2010 | Stahle et al. |
| 2011/0005535 A1 | 1/2011 | Xiu |
| 2011/0011396 A1 | 1/2011 | Fang |
| 2011/0030671 A1 | 2/2011 | Ferguson et al. |
| 2011/0036363 A1 | 2/2011 | Urtsev et al. |
| 2011/0090266 A1 | 4/2011 | King et al. |
| 2011/0094523 A1 | 4/2011 | Thorens et al. |
| 2011/0120989 A1 | 5/2011 | Schilling et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0192408 A1 | 8/2011 | Inagaki et al. |
| 2011/0192914 A1 | 8/2011 | Ishigami |
| 2011/0226236 A1 | 9/2011 | Buchberger |
| 2011/0240022 A1 | 10/2011 | Hodges et al. |
| 2011/0264084 A1 | 10/2011 | Reid |
| 2011/0277757 A1 | 11/2011 | Terry et al. |
| 2011/0283458 A1 | 11/2011 | Gillette et al. |
| 2011/0290266 A1 | 12/2011 | Koeller |
| 2011/0290267 A1 | 12/2011 | Yamada et al. |
| 2011/0297166 A1 | 12/2011 | Takeuchi et al. |
| 2011/0303230 A1 | 12/2011 | Thiry |
| 2011/0303231 A1 | 12/2011 | Li et al. |
| 2012/0006342 A1 | 1/2012 | Rose et al. |
| 2012/0006343 A1 | 1/2012 | Renaud et al. |
| 2012/0132196 A1 | 5/2012 | Vladyslavovych |
| 2012/0145169 A1 | 6/2012 | Wu |
| 2012/0145189 A1 | 6/2012 | Knopow et al. |
| 2012/0234315 A1 | 9/2012 | Li et al. |
| 2012/0234821 A1 | 9/2012 | Shimizu |
| 2012/0255546 A1 | 10/2012 | Goetz et al. |
| 2012/0260927 A1 | 10/2012 | Liu |
| 2012/0285476 A1 | 11/2012 | Hon |
| 2013/0042865 A1 | 2/2013 | Monsees et al. |
| 2013/0061861 A1 | 3/2013 | Hearn |
| 2013/0074857 A1 | 3/2013 | Buchberger |
| 2013/0081623 A1 | 4/2013 | Buchberger |
| 2013/0087160 A1 | 4/2013 | Gherghe |
| 2013/0133675 A1 | 5/2013 | Shinozaki et al. |
| 2013/0142782 A1 | 6/2013 | Rahmel et al. |
| 2013/0152922 A1 | 6/2013 | Benassayag et al. |
| 2013/0192615 A1 | 8/2013 | Tucker et al. |
| 2013/0213419 A1 | 8/2013 | Tucker et al. |
| 2013/0284192 A1 | 10/2013 | Peleg et al. |
| 2013/0306084 A1 | 11/2013 | Flick |
| 2013/0333700 A1 | 12/2013 | Buchberger |
| 2013/0340779 A1 | 12/2013 | Liu |
| 2014/0000638 A1 | 1/2014 | Sebastian et al. |
| 2014/0060528 A1 | 3/2014 | Liu |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0182608 A1 | 7/2014 | Egoyants et al. |
| 2014/0182843 A1 | 7/2014 | Vinegar |
| 2014/0196716 A1 | 7/2014 | Liu |
| 2014/0202454 A1 | 7/2014 | Buchberger |
| 2014/0202476 A1 | 7/2014 | Egoyants et al. |
| 2014/0209105 A1 | 7/2014 | Sears et al. |
| 2014/0216482 A1 | 8/2014 | Dotan et al. |
| 2014/0216485 A1 | 8/2014 | Egoyants et al. |
| 2014/0238396 A1 | 8/2014 | Buchberger |
| 2014/0238423 A1 | 8/2014 | Tucker et al. |

(56) References Cited

U.S. PATENT DOCUMENTS

| | | |
|---|---|---|
| 2014/0238424 A1 | 8/2014 | Macko et al. |
| 2014/0238737 A1 | 8/2014 | Backman |
| 2014/0261490 A1 | 9/2014 | Kane |
| 2014/0270726 A1 | 9/2014 | Egoyants et al. |
| 2014/0270730 A1 | 9/2014 | Depiano et al. |
| 2014/0283825 A1 | 9/2014 | Buchberger |
| 2014/0286630 A1 | 9/2014 | Buchberger |
| 2014/0299125 A1 | 10/2014 | Buchberger |
| 2014/0305449 A1 | 10/2014 | Plojoux et al. |
| 2014/0326257 A1 | 11/2014 | Jalloul et al. |
| 2014/0334802 A1 | 11/2014 | Dubief |
| 2014/0338680 A1 | 11/2014 | Abramov et al. |
| 2014/0360515 A1 | 12/2014 | Vasiliev et al. |
| 2015/0020825 A1 | 1/2015 | Galloway et al. |
| 2015/0040925 A1 | 2/2015 | Saleem et al. |
| 2015/0114411 A1 | 4/2015 | Buchberger |
| 2015/0142088 A1 | 5/2015 | Riva Godoy |
| 2015/0157055 A1 | 6/2015 | Lord |
| 2015/0157756 A1 | 6/2015 | Duffield et al. |
| 2015/0196058 A1 | 7/2015 | Lord |
| 2015/0208728 A1 | 7/2015 | Lord |
| 2015/0223520 A1 | 8/2015 | Phillips et al. |
| 2015/0245669 A1 | 9/2015 | Cadieux et al. |
| 2015/0272219 A1 | 10/2015 | Hatrick et al. |
| 2015/0282256 A1 | 10/2015 | Iguro et al. |
| 2015/0302971 A1 | 10/2015 | Wagman et al. |
| 2015/0320116 A1 | 11/2015 | Bleloch et al. |
| 2016/0003403 A1 | 1/2016 | Smith |
| 2016/0036222 A1 | 2/2016 | Templeton et al. |
| 2016/0044963 A1 | 2/2016 | Saleem |
| 2016/0073693 A1 | 3/2016 | Reevell |
| 2016/0088685 A1 | 3/2016 | Henke et al. |
| 2016/0106154 A1 | 4/2016 | Lord |
| 2016/0106155 A1 | 4/2016 | Reevell |
| 2016/0146506 A1 | 5/2016 | Brereton et al. |
| 2016/0150825 A1 | 6/2016 | Mironov et al. |
| 2016/0150828 A1 | 6/2016 | Goldstein et al. |
| 2016/0168438 A1 | 6/2016 | Harding et al. |
| 2016/0248280 A1 | 8/2016 | Ben-Shalom et al. |
| 2016/0255879 A1 | 9/2016 | Paprocki et al. |
| 2016/0295921 A1 | 10/2016 | Mironov et al. |
| 2017/0006916 A1 | 1/2017 | Liu |
| 2017/0042245 A1 | 2/2017 | Buchberger et al. |
| 2017/0055574 A1 | 3/2017 | Kaufman et al. |
| 2017/0055575 A1 | 3/2017 | Wilke et al. |
| 2017/0055580 A1 | 3/2017 | Blandino et al. |
| 2017/0055581 A1 | 3/2017 | Wilke et al. |
| 2017/0055582 A1 | 3/2017 | Blandino et al. |
| 2017/0055583 A1 | 3/2017 | Blandino et al. |
| 2017/0055584 A1 | 3/2017 | Blandino et al. |
| 2017/0071250 A1 | 3/2017 | Mironov et al. |
| 2017/0079325 A1 | 3/2017 | Mironov |
| 2017/0086508 A1 | 3/2017 | Mironov et al. |
| 2017/0095006 A1 | 4/2017 | Egoyants et al. |
| 2017/0119046 A1 | 5/2017 | Kaufman et al. |
| 2017/0119047 A1 | 5/2017 | Blandino et al. |
| 2017/0119048 A1 | 5/2017 | Kaufman et al. |
| 2017/0119049 A1 | 5/2017 | Blandino et al. |
| 2017/0119050 A1 | 5/2017 | Blandino et al. |
| 2017/0119051 A1 | 5/2017 | Blandino et al. |
| 2017/0119054 A1 | 5/2017 | Zinovik et al. |
| 2017/0143042 A1 | 5/2017 | Batista et al. |
| 2017/0156403 A1 | 6/2017 | Gill et al. |
| 2017/0156406 A1 | 6/2017 | Abramov et al. |
| 2017/0156407 A1 | 6/2017 | Abramov et al. |
| 2017/0197043 A1 | 7/2017 | Buchberger |
| 2017/0197044 A1 | 7/2017 | Buchberger |
| 2017/0197046 A1 | 7/2017 | Buchberger |
| 2017/0197048 A1 | 7/2017 | Khosrowshahi et al. |
| 2017/0197049 A1 | 7/2017 | Doll |
| 2017/0197050 A1 | 7/2017 | Reinburg et al. |
| 2017/0231281 A1 | 8/2017 | Hatton et al. |
| 2017/0303585 A1 | 10/2017 | Florack et al. |
| 2017/0332700 A1 | 11/2017 | Plews et al. |
| 2017/0340008 A1 | 11/2017 | Sebastian et al. |
| 2018/0184713 A1 | 7/2018 | Mironov et al. |
| 2018/0192700 A1 | 7/2018 | Fraser et al. |
| 2018/0214645 A1 | 8/2018 | Reevell |
| 2018/0235279 A1 | 8/2018 | Wilke et al. |
| 2018/0242633 A1 | 8/2018 | Wilke et al. |
| 2018/0242636 A1 | 8/2018 | Blandino et al. |
| 2018/0249760 A1 | 9/2018 | Kaufman et al. |
| 2018/0271171 A1 | 9/2018 | Abramov et al. |
| 2018/0279677 A1 | 10/2018 | Blandino et al. |
| 2018/0317552 A1 | 11/2018 | Kaufman et al. |
| 2018/0317553 A1 | 11/2018 | Blandino et al. |
| 2018/0317554 A1 | 11/2018 | Kaufman et al. |
| 2018/0317555 A1 | 11/2018 | Blandino et al. |
| 2018/0325173 A1 | 11/2018 | Blandino et al. |
| 2019/0000142 A1 | 1/2019 | Lavanchy et al. |
| 2019/0014820 A1 | 1/2019 | Malgat |
| 2019/0082738 A1 | 3/2019 | Blandino et al. |
| 2019/0191780 A1 | 6/2019 | Wilke et al. |
| 2019/0230988 A1 | 8/2019 | Aoun |
| 2019/0239555 A1 | 8/2019 | Nicholson |
| 2019/0313695 A1 | 10/2019 | Kaufman et al. |
| 2019/0364973 A1 | 12/2019 | Kaufman et al. |
| 2020/0054068 A1 | 2/2020 | Blandino et al. |
| 2020/0054069 A1 | 2/2020 | Blandino et al. |
| 2020/0229497 A1 | 7/2020 | Aoun et al. |
| 2020/0268053 A1 | 8/2020 | Thorsen et al. |
| 2020/0288774 A1 | 9/2020 | Blandino et al. |
| 2020/0352237 A1 | 11/2020 | Kaufman et al. |
| 2021/0093008 A1 | 4/2021 | White et al. |
| 2021/0093012 A1 | 4/2021 | White et al. |
| 2021/0137167 A1 | 5/2021 | Aoun et al. |
| 2021/0186109 A1 | 6/2021 | Milligan et al. |

FOREIGN PATENT DOCUMENTS

| | | |
|---|---|---|
| AT | 321190 B | 3/1975 |
| AT | 321191 B | 3/1975 |
| AT | 507187 B1 | 3/2010 |
| AT | 508244 A4 | 12/2010 |
| AT | 510405 A4 | 4/2012 |
| AT | 510504 A1 | 4/2012 |
| AU | 6393173 A | 6/1975 |
| AU | 2002364521 A1 | 6/2003 |
| AU | 2018241908 B2 | 9/2020 |
| AU | 2020281092 A1 | 1/2021 |
| CA | 2160990 A1 | 10/1994 |
| CA | 2146954 A1 | 10/1996 |
| CA | 2309376 A1 | 11/2000 |
| CA | 2414161 A1 | 1/2002 |
| CA | 2414191 A1 | 1/2002 |
| CA | 2520759 A1 | 10/2004 |
| CA | 2492255 A1 | 7/2006 |
| CA | 2668465 A1 | 12/2009 |
| CA | 2712412 A1 | 12/2009 |
| CA | 2641869 A1 | 5/2010 |
| CA | 2862048 A1 | 7/2013 |
| CA | 2923377 A1 | 6/2015 |
| CA | 2989375 A1 | 1/2017 |
| CH | 513656 A | 10/1971 |
| CH | 698603 B1 | 9/2009 |
| CL | 199400288 A1 | 8/1995 |
| CL | 199600626 A1 | 4/1997 |
| CL | 2007002226 A1 | 2/2008 |
| CL | 2013003637 A1 | 7/2014 |
| CL | 2014002840 A1 | 12/2014 |
| CL | 2017003408 A1 | 6/2018 |
| CN | 86102917 A | 11/1987 |
| CN | 1038085 A | 12/1989 |
| CN | 1040914 A | 4/1990 |
| CN | 1043076 A | 6/1990 |
| CN | 1045691 A | 10/1990 |
| CN | 2092880 U | 1/1992 |
| CN | 1059649 A | 3/1992 |
| CN | 2144261 Y | 10/1993 |
| CN | 1106812 A | 8/1995 |
| CN | 2220168 Y | 2/1996 |
| CN | 1121385 A | 4/1996 |
| CN | 1122213 A | 5/1996 |
| CN | 1123000 A | 5/1996 |

(56) References Cited

FOREIGN PATENT DOCUMENTS

| | | | |
|---|---|---|---|
| CN | 1123001 | A | 5/1996 |
| CN | 1126426 | A | 7/1996 |
| CN | 2246744 | Y | 2/1997 |
| CN | 1158757 | A | 9/1997 |
| CN | 1161635 | A | 10/1997 |
| CN | 1195270 | A | 10/1998 |
| CN | 1196660 | A | 10/1998 |
| CN | 1196661 | A | 10/1998 |
| CN | 1205849 | A | 1/1999 |
| CN | 1209731 | A | 3/1999 |
| CN | 1287890 | A | 3/2001 |
| CN | 1293591 | A | 5/2001 |
| CN | 1293596 | A | 5/2001 |
| CN | 1312730 | A | 9/2001 |
| CN | 1106812 | C | 4/2003 |
| CN | 1130109 | C | 12/2003 |
| CN | 1130137 | C | 12/2003 |
| CN | 2598364 | Y | 1/2004 |
| CN | 1495417 | A | 5/2004 |
| CN | 1151739 | C | 6/2004 |
| CN | 1545823 | A | 11/2004 |
| CN | 1575135 | A | 2/2005 |
| CN | 1578895 | A | 2/2005 |
| CN | 1641976 | A | 7/2005 |
| CN | 2719043 | Y | 8/2005 |
| CN | 1679419 | A | 10/2005 |
| CN | 1694765 | A | 11/2005 |
| CN | 1703279 | A | 11/2005 |
| CN | 200966824 | Y | 10/2007 |
| CN | 101084034 | A | 12/2007 |
| CN | 201076006 | Y | 6/2008 |
| CN | 101238047 | A | 8/2008 |
| CN | 101267749 | A | 9/2008 |
| CN | 101277622 | A | 10/2008 |
| CN | 101282660 | A | 10/2008 |
| CN | 201185656 | Y | 1/2009 |
| CN | 101366554 | A | 2/2009 |
| CN | 101390659 | A | 3/2009 |
| CN | 201199922 | Y | 3/2009 |
| CN | 201238609 | Y | 5/2009 |
| CN | 101500443 | A | 8/2009 |
| CN | 101516425 | A | 8/2009 |
| CN | 101557728 | A | 10/2009 |
| CN | 201375023 | Y | 1/2010 |
| CN | 101648041 | A | 2/2010 |
| CN | 201445686 | U | 5/2010 |
| CN | 101878958 | A | 11/2010 |
| CN | 101912654 | A | 12/2010 |
| CN | 101925309 | A | 12/2010 |
| CN | 102014677 | A | 4/2011 |
| CN | 201869778 | U | 6/2011 |
| CN | 102131411 | A | 7/2011 |
| CN | 102186271 | A | 9/2011 |
| CN | 102212340 | A | 10/2011 |
| CN | 202172846 | U | 3/2012 |
| CN | 102483237 | A | 5/2012 |
| CN | 102499466 | A | 6/2012 |
| CN | 102539005 | A | 7/2012 |
| CN | 102575954 | A | 7/2012 |
| CN | 102604599 | A | 7/2012 |
| CN | 202351223 | U | 7/2012 |
| CN | 102655773 | A | 9/2012 |
| CN | 202722498 | U | 2/2013 |
| CN | 202750708 | U | 2/2013 |
| CN | 103052380 | A | 4/2013 |
| CN | 103054196 | A | 4/2013 |
| CN | 103202540 | A | 7/2013 |
| CN | 103359550 | A | 10/2013 |
| CN | 203369386 | U | 1/2014 |
| CN | 103608619 | A | 2/2014 |
| CN | 103689812 | A | 4/2014 |
| CN | 103689815 | A | 4/2014 |
| CN | 103763954 | A | 4/2014 |
| CN | 103974640 | A | 8/2014 |
| CN | 103997922 | A | 8/2014 |
| CN | 104010531 | A | 8/2014 |
| CN | 203748673 | U | 8/2014 |
| CN | 203761188 | U | 8/2014 |
| CN | 203762288 | U | 8/2014 |
| CN | 104039183 | A | 9/2014 |
| CN | 104095291 | A | 10/2014 |
| CN | 104095293 | A | 10/2014 |
| CN | 104095295 | A | 10/2014 |
| CN | 203952405 | U | 11/2014 |
| CN | 104203016 | A | 12/2014 |
| CN | 104223359 | A | 12/2014 |
| CN | 203986095 | U | 12/2014 |
| CN | 104256899 | A | 1/2015 |
| CN | 204091003 | U | 1/2015 |
| CN | 104540406 | A | 4/2015 |
| CN | 104619202 | A | 5/2015 |
| CN | 104664608 | A | 6/2015 |
| CN | 104677116 | A | 6/2015 |
| CN | 104703308 | A | 6/2015 |
| CN | 104720121 | A | 6/2015 |
| CN | 104770885 | A | 7/2015 |
| CN | 204440191 | U | 7/2015 |
| CN | 204519365 | U | 8/2015 |
| CN | 204539505 | U | 8/2015 |
| CN | 204599333 | U | 9/2015 |
| CN | 204949521 | U | 1/2016 |
| CN | 105307524 | A | 2/2016 |
| CN | 105307525 | A | 2/2016 |
| CN | 106102863 | A | 11/2016 |
| CN | 106255431 | A | 12/2016 |
| CN | 106455712 | A | 2/2017 |
| CN | 106535680 | A | 3/2017 |
| CN | 106617325 | A | 5/2017 |
| CN | 107231790 | U | 10/2017 |
| CN | 107259647 | A | 10/2017 |
| CN | 107846963 | A | 3/2018 |
| CN | 109330030 | A | 2/2019 |
| DE | 360431 | C | 10/1922 |
| DE | 1100884 | B | 3/1961 |
| DE | 1425872 | A1 | 11/1968 |
| DE | 1290499 | B | 3/1969 |
| DE | 1813993 | A1 | 6/1970 |
| DE | 1425871 | B1 | 10/1970 |
| DE | 1950439 | A1 | 4/1971 |
| DE | 2315789 | A1 | 10/1973 |
| DE | 3148335 | A1 | 7/1983 |
| DE | 3218760 | A1 | 12/1983 |
| DE | 3936687 | A1 | 5/1990 |
| DE | 4105370 | A1 | 8/1992 |
| DE | 4307144 | C2 | 1/1995 |
| DE | 4343578 | A1 | 6/1995 |
| DE | 29509286 | U1 | 8/1995 |
| DE | 4420366 | A1 | 12/1995 |
| DE | 29700307 | U1 | 4/1997 |
| DE | 29713866 | U1 | 10/1997 |
| DE | 29719509 | U1 | 1/1998 |
| DE | 19630619 | A1 | 2/1998 |
| DE | 19654945 | A1 | 3/1998 |
| DE | 19854007 | A1 | 5/2000 |
| DE | 19854009 | A1 | 5/2000 |
| DE | 10058642 | A1 | 6/2001 |
| DE | 10007521 | A1 | 8/2001 |
| DE | 10064288 | A1 | 8/2001 |
| DE | 10164587 | A1 | 7/2003 |
| DE | 10330681 | B3 | 6/2004 |
| DE | 102005024803 | A1 | 6/2006 |
| DE | 202006013439 | U1 | 10/2006 |
| DE | 102005023278 | A1 | 11/2006 |
| DE | 102005056885 | A1 | 5/2007 |
| DE | 102006041544 | A1 | 8/2007 |
| DE | 102006041042 | A1 | 3/2008 |
| DE | 102006047146 | A1 | 4/2008 |
| DE | 102007011120 | A1 | 9/2008 |
| DE | 102008034509 | A1 | 4/2009 |
| DE | 102008013303 | A1 | 9/2009 |
| DE | 202009010400 | U1 | 11/2009 |
| DE | 102008038121 | A1 | 2/2010 |
| DE | 202010011436 | U1 | 11/2010 |
| DE | 102009047185 | A1 | 6/2011 |

(56) References Cited

FOREIGN PATENT DOCUMENTS

| | | |
|---|---|---|
| DE | 102010046482 A1 | 3/2012 |
| DE | 202013100606 U1 | 2/2013 |
| DE | 102013002555 A1 | 6/2014 |
| DK | 114399 B | 6/1969 |
| DK | 488488 A | 3/1989 |
| DK | 0540774 T3 | 7/1995 |
| DK | 0540775 T3 | 8/1997 |
| EP | 0033668 A1 | 8/1981 |
| EP | 0076897 A1 | 4/1983 |
| EP | 0033668 B1 | 6/1983 |
| EP | 0149997 A2 | 7/1985 |
| EP | 0194257 A1 | 9/1986 |
| EP | 0280262 A2 | 8/1988 |
| EP | 0295122 A2 | 12/1988 |
| EP | 0309227 A2 | 3/1989 |
| EP | 0358002 A2 | 3/1990 |
| EP | 0358114 A2 | 3/1990 |
| EP | 0371285 A2 | 6/1990 |
| EP | 0418464 A2 | 3/1991 |
| EP | 0430559 A2 | 6/1991 |
| EP | 0430566 A2 | 6/1991 |
| EP | 0438862 A2 | 7/1991 |
| EP | 0444553 A2 | 9/1991 |
| EP | 0488488 A1 | 6/1992 |
| EP | 0491952 A1 | 7/1992 |
| EP | 0503767 A1 | 9/1992 |
| EP | 0503794 A1 | 9/1992 |
| EP | 0520231 A2 | 12/1992 |
| EP | 0603613 A1 | 6/1994 |
| EP | 0430559 B1 | 3/1995 |
| EP | 0703735 A1 | 4/1996 |
| EP | 0354661 B1 | 4/1997 |
| EP | 0540775 B1 | 7/1997 |
| EP | 0823492 A2 | 2/1998 |
| EP | 0824927 A2 | 2/1998 |
| EP | 0845220 A1 | 6/1998 |
| EP | 0857431 A1 | 8/1998 |
| EP | 0653218 B1 | 9/1998 |
| EP | 0884928 A1 | 12/1998 |
| EP | 0893071 A1 | 1/1999 |
| EP | 1064083 A2 | 1/2001 |
| EP | 1064101 A2 | 1/2001 |
| EP | 1111191 A2 | 6/2001 |
| EP | 0703735 B1 | 7/2001 |
| EP | 1128741 A1 | 9/2001 |
| EP | 1128742 A1 | 9/2001 |
| EP | 1128743 A1 | 9/2001 |
| EP | 1148905 A2 | 10/2001 |
| EP | 1166814 A2 | 1/2002 |
| EP | 1166847 A2 | 1/2002 |
| EP | 1203189 A1 | 5/2002 |
| EP | 1217320 A2 | 6/2002 |
| EP | 1298993 A1 | 4/2003 |
| EP | 1299499 A1 | 4/2003 |
| EP | 1299500 A2 | 4/2003 |
| EP | 1301152 A2 | 4/2003 |
| EP | 0845220 B1 | 9/2003 |
| EP | 1349601 A2 | 10/2003 |
| EP | 1357025 A2 | 10/2003 |
| EP | 1390112 A1 | 2/2004 |
| EP | 1409051 A2 | 4/2004 |
| EP | 1439876 A2 | 7/2004 |
| EP | 1454840 A1 | 9/2004 |
| EP | 1490452 A2 | 12/2004 |
| EP | 1506792 A2 | 2/2005 |
| EP | 1609376 A1 | 12/2005 |
| EP | 1618803 A1 | 1/2006 |
| EP | 1625334 A2 | 2/2006 |
| EP | 1625335 A2 | 2/2006 |
| EP | 1625336 A2 | 2/2006 |
| EP | 1454840 B1 | 9/2006 |
| EP | 1536703 B1 | 9/2006 |
| EP | 1702639 A2 | 9/2006 |
| EP | 1736065 A1 | 12/2006 |
| EP | 1749548 A2 | 2/2007 |
| EP | 1757921 A2 | 2/2007 |
| EP | 1867357 A1 | 12/2007 |
| EP | 1891867 A2 | 2/2008 |
| EP | 1940254 A2 | 7/2008 |
| EP | 1996880 A2 | 12/2008 |
| EP | 2011033 A2 | 1/2009 |
| EP | 2018886 A1 | 1/2009 |
| EP | 2022349 A1 | 2/2009 |
| EP | 2044967 A1 | 4/2009 |
| EP | 1357025 B1 | 7/2009 |
| EP | 2083642 A1 | 8/2009 |
| EP | 2110033 A1 | 10/2009 |
| EP | 2110034 A1 | 10/2009 |
| EP | 2113178 A1 | 11/2009 |
| EP | 2138058 A1 | 12/2009 |
| EP | 2138059 A1 | 12/2009 |
| EP | 1947965 B1 | 2/2010 |
| EP | 2179229 A2 | 4/2010 |
| EP | 2191735 A1 | 6/2010 |
| EP | 2227973 A1 | 9/2010 |
| EP | 2234508 A2 | 10/2010 |
| EP | 2241203 A2 | 10/2010 |
| EP | 2138057 B1 | 11/2010 |
| EP | 2246086 A2 | 11/2010 |
| EP | 2249669 A1 | 11/2010 |
| EP | 2253541 A1 | 11/2010 |
| EP | 2257195 A1 | 12/2010 |
| EP | 2277398 A1 | 1/2011 |
| EP | 2303043 A2 | 4/2011 |
| EP | 2316286 A1 | 5/2011 |
| EP | 2327318 A1 | 6/2011 |
| EP | 2330866 A2 | 6/2011 |
| EP | 2340729 A1 | 7/2011 |
| EP | 2340730 A1 | 7/2011 |
| EP | 2368449 A1 | 9/2011 |
| EP | 2003997 B1 | 10/2011 |
| EP | 2394520 A1 | 12/2011 |
| EP | 2408494 A1 | 1/2012 |
| EP | 2444112 A1 | 4/2012 |
| EP | 2253541 B1 | 5/2012 |
| EP | 2472185 A1 | 7/2012 |
| EP | 2512205 A1 | 10/2012 |
| EP | 2520186 A1 | 11/2012 |
| EP | 2523752 A1 | 11/2012 |
| EP | 2542131 A2 | 1/2013 |
| EP | 2645814 A1 | 10/2013 |
| EP | 2696652 A1 | 2/2014 |
| EP | 2698070 A1 | 2/2014 |
| EP | 2760303 A2 | 8/2014 |
| EP | 2762019 A1 | 8/2014 |
| EP | 2785208 A1 | 10/2014 |
| EP | 2833744 A1 | 2/2015 |
| EP | 2835062 A1 | 2/2015 |
| EP | 2907397 A1 | 8/2015 |
| EP | 2967156 A1 | 1/2016 |
| EP | 2975958 A1 | 1/2016 |
| EP | 2996504 A1 | 3/2016 |
| EP | 2967156 B1 | 11/2016 |
| EP | 2996504 B1 | 11/2016 |
| EP | 3337342 A1 | 6/2018 |
| EP | 3367828 A1 | 9/2018 |
| ES | 262308 U | 6/1982 |
| FR | 718708 A | 1/1932 |
| FR | 960469 A | 4/1950 |
| FR | 1418189 A | 11/1965 |
| FR | 2573985 A1 | 6/1986 |
| FR | 2604093 A1 | 3/1988 |
| FR | 2700697 A1 | 7/1994 |
| FR | 2730166 A1 | 8/1996 |
| FR | 2818152 A1 | 6/2002 |
| FR | 2842791 B1 | 4/2005 |
| FR | 2873584 B1 | 11/2006 |
| GB | 25575 | 3/1912 |
| GB | 191126138 | 3/1912 |
| GB | 347650 A | 4/1931 |
| GB | 353745 A | 7/1931 |
| GB | 426247 A | 3/1935 |
| GB | 910166 A | 11/1962 |
| GB | 922310 A | 3/1963 |

(56) References Cited

FOREIGN PATENT DOCUMENTS

| | | | |
|---|---|---|---|
| GB | 958867 A | 5/1964 |
| GB | 1104214 A | 2/1968 |
| GB | 1227333 A | 4/1971 |
| GB | 1313525 A | 4/1973 |
| GB | 1379688 A | 1/1975 |
| GB | 1431334 A | 4/1976 |
| GB | 2294401 A | 5/1996 |
| GB | 2323033 A | 9/1998 |
| GB | 2342874 A | 4/2000 |
| GB | 2388040 A | 11/2003 |
| GB | 2412326 A | 9/2005 |
| GB | 2412876 A | 10/2005 |
| GB | 2448478 A | 10/2008 |
| GB | 2487851 A | 8/2012 |
| GB | 2495923 A | 5/2013 |
| GB | 2504732 A | 2/2014 |
| HK | 1196511 A1 | 12/2014 |
| HK | 1226611 | 10/2017 |
| IE | 63083 B1 | 3/1995 |
| IT | 1289590 B1 | 10/1998 |
| IT | RM20120193 A1 | 8/2012 |
| JP | S4961986 A | 6/1974 |
| JP | S5096908 A | 8/1975 |
| JP | S5314173 A | 2/1978 |
| JP | S5594260 A | 7/1980 |
| JP | S5752456 A | 3/1982 |
| JP | S57110260 A | 7/1982 |
| JP | S57177769 A | 11/1982 |
| JP | S59106340 A | 6/1984 |
| JP | S6196763 A | 5/1986 |
| JP | S6196765 A | 5/1986 |
| JP | S62501050 A | 4/1987 |
| JP | S62205184 A | 9/1987 |
| JP | S6360322 A | 3/1988 |
| JP | S63153666 A | 6/1988 |
| JP | S63127399 U | 8/1988 |
| JP | H01117775 A | 5/1989 |
| JP | H01191674 A | 8/1989 |
| JP | H01166953 U | 11/1989 |
| JP | H0292986 A | 4/1990 |
| JP | H0292988 A | 4/1990 |
| JP | H02124081 A | 5/1990 |
| JP | H02127493 A | 5/1990 |
| JP | H02190171 A | 7/1990 |
| JP | H034479 A | 1/1991 |
| JP | H0341185 A | 2/1991 |
| JP | H03112478 A | 5/1991 |
| JP | H03192677 A | 8/1991 |
| JP | H03232481 A | 10/1991 |
| JP | H05103836 A | 4/1993 |
| JP | H05115272 A | 5/1993 |
| JP | H05193668 A | 8/1993 |
| JP | H05212100 A | 8/1993 |
| JP | H05309136 A | 11/1993 |
| JP | H062164 B1 | 1/1994 |
| JP | H06189861 A | 7/1994 |
| JP | H06295782 A | 10/1994 |
| JP | H06315366 A | 11/1994 |
| JP | H07147965 A | 6/1995 |
| JP | H0851175 A | 2/1996 |
| JP | H08942 U | 6/1996 |
| JP | 2519658 B2 | 7/1996 |
| JP | H08228751 A | 9/1996 |
| JP | H08299862 A | 11/1996 |
| JP | H08511175 A | 11/1996 |
| JP | H08511176 A | 11/1996 |
| JP | H09107943 A | 4/1997 |
| JP | H09257256 A | 9/1997 |
| JP | 3044574 U | 12/1997 |
| JP | 3053426 U | 10/1998 |
| JP | H1189551 A | 4/1999 |
| JP | H11503912 A | 4/1999 |
| JP | H11125390 A | 5/1999 |
| JP | H11169157 A | 6/1999 |
| JP | H11507234 A | 6/1999 |
| JP | H11178562 A | 7/1999 |
| JP | H11514081 A | 11/1999 |
| JP | 2000051556 A | 2/2000 |
| JP | 3016586 B2 | 3/2000 |
| JP | 2000082576 A | 3/2000 |
| JP | 2000093155 A | 4/2000 |
| JP | 2000119643 A | 4/2000 |
| JP | 3078033 B2 | 8/2000 |
| JP | 2000515576 A | 11/2000 |
| JP | 3118462 B2 | 12/2000 |
| JP | 3118463 B2 | 12/2000 |
| JP | 2001063776 A | 3/2001 |
| JP | 2002170657 A | 6/2002 |
| JP | 2002527153 A | 8/2002 |
| JP | 2002253593 A | 9/2002 |
| JP | 2002529111 A | 9/2002 |
| JP | 2002336290 A | 11/2002 |
| JP | 2003034785 A | 2/2003 |
| JP | 3392138 B2 | 3/2003 |
| JP | 3413208 B2 | 6/2003 |
| JP | 2004055547 A | 2/2004 |
| JP | 2004504580 A | 2/2004 |
| JP | 3588469 B2 | 11/2004 |
| JP | 2004332069 A | 11/2004 |
| JP | 2005036897 A | 2/2005 |
| JP | 2005050624 A | 2/2005 |
| JP | 2005106350 A | 4/2005 |
| JP | 2005516647 A | 6/2005 |
| JP | 2005524067 A | 8/2005 |
| JP | 2005300005 A | 10/2005 |
| JP | 2005537918 A | 12/2005 |
| JP | 2005537919 A | 12/2005 |
| JP | 2005538149 A | 12/2005 |
| JP | 2005538159 A | 12/2005 |
| JP | 2006501871 A | 1/2006 |
| JP | 2006504431 A | 2/2006 |
| JP | 2006219557 A | 8/2006 |
| JP | 2006524494 A | 11/2006 |
| JP | 2007057532 A | 3/2007 |
| JP | 2007512880 A | 5/2007 |
| JP | 2007516015 A | 6/2007 |
| JP | 2007522900 A | 8/2007 |
| JP | 2008035742 A | 2/2008 |
| JP | 2008509907 A | 4/2008 |
| JP | 2008511175 A | 4/2008 |
| JP | 2008518614 A | 6/2008 |
| JP | 2008249003 A | 10/2008 |
| JP | 2008311058 A | 12/2008 |
| JP | 2009501537 A | 1/2009 |
| JP | 2009509523 A | 3/2009 |
| JP | 2009087703 A | 4/2009 |
| JP | 2009537119 A | 10/2009 |
| JP | 2009537120 A | 10/2009 |
| JP | 2010041354 A | 2/2010 |
| JP | 2010506594 A | 3/2010 |
| JP | 2010178730 A | 8/2010 |
| JP | 2010526553 A | 8/2010 |
| JP | 2010213579 A | 9/2010 |
| JP | 2010535530 A | 11/2010 |
| JP | 2011058538 A | 3/2011 |
| JP | 2011509667 A | 3/2011 |
| JP | 2011515080 A | 5/2011 |
| JP | 2011515093 A | 5/2011 |
| JP | 2011113977 A | 6/2011 |
| JP | 2011518567 A | 6/2011 |
| JP | 2011135901 A | 7/2011 |
| JP | 2011525366 A | 9/2011 |
| JP | 2012506263 A | 3/2012 |
| JP | 2012529936 A | 11/2012 |
| JP | 2012249854 A | 12/2012 |
| JP | 2013054873 A | 3/2013 |
| JP | 2013073939 A | 4/2013 |
| JP | 5193668 B2 | 5/2013 |
| JP | 5217980 B2 | 6/2013 |
| JP | 2013150593 A | 8/2013 |
| JP | 2014519586 A | 8/2014 |
| JP | 2014525251 A | 9/2014 |
| JP | 2014526275 A | 10/2014 |
| JP | 2014527606 A | 10/2014 |

(56) References Cited

FOREIGN PATENT DOCUMENTS

| | | |
|---|---|---|
| JP | 2014229498 A | 12/2014 |
| JP | 2014533513 A | 12/2014 |
| JP | 2015503336 A | 2/2015 |
| JP | 2015503337 A | 2/2015 |
| JP | 2015504667 A | 2/2015 |
| JP | 2015060837 A | 3/2015 |
| JP | 2015506170 A | 3/2015 |
| JP | 2015508287 A | 3/2015 |
| JP | 2015509706 A | 4/2015 |
| JP | 2015098645 A | 5/2015 |
| JP | 2015513922 A | 5/2015 |
| JP | 2015513970 A | 5/2015 |
| JP | 2015531601 A | 11/2015 |
| JP | 2016036222 A | 3/2016 |
| JP | 2016524777 A | 8/2016 |
| JP | 2016525341 A | 8/2016 |
| JP | 2016189525 A | 11/2016 |
| JP | 2017515490 A | 6/2017 |
| JP | 2017520234 A | 7/2017 |
| JP | 2017526381 A | 9/2017 |
| JP | 6217980 B2 | 10/2017 |
| JP | 2017533732 A | 11/2017 |
| JP | 2018504127 A | 2/2018 |
| JP | 2018061512 A | 4/2018 |
| JP | 2018515119 A | 6/2018 |
| JP | 2018520664 A | 8/2018 |
| JP | 2019065344 A | 4/2019 |
| JP | 2020182327 A | 11/2020 |
| JP | 2021508438 A | 3/2021 |
| JP | 2021078359 A | 5/2021 |
| KR | 950700692 A | 2/1995 |
| KR | 960702734 A | 5/1996 |
| KR | 0178388 B1 | 2/1999 |
| KR | 19990081973 A | 11/1999 |
| KR | 100286488 B1 | 4/2001 |
| KR | 100385395 B1 | 8/2003 |
| KR | 100393327 B1 | 10/2003 |
| KR | 200350504 Y1 | 5/2004 |
| KR | 20040068292 A | 7/2004 |
| KR | 200370872 Y1 | 12/2004 |
| KR | 100636287 B1 | 10/2006 |
| KR | 20070038350 A | 4/2007 |
| KR | 100757450 B1 | 9/2007 |
| KR | 20070096027 A | 10/2007 |
| KR | 20080060218 A | 7/2008 |
| KR | 100971178 B1 | 7/2010 |
| KR | 20100135865 A | 12/2010 |
| KR | 20120003484 U | 5/2012 |
| KR | 20120104533 A | 9/2012 |
| KR | 20130029697 A | 3/2013 |
| KR | 20130006714 U | 11/2013 |
| KR | 20140068808 A | 6/2014 |
| KR | 20140123487 A | 10/2014 |
| KR | 20150143877 A | 12/2015 |
| KR | 20150143891 A | 12/2015 |
| MX | 2009001096 A | 3/2009 |
| MX | 2014011283 A | 10/2014 |
| RU | 2066337 C1 | 9/1996 |
| RU | 2098446 C1 | 12/1997 |
| RU | 2135054 C1 | 8/1999 |
| RU | 2285028 C1 | 10/2006 |
| RU | 2311859 C2 | 12/2007 |
| RU | 2336001 C2 | 10/2008 |
| RU | 2349234 C2 | 3/2009 |
| RU | 89927 U1 | 12/2009 |
| RU | 94815 U1 | 6/2010 |
| RU | 103281 U1 | 4/2011 |
| RU | 115629 U1 | 5/2012 |
| RU | 122000 U1 | 11/2012 |
| RU | 124120 U1 | 1/2013 |
| RU | 132318 U1 | 9/2013 |
| RU | 2509516 C2 | 3/2014 |
| RU | 2015105675 A | 8/2015 |
| RU | 2013155697 A | 10/2015 |
| RU | 2595971 C2 | 8/2016 |
| RU | 2614615 C2 | 3/2017 |
| RU | 2016150117 A | 6/2018 |
| RU | 2687811 C1 | 5/2019 |
| SE | 7415242 L | 6/1975 |
| SE | 0502503 L | 10/2006 |
| TW | 274507 B | 4/1996 |
| TW | 201325481 A | 7/2013 |
| UA | 125626 C2 | 5/2022 |
| WO | 8404698 A1 | 12/1984 |
| WO | 8601730 A1 | 3/1986 |
| WO | 8602528 A1 | 5/1986 |
| WO | 9013326 A1 | 11/1990 |
| WO | 9406314 A1 | 3/1994 |
| WO | 9409842 A1 | 5/1994 |
| WO | 9418860 A1 | 9/1994 |
| WO | 9527411 A1 | 10/1995 |
| WO | 9527412 A1 | 10/1995 |
| WO | 9632854 A2 | 10/1996 |
| WO | 9639880 A1 | 12/1996 |
| WO | 9748293 A1 | 12/1997 |
| WO | 9805906 A1 | 2/1998 |
| WO | 9817131 A1 | 4/1998 |
| WO | 9823171 A1 | 6/1998 |
| WO | 9835552 A1 | 8/1998 |
| WO | 9914402 A1 | 3/1999 |
| WO | 9947273 A2 | 9/1999 |
| WO | 9947806 A2 | 9/1999 |
| WO | 0009188 A1 | 2/2000 |
| WO | 0021598 A1 | 4/2000 |
| WO | 0028842 A1 | 5/2000 |
| WO | 0028843 A1 | 5/2000 |
| WO | 0045878 A2 | 8/2000 |
| WO | 0050111 A1 | 8/2000 |
| WO | 0104548 A1 | 1/2001 |
| WO | 0140717 A1 | 6/2001 |
| WO | 0163183 A1 | 8/2001 |
| WO | 0167819 A1 | 9/2001 |
| WO | 0205620 A2 | 1/2002 |
| WO | 0205640 A1 | 1/2002 |
| WO | 0206421 A1 | 1/2002 |
| WO | 0207656 A2 | 1/2002 |
| WO | 0224262 A2 | 3/2002 |
| WO | 02051466 A2 | 7/2002 |
| WO | 02051468 A2 | 7/2002 |
| WO | 02058747 A1 | 8/2002 |
| WO | 02096532 A1 | 12/2002 |
| WO | 02098389 A1 | 12/2002 |
| WO | 03012565 A1 | 2/2003 |
| WO | 03028409 A1 | 4/2003 |
| WO | 03037412 A2 | 5/2003 |
| WO | 03049792 A1 | 6/2003 |
| WO | 03050405 A1 | 6/2003 |
| WO | 03056948 A1 | 7/2003 |
| WO | 03059413 A2 | 7/2003 |
| WO | 03070031 A1 | 8/2003 |
| WO | 03083007 A2 | 10/2003 |
| WO | 03083283 A1 | 10/2003 |
| WO | 03101454 A1 | 12/2003 |
| WO | 03103387 A2 | 12/2003 |
| WO | 2004022128 A2 | 3/2004 |
| WO | 2004022242 A1 | 3/2004 |
| WO | 2004022243 A1 | 3/2004 |
| WO | 2004089126 A1 | 10/2004 |
| WO | 2004098324 A2 | 11/2004 |
| WO | 2004104491 A2 | 12/2004 |
| WO | 2004104492 A2 | 12/2004 |
| WO | 2004104493 A2 | 12/2004 |
| WO | 2005106350 A2 | 11/2005 |
| WO | 2006022714 A1 | 3/2006 |
| WO | 2006082571 A1 | 8/2006 |
| WO | 2007012007 A2 | 1/2007 |
| WO | 2007017482 A1 | 2/2007 |
| WO | 2007040941 A1 | 4/2007 |
| WO | 2007042941 A2 | 4/2007 |
| WO | 2007051163 A2 | 5/2007 |
| WO | 2007054167 A1 | 5/2007 |
| WO | 2007078273 A1 | 7/2007 |
| WO | 2007090594 A1 | 8/2007 |
| WO | 2007098337 A2 | 8/2007 |

(56) References Cited

FOREIGN PATENT DOCUMENTS

| | | |
|---|---|---|
| WO | 2007109811 A2 | 9/2007 |
| WO | 2007113617 A2 | 10/2007 |
| WO | 2007116915 A1 | 10/2007 |
| WO | 2007131449 A1 | 11/2007 |
| WO | 2007131450 A1 | 11/2007 |
| WO | 2007141668 A2 | 12/2007 |
| WO | 2008015441 A1 | 2/2008 |
| WO | 2008029381 A2 | 3/2008 |
| WO | 2008038144 A2 | 4/2008 |
| WO | 2008051909 A1 | 5/2008 |
| WO | 2008069883 A1 | 6/2008 |
| WO | 2008108889 A1 | 9/2008 |
| WO | 2008121610 A1 | 10/2008 |
| WO | 2008151777 A2 | 12/2008 |
| WO | 2009001082 A1 | 12/2008 |
| WO | 2009006521 A2 | 1/2009 |
| WO | 2009015410 A1 | 2/2009 |
| WO | 2009022232 A2 | 2/2009 |
| WO | 2009042955 A2 | 4/2009 |
| WO | 2009079641 A2 | 6/2009 |
| WO | 2009092862 A1 | 7/2009 |
| WO | 2009118085 A1 | 10/2009 |
| WO | 2009132793 A1 | 11/2009 |
| WO | 2009152651 A1 | 12/2009 |
| WO | 2009155957 A1 | 12/2009 |
| WO | 2009156181 A2 | 12/2009 |
| WO | 2010017586 A1 | 2/2010 |
| WO | 2010041354 A1 | 4/2010 |
| WO | 2010045670 A1 | 4/2010 |
| WO | 2010045671 A1 | 4/2010 |
| WO | 2010047389 A1 | 4/2010 |
| WO | 2010053467 A1 | 5/2010 |
| WO | 2010060537 A1 | 6/2010 |
| WO | 2010073018 A1 | 7/2010 |
| WO | 2010102832 A1 | 9/2010 |
| WO | 2010107613 A1 | 9/2010 |
| WO | 2010118644 A1 | 10/2010 |
| WO | 2010133342 A1 | 11/2010 |
| WO | 2011045609 A1 | 4/2011 |
| WO | 2011050943 A1 | 5/2011 |
| WO | 2011050964 A1 | 5/2011 |
| WO | 2011063970 A1 | 6/2011 |
| WO | 2011068020 A1 | 6/2011 |
| WO | 2011070785 A1 | 6/2011 |
| WO | 2011079932 A1 | 7/2011 |
| WO | 2011088132 A1 | 7/2011 |
| WO | 2011101164 A1 | 8/2011 |
| WO | 2011109304 A2 | 9/2011 |
| WO | 2011109849 A1 | 9/2011 |
| WO | 2011117580 A2 | 9/2011 |
| WO | 2012014490 A1 | 2/2012 |
| WO | 2012025496 A1 | 3/2012 |
| WO | 2012054973 A1 | 5/2012 |
| WO | 2012072770 A1 | 6/2012 |
| WO | 2012072790 A1 | 6/2012 |
| WO | 2012078865 A2 | 6/2012 |
| WO | 2012100430 A1 | 8/2012 |
| WO | 2013022936 A1 | 2/2013 |
| WO | 2013034453 A1 | 3/2013 |
| WO | 2013034454 A1 | 3/2013 |
| WO | 2013034455 A1 | 3/2013 |
| WO | 2013034458 A1 | 3/2013 |
| WO | 2013034459 A1 | 3/2013 |
| WO | 2013034460 A1 | 3/2013 |
| WO | 2013057185 A1 | 4/2013 |
| WO | 2013076098 A2 | 5/2013 |
| WO | 2013082173 A1 | 6/2013 |
| WO | 2013098395 A1 | 7/2013 |
| WO | 2013098405 A2 | 7/2013 |
| WO | 2013098409 A1 | 7/2013 |
| WO | 2013098410 A2 | 7/2013 |
| WO | 2013102609 A2 | 7/2013 |
| WO | 2013113612 A1 | 8/2013 |
| WO | 2013116558 A1 | 8/2013 |
| WO | 2013116572 A1 | 8/2013 |
| WO | 2013131764 A1 | 9/2013 |
| WO | 2013152873 A1 | 10/2013 |
| WO | 2013160112 A2 | 10/2013 |
| WO | 2013178767 A1 | 12/2013 |
| WO | 2014012906 A1 | 1/2014 |
| WO | 2014037794 A2 | 3/2014 |
| WO | 2014045025 A2 | 3/2014 |
| WO | 2014048475 A1 | 4/2014 |
| WO | 2014048745 A1 | 4/2014 |
| WO | 2014061477 A1 | 4/2014 |
| WO | 2014130695 A1 | 8/2014 |
| WO | 2014140320 A1 | 9/2014 |
| WO | 2014147114 A1 | 9/2014 |
| WO | 2014150131 A1 | 9/2014 |
| WO | 2014201432 A1 | 12/2014 |
| WO | 2015022321 A1 | 2/2015 |
| WO | 2015051646 A1 | 4/2015 |
| WO | 2015052192 A1 | 4/2015 |
| WO | 2015062983 A2 | 5/2015 |
| WO | 2015068936 A1 | 5/2015 |
| WO | 2015082648 A1 | 6/2015 |
| WO | 2015082649 A1 | 6/2015 |
| WO | 2015082651 A1 | 6/2015 |
| WO | 2015082652 A1 | 6/2015 |
| WO | 2015114328 A1 | 8/2015 |
| WO | 2015131058 A1 | 9/2015 |
| WO | 2015140312 A1 | 9/2015 |
| WO | 2015165812 A1 | 11/2015 |
| WO | 2015166245 A2 | 11/2015 |
| WO | 2015172224 A1 | 11/2015 |
| WO | 2015175568 A1 | 11/2015 |
| WO | 2015177043 A1 | 11/2015 |
| WO | 2015177044 A1 | 11/2015 |
| WO | 2015177045 A1 | 11/2015 |
| WO | 2015177252 A1 | 11/2015 |
| WO | 2015177254 A1 | 11/2015 |
| WO | 2015177255 A1 | 11/2015 |
| WO | 2015177256 A1 | 11/2015 |
| WO | 2015177257 A1 | 11/2015 |
| WO | 2015177263 A1 | 11/2015 |
| WO | 2015177264 A1 | 11/2015 |
| WO | 2015177265 A1 | 11/2015 |
| WO | 2015177294 A1 | 11/2015 |
| WO | 2015198015 A1 | 12/2015 |
| WO | 2016014652 A1 | 1/2016 |
| WO | 2016075436 A1 | 5/2016 |
| WO | 2016135331 A1 | 9/2016 |
| WO | 2016156500 A1 | 10/2016 |
| WO | 2016184928 A1 | 11/2016 |
| WO | 2016184929 A1 | 11/2016 |
| WO | 2016184930 A1 | 11/2016 |
| WO | 2016200815 A2 | 12/2016 |
| WO | 2017001819 A1 | 1/2017 |
| WO | 2017005705 A1 | 1/2017 |
| WO | 2017029268 A1 | 2/2017 |
| WO | 2017029269 A1 | 2/2017 |
| WO | 2017029270 A1 | 2/2017 |
| WO | 2017036950 A2 | 3/2017 |
| WO | 2017036955 A2 | 3/2017 |
| WO | 2017036959 A1 | 3/2017 |
| WO | 2017068094 A1 | 4/2017 |
| WO | 2017068098 A1 | 4/2017 |
| WO | 2017068099 A1 | 4/2017 |
| WO | 2017072145 A1 | 5/2017 |
| WO | 2017085242 A1 | 5/2017 |
| WO | 2017149093 A1 | 9/2017 |
| WO | 2017194769 A1 | 11/2017 |
| WO | 2017205692 A1 | 11/2017 |
| WO | 2017207581 A1 | 12/2017 |
| WO | 2017207674 A1 | 12/2017 |
| WO | 2018002083 A1 | 1/2018 |
| WO | 2018019543 A1 | 2/2018 |
| WO | 2018019738 A1 | 2/2018 |
| WO | 2018019855 A1 | 2/2018 |
| WO | 2018054793 A1 | 3/2018 |
| WO | 2018073376 A1 | 4/2018 |
| WO | 2018178095 A1 | 10/2018 |
| WO | 2020047417 A1 | 3/2020 |

(56) References Cited

FOREIGN PATENT DOCUMENTS

OTHER PUBLICATIONS

Vietnam Opposition for Application No. PCT/EP2013/057539, mailed on Apr. 27, 2018, 6 pages.
Written Opinion for Application No. PCT/GB2015/051213 mailed on Jul. 16, 2015, 9 pages.
Written Opinion of the International Preliminary Examining Authority for Application No. PCT/EP2016/075739, mailed Sep. 28, 2017, 6 pages.
Written Opinion of the International Preliminary Examining Authority Received for PCT Application No. PCT/ EP2015/064595, mailed on Jun. 13, 2016, 8 pages.
Written Opinion received for Application No. PCT/EP2012/066485, mailed on Oct. 15, 2013, 6 pages.
Written Opinion Received for PCT Application No. PCT/EP2015/064595, mailed on Jan. 5, 2016, 11 pages.
Abramov, et al., Application and File History for U.S. Appl. No. 15/991,512, filed May 29, 2018.
Abramov, et al., Application and File History for U.S. Appl. No. 14/343,368, filed Jun. 24, 2014.
Abramov, et al., Application and File History for U.S. Appl. No. 15/437,517, filed Feb. 21, 2017.
Abramov, et al., Application and File History for U.S. Appl. No. 15/437,522, filed Feb. 21, 2017.
Blandino, et al., Application and File History for U.S. Appl. No. 14/840,652, filed Aug. 31, 2015.
Blandino, et al., Application and File History for U.S. Appl. No. 14/840,731, filed Aug. 31, 2015.
Blandino, et al., Application and File History for U.S. Appl. No. 14/840,751, filed Aug. 31, 2015.
Blandino, et al., Application and File History for U.S. Appl. No. 14/840,854, filed Aug. 31, 2015.
Blandino, et al., Application and File History for U.S. Appl. No. 14/927,532, filed Oct. 30, 2015.
Blandino, et al., Application and File History for U.S. Appl. No. 14/927,539, filed Oct. 30, 2015.
Blandino, et al., Application and File History for U.S. Appl. No. 14/927,551, filed Oct. 30, 2015.
Blandino, et al., Application and File History for U.S. Appl. No. 14/927,556, filed Oct. 30, 2015, 60 Pages.
Blandino, et al., Application and File History for U.S. Appl. No. 15/754,801, filed Feb. 23, 2018.
Blandino, et al., Application and File History for U.S. Appl. No. 15/754,812, filed Feb. 23, 2018.
Blandino, et al., Application and File History for U.S. Appl. No. 15/754,818, filed Feb. 23, 2018.
Blandino, et al., Application and File History for U.S. Appl. No. 15/754,823, filed Feb. 23, 2018.
Blandino, et al., Application and File History for U.S. Appl. No. 15/772,386, filed Apr. 30, 2018.
Brereton, et al., Application and File History for U.S. Appl. No. 14/899,629, filed Dec. 18, 2015.
Buchberger, Application and File History for U.S. Appl. No. 13/583,381, filed Dec. 17, 2012.
Buchberger, Application and File History for U.S. Appl. No. 15/470,078, filed Mar. 27, 2017, 392 pages.
Buchberger, Application and File History for U.S. Appl. No. 15/470,089, filed Mar. 27, 2017.
Buchberger, Application and File History for U.S. Appl. No. 15/470,095, filed Mar. 27, 2017, 351 pages.
Chaplin, "Hydrocolloids and Gums", retrieved from: <http://www1.lsbu.ac.uk/water/hydrocolloids_gums.html>, Established in 2001, 7 pages.
Collier, J. G., et al., "10.3 Mechanism of Evaporation and Condensation", Convective Boiling and Condensation, Third Edition, Clarendon Press, 1994, 6 pages.
Concept Group, "Concept Group's New Thermal Insulator Thinner Than Human Hair", Jun. 29, 2011, 2 pages.

Concept Group, "Insulon® Thermal Barrier from Concept Group Blocks Heat with Hyper-Deep Vacuum™", Dec. 15, 2011, 1 page.
Concept Group, "New Super Insulator form Concept Group Stops Heat Conduction in Tight Spaces", https://www.businesswire.com/news/home/20110610006023/en/New-Super-Insulator-Concept-Group-Stops-Heat, 2011, 5 pages.
Davies, et al., "Metallic Foams: Their Production, Properties and Applications", Journal of Materials Science, vol. 18, Part 7, 1983, pp. 1899-1911.
Diener Electronic, "Plasma Polymerization", The Company Diener Electronic GmbH+Co. KG, www.plasma.de, Oct. 17, 2017, 19 Pages.
Dunn P and Reay D, "Heat Pipes", 4th edition, ISBN 0080419038, 1994, 14 Pages.
Egoyants, et al., Application and File History for U.S. Appl. No. 14/127,138, filed Feb. 10, 2014.
Egoyants, et al., Application and File History for U.S. Appl. No. 14/127,144, filed Mar. 31, 2014.
Egoyants, et al., Application and File History for U.S. Appl. No. 14/127,148, filed Mar. 12, 2014.
Egoyants, et al., Application and File History for U.S. Appl. No. 14/127,879, filed May 9, 2014.
Egoyants, et al., Application and File History for U.S. Appl. No. 14/962,817, filed Dec. 8, 2015.
Egoyants, et al., Application and File History for U.S. Appl. No. 15/379,946, filed Dec. 15, 2016.
Gaohe, "Chinese Scientific Information", vol. 10, May 15, 2010, pp. 132-133.
Harding, et al., Application and File History for U.S. Appl. No. 14/902,663, filed Jan. 4, 2016, 309 pages.
Hatrick, et al., Application and File History for U.S. Appl. No. 14/428,626, filed Mar. 16, 2015.
Hegbom, T, "Integrating Electrical Heating Elements in Appliance Design", cited in EPO Opposition File Wrapper for EP2871983, resulting in interlocutory decision dated Aug. 7, 2019, 1997, 4 pages.
Ineos, "Typical Engineering Properties of High Density Polyethylene", Olefins and Polymers, USA, retrieved from https://www.ineos.com/globalassets/ineos-group/businesses/ineos-olefins-and-polymers-USA/products/technical-information--patents/ineos-typical-engineering-properties-of-hdpe.pdf, Accessed Dec. 4, 2018, 2 pages.
Iorga, Alexandru, et al., "Low Curie Temperature in Fe—Cr—Ni—Mn Alloys", U.P.B. Sci.Bull., Series B, vol. 73, Iss.4, 2011, pp. 195-202 (8 Pages).
Jrank.org, "Heat Capacity and Calorimetry, Heat Capacity and the Law of Conservation of Energy-Significance of the High Heat Capacity of Water", retrieved from https://science.jrank.org/pages/3265/Heat-Capacity.html, Accessed on Jun. 15, 2017, 2 pages.
Office Action mailed Jul. 8, 2016 for Chinese Application No. 201380021387.2, filed Apr. 11, 2011, 12 pages.
Office Action mailed Jun. 8, 2021 for Japanese Application No. 2020-526233, 22 pages.
Office Action mailed Sep. 1, 2020 for Japanese Application No. 2018-506381, 25 pages.
Office Action mailed May 10, 2020 for Brazilian Application No. BR112014004818-5, 6 pages.
Office Action mailed May 12, 2017 for Russian Application No. 2016103729, filed Jul. 4, 2014, 10 pages.
Office Action mailed Nov. 12, 2019 for Japanese Application No. 2018-506575, 8 pages.
Office Action mailed Sep. 12, 2019 for Chilean Application No. 201800521, 8 pages.
Office Action mailed Feb. 13, 2019 for Japanese Application No. 2018-507624, 32 pages.
Office Action mailed Mar. 13, 2018 for Japanese Application No. 2017-075527, 10 pages.
Office Action mailed Sep. 13, 2017 for Russian Application No. 2015106592, 6 pages.
Office Action mailed Apr. 14, 2021 for Korean Application No. 10-2020-7036811, 10 pages.
Office Action mailed Feb. 14, 2019 for Canadian Application No. 2996835, 3 pages.

(56) References Cited

OTHER PUBLICATIONS

Office Action mailed Sep. 15, 2020 for Japanese Application No. 2019-118784, 14 pages.
Office Action mailed Feb. 16, 2022 for Japanese Application No. 2019-118784, 28 pages.
Office Action mailed Aug. 17, 2016 for Korean Application No. 10-2014-7032958, 13 pages.
Office Action mailed Sep. 17, 2020 for Canadian Application No. 2995315, 4 pages.
Office Action mailed Sep. 17, 2020 for Canadian Application No. 2996342, 4 pages.
Office Action mailed Dec. 19, 2019 for Taiwan Application No. 105127627, 14 pages.
Office Action mailed Feb. 19, 2019 for Canadian Application No. 2995315, 4 pages.
Office Action mailed Jun. 19, 2020 for Canadian Application No. 2995315, 4 pages.
Office Action mailed Mar. 19, 2019 for Japanese Application No. 2018-506553, 8 pages.
Office Action mailed Mar. 19, 2019 for Japanese Application No. 2018-506575, 10 pages.
Office Action mailed Mar. 19, 2019 for Japanese Application No. 2018-506565, 4 pages.
Office Action mailed Oct. 21, 2019 for Chinese Application No. 2016800498156, 20 pages.
Office Action mailed Apr. 24, 2019 for Chinese Application No. 201710413187.1, 16 pages.
Office Action mailed Jan. 25, 2019 for European Application No. 17189951.1, 4 pages.
Office Action mailed Mar. 25, 2019 for Chinese Application No. 201610804046.8, 17 pages.
Office Action mailed Sep. 25, 2018 for European Application No. 12750765.5 filed Aug. 24, 2012, 22 pages.
Office Action mailed Dec. 26, 2017 for Chinese Application No. 201480059966.0, 29 Pages.
Office Action mailed Mar. 26, 2019 for Japanese Application No. 2018-506381, 22 pages.
Office Action mailed Sep. 26, 2018 for European Application No. 12750765.5 filed Aug. 24, 2012, 67 pages.
Office Action mailed Apr. 27, 2020 for the Brazilian Application No. 112017028539.8, 5 pages.
Office Action mailed Jul. 27, 2018 for Korean Application No. 10-2013-7033866, 22 pages.
Office Action mailed Jun. 27, 2017 for Japanese Application No. 2016-527295, 8 pages.
Office Action mailed May 27, 2020 for Russian Application No. 2019134684, 8 pages.
Office Action mailed Aug. 28, 2019 for Indian Application No. 201647014549, 6 pages.
Office Action mailed Jul. 28, 2017 for Korean Application No. 10-2016-7010831, 11 pages.
Office Action mailed Mar. 28, 2019 for Canadian Application No. 3003514, 6 pages.
Office Action mailed Aug. 29, 2019 for Korean Application No. 10-2018-7006009, 9 pages.
Office Action mailed Oct. 29, 2019 for Japanese Application No. 2018-507624, 29 pages.
Office Action mailed Sep. 29, 2015 for Japanese Application No. 2015-506185 filed Apr. 11, 2013, 5 pages.
Office Action mailed Sep. 29, 2020 for Japanese Application No. 2018-506563, 5 pages.
Office Action mailed Aug. 3, 2018 for Chinese Patent Application No. 201580034981.4, 17 pages.
Office Action mailed Dec. 3, 2019 for Japanese Application No. 2018-506381, 8 pages.
Office Action mailed Dec. 3, 2019 for Japanese Application No. 2018-521547, 4 pages.
Office Action mailed Jan. 31, 2019 for Korean Application No. 10-2018-7006009, 17 pages.
Office Action mailed Mar. 31, 2015 for Japanese Application No. 2014-519585 filed Aug. 24, 2012, 8 pages.
Office Action mailed May 4, 2018 for Chinese Application No. 201610086101.4, 7 Pages.
Office Action mailed Nov. 4, 2019 for Chinese Application No. 201680049679.0, 12 pages.
Office Action mailed Nov. 5, 2019 for Japanese Application No. 2018-506553, 12 pages.
Kaufman, et al., Application and File History for U.S. Appl. No. 14/927,529, filed Oct. 30, 2015.
Kaufman, et al., Application and File History for U.S. Appl. No. 14/927,537, filed Oct. 30, 2015.
Kaufman, et al., Application and File History for U.S. Appl. No. 15/772,382, filed Apr. 30, 2018.
Kynol, "Standard Specifications of Kynol Activated Carbon Fiber Products", published by Kynol., Sep. 19, 2013, 2 Pages.
Merriam-Webster, "Definition of Film", Available at <https://www.merriam-webster.com/dictionary/Film>, Sep. 17, 2019, 13 pages.
Patio Kits Direct, "Insulated Roof Panels", DIY Alumawood Patio Cover Kits, available at https://www.patiokitsdirect.com/about-insulation, Sep. 20, 2018, 2 pages.
Physics, "Analysis Series of Typical Examples of College Entrance Examination", Editorial Board, Heilongjiang Science and Technology Press, Dec. 31, 1995, 47 pages.
Rasidek, et al., "Effect of Temperature on Rheology Behaviour of Banana Peel Pectin Extracted Using Hot Compressed Water", Jurnal Teknologi (Sciences & Engineering), vol. 80, No. 3, Apr. 1, 2018, pp. 97-103.
Rudolph, G, "The Influence of $CO_2$ on the Sensory Characteristics of the Favor-System", BAT Cigarettenfabriken GmbH, http://legacy.library.ucsf.edu/tid/sla51f00, 1987, 24 pages.
Saleem, et al., Application and File History for U.S. Appl. No. 14/382,198 filed Aug. 29, 2014.
Shuisheng, et al., "Semisolid Processing Technology", Jinshu Bangutai Jiagong Jishu, ISBN 978-7-5024-5935-2, 2012, 10 pages.
The Engineering Toolbox, "Specific Heats for Metals", retrieved from https://www.engineeringtoolbox.com/specific-heat-metals-d_152.html, 2003, 6 pages.
Todaka, et al., "Low Curie Temperature Material for Induction Heating Self-Temperature Controlling System", Journal of Magnetism and Magnetic Materials 320, 2008, pp. e702-e707 (6 Pages).
Vasiliev, et al., Application and File History for U.S. Appl. No. 14/127,133, filed Jul. 15, 2014.
Virginia, R., "A Summary of Findings and Recommendations for the Flexible Heater", Sep. 19, 1990, 8 pages.
Warrier, et al., "Effect of the Porous Structure of Graphite on Atomic Hydrogen Diffusion and Inventory", Nuclear Fusion, vol. 47, 2007, pp. 1656-1663.
Wilke, et al., Application and File History for U.S. Appl. No. 14/840,703, filed Aug. 31, 2015.
Wilke, et al., Application and File History for U.S. Appl. No. 14/840,972, filed Aug. 31, 2015.
Wilke, et al., Application and File History for U.S. Appl. No. 15/754,809, filed Feb. 23, 2018.
Wilke, et al., Application and File History for U.S. Appl. No. 15/754,837, filed Feb. 23, 2018.
Communication pursuant to Article 94(3) EPC for Application No. 20202673.8, mailed on Aug. 12, 2022, 5 pages.
Communication pursuant to Article 94(3) EPC for Application No. 22155465.2, mailed on Aug. 5, 2022, 7 pages.
European Search Report for European Application No. 22155465.2, dated Jul. 25, 2022, 4 pages.
Extended Search Report received for European Patent Application No. 22189790.3, mailed on Jan. 24, 2023, 11 pages.
Notice of Reasons for Refusal for Japanese Application No. 2020-175447, mailed on Aug. 2, 2022, 23 pages (12 pages of English Translation and 11 pages of Official Copy).
Notice of Reasons for Refusal received for Japanese Patent Application No. 2020-181532, mailed on Jan. 17, 2023, 8 pages (4 pages of English Translation and 4 pages of Official Copy).
Office action for Japanese Application No. 2021-074266, mailed on Jul. 26, 2022, 8 pages (4 pages of English Translation and 4 pages of Official Copy).

(56) References Cited

OTHER PUBLICATIONS

Office action for Korean Application No. 10-2019-7038229, mailed on Jul. 19, 2022, 15 pages (8 pages of English Translation and 7 pages of Official Copy).
Office Action mailed Sep. 5, 2022 for Russian Application No. 2019113858, 6 pages (Official Copy Only).
Office Action mailed May 15, 2020 for the Brazilian Application No. 112018004103.3.
Office Action received for Chinese Patent Application No. 201680049874.3, mailed on Mar. 20, 2023, 14 pages (Official Copy Only).
Brief Communication Regarding Oral Proceeding received for European Patent Application No. 18157257.9, mailed on Mar. 3, 2023, 6 pages.
Search Report received for Malaysian Patent Application No. PI2021003365, mailed on Dec. 23, 2022, 1 page (English Translation Only).
Merriam-Webster, "Concurrent Definition & Meaning", Feb. 3, 2023, 14 pages.
Merriam-Webster, Consecutive Definition & Meaning, Feb. 3, 2023, 16 pages.
Merriam-Webster, Sequential Definition & Meaning, Feb. 3, 2023, 13 pages.
Notification of Reasons for Refusal mailed Feb. 1, 2016 for Japanese Application No. 2015531544, 5 pages.
Notification of Reasons for Refusal mailed May 18, 2021 for Japanese Application No. 2020126181, 8 pages.
Notification to Grant Patent Right for Invention mailed Oct. 25, 2018 for Chinese Application No. 201610086101.4, 2 pages.
Office Action and Search Report mailed May 6, 2020 for Chinese Application No. 2016800498156 filed Aug. 26, 2016, 7 pages.
Office Action and Search Report mailed Feb. 25, 2020 for Taiwan Application No. 105127626 filed Aug. 29, 2016, 14 pages.
Office Action and Search Report mailed Apr. 27, 2015 for Chinese Application No. 201280030681.5, filed Aug. 24, 2012, 25 pages.
Office Action and Search Report mailed Feb. 28, 2019 for Japanese Application No. 2018-088088, 25 pages.
Office Action and Search Report received for Russian Patent Application No. 2020135861, mailed on Apr. 13, 2021, 8 pages.
Office Action dated Feb. 15, 2021 for Ukraine Application No. 201801751, 4 pages.
Office Action dated Feb. 16, 2021 for Ukraine Application No. 201801846, 3 pages.
Office Action dated Oct. 18, 2019 for Chinese Application No. 201680049874.3, 18 pages.
Office Action dated Jan. 28, 2021 for Chinese Application No. 201680049874.3, 6 pages.
Office Action dated Aug. 5, 2020 for Chinese Application No. 201680049874.3, 6 pages.
Office Action dated Jun. 16, 2020 for Japanese Application No. 2019-065344, 10 pages.
Office Action for Brazilian Application No. 112018004103-3, mailed on Feb. 1, 2022, 4 pages.
Office Action for Brazilian Application No. 112018004110-6, mailed on Jan. 31, 2022, 4 pages.
Office Action For Canadian Application No. 3,057,903, mailed on Dec. 15, 2020, 6 Pages.
Office Action For Canadian Application No. 3,057,903, mailed on Aug. 30, 2021, 4 Pages.
Office Action For Canadian Application No. 3,057,905, mailed on Jan. 20, 2021, 6 Pages.
Office Action For Chinese Application No. 201680049479.5, mailed on Feb. 4, 2021, 8 pages.
Office Action for Chinese Application No. 201680049858.4 mailed on Jul. 3, 2020, 35 pages.
Office Action For Chinese Application No. 201680049858.4, mailed on Apr. 1, 2022, 15 pages.
Office Action for Chinese Application No. 201811073829.9, mailed Jan. 25, 2022, 9 pages.
Office Action For Chinese Application No. 201811073829.9, mailed on May 8, 2021, 25 pages.
Office Action for Chinese Application No. 201811073829.9, mailed on Sep. 15, 2021, 11 pages.
Office Action For Chinese Application No. 201880023195.8, mailed on Jun. 21, 2022, 4 pages.
Office Action For Chinese Application No. 2018800231958, mailed on Apr. 21, 2021, 17 pages.
Office Action For Chinese Application No. 2018800231958, mailed on Dec. 17, 2021, 10 pages.
Office Action For Japanese Application No. 2018-506381, mailed on Apr. 13, 2021, 5 pages.
Office Action For Japanese Application No. 2019-551462 mailed on Dec. 15, 2020, 4 pages.
Office Action For Japanese Application No. 2019-551471 mailed on Dec. 15, 2020, 8 pages.
Office Action for Japanese application No. 2019-551471, mailed on Apr. 20, 2021, 2 pages.
Office Action For Japanese Application No. 2020-067569, mailed on Nov. 9, 2021, 6 pages.
Office Action For Japanese Application No. 2020-121066, mailed on Jun. 22, 2021, 6 pages.
Office Action For Japanese Application No. 2020-126181, mailed on Nov. 30, 2021, 4 pages.
Office action for Japanese Application No. 2020-182327, mailed on Nov. 1, 2022, 4 pages.
Office Action For Japanese Application No. 2020-183056, mailed on Nov. 9, 2021, 14 pages.
Office action for Japanese Application No. 2021-074263, mailed on Jun. 14, 2022, 14 pages.
Office Action For Korean Application No. 10-2019-7032076, mailed on May 25, 2021, 4 pages.
Office Action for Korean Application No. 10-2020-7017740, mailed Feb. 8, 2022, 14 pages.
Office Action for Korean Application No. 10-2020-7017746, mailed Feb. 10, 2022, 25 pages.
Office Action For Korean Application No. 10-2020-7031372, mailed on Dec. 9, 2020, 13 pages.
Office Action For Korean Application No. 10-2021-7013743, mailed on Nov. 22, 2021, 17 pages.
Office Action for Malaysian Application No. PI2018001351, mailed on Sep. 30, 2021, 4 pages.
Office Action for Malaysian Application No. PI2018700428, dated Mar. 1, 2021, 3 pages.
Office Action For Russian Application No. 2021112978, mailed on Oct. 28, 2021, 8 pages.
Office Action For Russian Application No. 2018115288, mailed on Oct. 17, 2018, 7 pages.
Office Action For Russian Application No. 2020121132, mailed on Aug. 6, 2021, 11 pages.
Office Action For Russian Application No. 2020135756, mailed on Jun. 30, 2021, 9 pages.
Office Action mailed Sep. 6, 2017 for Korean Application No. 10-2017-7017425, 9 pages.
"A Vacuum Insulation that is Ultrathin", Chemical Engineering, Aug. 1, 2011, 5 pages.
"Atomization Device Applicable to Solid Tobacco Materials and Electronic Cigarette", CN203762288U, retrieved from Google Patents <https://patents.google.com/patenUCN203762288U/en> on Jan. 12, 2018, 10 pages.
Brief Communication For European Application No. 12750765.5, mailed on Aug. 31, 2021, 16 pages.
Chinese First Office Action for Chinese Application No. 200980152395.4 date issued Dec. 3, 2012, 16 pages.
Chinese Office Action for Chinese Application No. 201480024978.X dated Jan. 18, 2017, 8 pages.
Chinese Office Action, Application No. 201480024988.3, dated Dec. 30, 2016, 26 pages.
Chinese Office Action, Application No. 201480024988.3, dated Sep. 11, 2017, 10 pages.
Chinese Office Action, Application No. 201580022356.8, dated Jul. 18, 2018, 15 pages.

(56) References Cited

OTHER PUBLICATIONS

Chinese Office Action, Application No. 201610371843.1, dated Sep. 30, 2018, 8 pages.
Chinese Office Action, Chinese Application No. 2016800498584, mailing date Jul. 1, 2021, 13 pages.
Communication of a Notice of Opposition, dated Nov. 25, 2020, for European Patent Application No. 13716763.1, 26 pages.
Communication pursuant to Article 94(3) EPC for Application No. 16766233.7 mailed on Mar. 7, 2022, 5 pages.
Communication Pursuant to Article 94(3) EPC for Application No. 16766234.5 mailed on Mar. 7, 2022, 15 pages.
"Company Filtrona Richmond Inc.", http://www.filtronaporoustechnologies.com, Nov. 19, 2018, 1 Page.
Decision of Rejection mailed Apr. 15, 2022 for Chinese Application No. 20168009479.5, 7 pages.
Decision to Grant a Patent mailed Apr. 5, 2022 for Japanese Application No. 2020-182759, 5 pages.
Decision to Grant a Patent received for Japanese Application No. 2015-506185 filed Apr. 11, 2013, mailed on Nov. 15, 2016, 5 pages.
Decision to Grant, Russian Application No. 2011120430, dated Apr. 1, 2014, 16 pages.
English translation of CN101390659 dated Aug. 3, 2017, 8 pages.
English Translation of Japanese Office Action, Application No. 2018-521547, dated Jun. 25, 2019, 4 pages.
European Extended Search Report for Application No. 19216472.1 mailed on Apr. 22, 2020, 13 pages.
European Extended Search Report for European Application No. 201576220, dated May 28, 2020, 12 pages.
European Extended Search Report, Application No. 17189951.1, dated Jan. 4, 2018, 11 pages.
European Notice of Opposition, Application No. 13759537.7, dated Jan. 23, 2020, 83 pages.
European Search Report for European U.S. Appl. No. 15/178,588 dated Apr. 14, 2016, 2 pages.
European Search Report for European U.S. Appl. No. 16/166,656 dated Oct. 11, 2016, 9 pages.
Examination Report for Canadian Application No. 2,845,754, mailed on Aug. 19, 2021, 6 pages.
Examination Report for Canadian Application No. 2,845,754, mailed on Nov. 4, 2020, 5 pages.
Examination Report for Indian Application No. 201947043640, mailed on Aug. 11, 2020, 7 Pages.
Examination Report for Indonesian Application No. P00201908524, mailed on Dec. 24, 2021, 5 pages.
Examination Report for Indonesian Application No. P00201908525, mailed on Dec. 24, 2021, 5 pages.
Examination Report No. 1 for Australian Application No. 2020294182, mailed on Mar. 5, 2022, 3 Pages.
Examination Report received for Australian Patent Application No. 2016204192, mailed on Feb. 21, 2018, 7 pages.
Examination Report received for New Zealand Patent Application No. 718007, mailed on Aug. 1, 2016, 4 pages.
Examination Report received for Philippines Patent Application No. Jan. 2016/500805, mailed on Jan. 9, 2019, 6 pages.
Extended European Search Report for Application No. 18205608.5, mailed on Jul. 12, 2019, 7 pages.
Extended European Search Report for Application No. 19164405.3 mailed on Aug. 28, 2019, 6 pages.
Extended European Search Report for Application No. 19165045.6 mailed on Sep. 6, 2019, 7 pages.
Extended European Search Report for Application No. 20179569.7 mailed on Oct. 2, 2020, 10 pages.
Extended European Search Report for Application No. 20205043.1, mailed on May 4, 2021, 10 pages.
Extended European Search Report for Application No. 20205057 .1, mailed on Oct. 19, 2021, 20 pages.
Extended European Search Report for Application No. 20205071.2, mailed on Jul. 16, 2021, 8 pages.
Extended European Search Report for Application No. 21170791.4, mailed on Jun. 28, 2022, 15 pages.
Extended European Search Report for Application No. 21170804.5, mailed on Feb. 21, 2022, 13 pages.
Extended European Search Report for Application No. 21171022.3, mailed on Dec. 3, 2021, 8 pages.
Extended European Search Report for Application No. 21192233.1, mailed on Dec. 9, 2021, 11 pages.
Extended European Search Report for Application No. EP20205075. 3, mailed on Jan. 27, 2021, 11 pages.
Extended European Search Report For Application No. 20205544.8 mailed on Jun. 14, 2021, 9 pages.
Extended European Search Report For European Application No. 20206770.8, mailed on Mar. 3, 2021, 10 pages.
Extended European Search Report received for Application No. 15200661.5, mailed on May 18, 2016, 6 pages.
Extended European Search Report received for Application No. 18157257.9, mailed on Jun. 28, 2018, 7 pages.
First Office Action mailed Nov. 1, 2019 for Chinese Application No. 2016800498584, 6 pages.
First Office Action mailed Jun. 15, 2015 and Search Report mailed Jun. 2, 2015 for Chinese Application No. 201280029784.X, filed Aug. 24, 2012, 27 pages.
First Office Action mailed Dec. 3, 2015 for Chinese Application No. 201380021387.2, filed Apr. 11, 2011, 20 pages.
First Office Action mailed May 5, 2016 for Chinese Application No. 201380048636.7, 25 pages.
Fourth Office Action and Search Report for Chinese Application No. 201680049479.5 mailed on Nov. 18, 2021, 20 pages.
Fourth Office Action and Search Report for Chinese Application No. 2016800498584 mailed on Jan. 6, 2022, 21 pages.
International Search Report for Application No. PCT/US2019/049076, mailed on Dec. 18 2019, 4 Pages.
International Preliminary Report on Patentability for Application No. PCT/EP2012/066484, mailed on Mar. 20, 2014, 7 pages.
International Preliminary Report on Patentability for Application No. PCT/EP2012/066485, mailed on Dec. 20, 2013, 12 pages.
International Preliminary Report on Patentability for Application No. PCT/EP2012/066486, mailed on Oct. 22, 2013, 10 pages.
International Preliminary Report on Patentability for Application No. PCT/EP2012/066523, mailed on Nov. 4, 2013, 9 pages.
International Preliminary Report on Patentability for Application No. PCT/EP2012/066524, mailed on Oct. 17, 2013, 11 pages.
International Preliminary Report on Patentability for Application No. PCT/EP2012/066525, mailed on Mar. 20, 2014, 8 pages.
International Preliminary Report on Patentability for Application No. PCT/EP2013/057539, mailed on Nov. 6, 2014, 10 pages.
International Preliminary Report on Patentability for Application No. PCT/EP2013/068797, mailed Mar. 31, 2015, 5 pages.
International Preliminary Report on Patentability for Application No. PCT/EP2014/063785, mailed on Jun. 1, 2015, 12 pages.
International Preliminary Report on Patentability for Application No. PCT/EP2014/072828, mailed on May 12, 2016, 7 pages.
International Preliminary Report on Patentability for Application No. PCT/EP2015/064595, mailed on Oct. 25, 2016, 20 pages.
International Preliminary Report on Patentability for Application No. PCT/EP2016/070176, mailed Mar. 15, 2018, 12 pages.
International Preliminary Report on Patentability for Application No. PCT/EP2016/070178, mailed Mar. 15, 2018, 8 pages.
International Preliminary Report on Patentability for Application No. PCT/EP2016/070182, mailed Mar. 15, 2018, 8 pages.
International Preliminary Report on Patentability for Application No. PCT/EP2016/070185, mailed Mar. 15, 2018, 11 pages.
International Preliminary Report on Patentability for Application No. PCT/EP2016/070188, mailed Mar. 15, 2018, 8 pages.
International Preliminary Report on Patentability for Application No. PCT/EP2016/070191, mailed Mar. 15, 2018, 8 pages.
International Preliminary Report on Patentability for Application No. PCT/EP2016/075734, mailed May 11, 2018, 7 pages.
International Preliminary Report on Patentability for Application No. PCT/EP2016/075739, mailed Jan. 16, 2018, 7 pages.
International Preliminary Report on Patentability for Application No. PCT/EP2018/057835 mailed on Oct. 10, 2019, 15 Pages.
International Preliminary Report on Patentability for Application No. PCT/GB2013/052433, mailed Mar. 24, 2015, 9 pages.

(56) References Cited

OTHER PUBLICATIONS

International Preliminary Report on Patentability for Application No. PCT/GB2017/051139, mailed on Aug. 6, 2018, 7 pages.
International Preliminary Report on Patentability for Application No. PCT/US2012/066523, mailed on Jun. 4, 2015, 6 pages.
International Preliminary Report on Patentability for corresponding International Application No. PCT/GB2015/051213 mailed on Jul. 14, 2016, 20 pages.
International Preliminary Report on Patentability issued Aug. 13, 2013 for International Application No. PCT/AT2012/000017, 5 pages.
International Preliminary Report on Patentability, dated Apr. 22, 2014, for International Patent Application No. PCT/EP2012/070647, filed Oct. 18, 2012, 8 pages.
International Preliminary Report on Patentabilityfor Application No. PCT/EP2018/057834, mailed on Oct. 10, 2019, 13 Pages.
International Search Report and Written Opinion for Application No. PCT/AT2011/000123, mailed on Jul. 18, 2011, 15 pages.
International Search Report and Written Opinion for Application No. PCT/EP2012/066484, mailed on Jan. 9, 2013, 9 pages.
International Search Report and Written Opinion for Application No. PCT/EP2012/066485, mailed on Dec. 10, 2012, 10 pages.
International Search Report and Written Opinion for Application No. PCT/EP2012/066486, mailed on Jan. 14, 2013, 8 pages.
International Search Report and Written Opinion for Application No. PCT/EP2012/066523, mailed on Jan. 9, 2013, 9 pages.
International Search Report and Written Opinion for Application No. PCT/EP2012/066524, mailed on Jan. 9, 2013, 8 pages.
International Search Report and Written Opinion for Application No. PCT/EP2012/066525, mailed on Jan. 9, 2013, 10 pages.
International Search Report and Written Opinion for Application No. PCT/EP2013/057539, mailed on Feb. 11, 2014, 16 Pages.
International Search Report and Written Opinion for Application No. PCT/EP2013/068797, mailed Dec. 9, 2013, 8 pages.
International Search Report and Written Opinion for Application No. PCT/EP2014/063785, mailed on Oct. 30, 2014, 10 pages.
International Search Report and Written Opinion for Application No. PCT/EP2014/064365, mailed on Oct. 7, 2014, 11 pages.
International Search Report and Written Opinion for Application No. PCT/EP2014/072828, mailed Jun. 16, 2015 10 pages.
International Search Report and Written Opinion for Application No. PCT/EP2016/070176, mailed Apr. 19, 2017, 21 Pages.
International Search Report and Written Opinion for Application No. PCT/EP2016/070178, mailed Dec. 14, 2016, 10 pages.
International Search Report and Written Opinion for Application No. PCT/EP2016/070182, mailed Dec. 12, 2016, 11 pages.
Office Action mailed Nov. 5, 2019 for Japanese Application No. 2018-506565, 12 pages.
Office Action mailed Apr. 7, 2015 for Japanese Application No. 2014-519586 filed Aug. 24, 2012, 10 pages.
Office Action mailed Feb. 7, 2019 for Korean Application No. 10-2018-7006070, 9 pages.
Office Action mailed May 7, 2019 for Japanese Application No. 2018-506563, 4 pages.
Office Action mailed Feb. 8, 2019 for Korean Application No. 10-2018-7006077, 15 pages.
Office Action mailed Jan. 8, 2019 for Japanese Application No. 2017-075527, 15 pages.
Office action mailed Sep. 8, 2020 for Japanese Application No. 2018-507624, 7 pages.
Office Action mailed Jun. 9, 2020 for Chinese Application No. 201680061969.7, 15 pages.
Office Action mailed May 9, 2017 for Chinese Application No. 201480037049.2, 28 pages.
Office Action mailed for Japanese Application No. 2017-017842, mailed on Dec. 12, 2017, 6 pages.
Office Action mailed on Oct. 20, 2022 for U.S. Appl. No. 16/948,553, filed Sep. 23, 2020, 9 pages.
Office Action received for Australian Patent Application No. 2020235037, mailed on May 26, 2022, 3 pages.
Office Action received for Chinese Patent Application No. 2013800472843, mailed on Nov. 13, 2017, 13 pages.
Office Action received for Chinese Patent Application No. 201710412726.X, mailed on Apr. 24, 2019, 21 pages.
Office Action received for European Application No. 12750771.3, mailed on Jan. 11, 2019, 44 pages.
Office Action received for European Patent Application No. 12750771.3, mailed on Jan. 24, 2019, 40 pages.
Office Action received for European Patent Application No. 12750771.3, mailed on Jan. 25, 2019, 2 pages.
Office Action received for Japanese Patent Application No. 2016-522550, mailed on Jan. 31, 2017, 7 Pages.
Office Action received for Japanese Patent Application No. 2016-522550, mailed on Jul. 4, 2017, 7 Pages.
Office Action received for Japanese Patent Application No. 2016-522550, mailed on Nov. 14, 2017, 6 pages.
Office Action received for Japanese Patent Application No. 2016-575543, mailed on Dec. 4, 2018, 19 pages.
Office Action received for Korean Application No. 10-2017-7017430, mailed on Sep. 6, 2017, 9 pages.
Office Action received for Korean Patent Application No. 10-2017-7008071, mailed on Mar. 20, 2019, 2 pages.
Office Action received for Korean Patent Application No. 10-2017-7008071, mailed on Mar. 20, 2019, 3 pages.
Office Action received for Korean Patent Application No. 10-2017-7008071, mailed on May 11, 2018, 17 pages.
Office Action received for Korean Patent Application No. 10-2018-7017575, mailed on Jan. 23, 2019, 9 pages.
Office Action received for Korean Patent Application No. 10-2018-7019884, mailed on Apr. 5, 2019, 8 Pages.
Office Action received for Russian Patent Application No. 2018101312, mailed on Jul. 4, 2018, 11 pages.
Office Action received for Russian Patent Application No. 2021126540, mailed on May 20, 2022, 8 pages.
Partial European Search Report for Application No. 20205057.1, mailed on Apr. 29, 2021, 16 pages.
Partial European Search Report for Application No. 21170791.4, mailed on Nov. 22, 2021, 16 pages.
"Polyetheretherketone", Online Catalog Source, available at <www.goodfellow.com/A/Polyethertherketone.html>, retrieved on Jan. 17, 2020, 4 pages.
Russian Office Action, Application No. 2015146847/12, dated Sep. 22, 2017, 11 pages.
Russian Office Action, Application No. 2014120213/12, dated Oct. 26, 2016, 7 pages.
Russian Search Report for Russian Application No. 2015146843/12 (072088) date completed Apr. 24, 2017, 3 pages.
"Scientific Principles", University of Illinois, retrieved from: <http://matse1.matse.illinois.edu/ceramics/prin.html>, Accessed on Jun. 15, 2017, 13 pages.
Search Report for Japanese Application No. 2020-521547, mailed on Jun. 14, 2019, 22 pages.
Search Report mailed Apr. 14, 2017 for Japanese Application No. 2016-134648, 31 pages.
Search Report mailed Jan. 17, 2013 for Great Britain Application No. 1216621.1, 6 pages.
Search Report mailed Sep. 19, 2013 for Japanese Application No. 2011-532464, 116 pages.
Search Report mailed Mar. 24, 2015 for Chinese Application No. 201280029767.6 filed Aug. 24, 2012, 6 pages.
Search Report mailed Apr. 25, 2018 for Chinese Application No. 201610086101.4, 1 page.
Search Report mailed Aug. 25, 2015 for Japanese Application No. 2014-179732, 10 pages.
Search Report mailed Oct. 25, 2017 for Japanese Application No. 2016-864977, 19 pages.
Search Report mailed Apr. 29, 2019 for Russian Application No. 2018137501, 12 pages.
Second Office Action mailed Jan. 16, 2017 for Chinese Application No. 201380048636.7, 24 pages.
Second Office Action mailed Aug. 20, 2013 for Chinese Application No. 200980152395.4, 16 pages.

(56) References Cited

OTHER PUBLICATIONS

Summons to Attend Oral Proceedings pursuant to Rule 115(1) EPC mailed May 24, 2022 for European Application No. 18157257.9, 16 pages.
The opposition to petition not to grant of a patent for the Vietnam Application No. 1-2014-03877, mailed on Apr. 27, 2018, 35 pages.
"Thermofoil™ Heaters", Minco Products Inc., Bulletin HS-202(D), Jul. 22, 2004, 60 pages.
International Search Report and Written Opinion for Application No. PCT/EP2016/070185, mailed Apr. 4, 2017, 16 pages.
International Search Report and Written Opinion for Application No. PCT/EP2016/070188, mailed Dec. 13, 2016, 10 pages.
International Search Report and Written Opinion for Application No. PCT/EP2016/070191, mailed Dec. 13, 2016, 10 pages.
International Search Report and Written Opinion for Application No. PCT/EP2016/085686, mailed May 9, 2019, 16 pages.
International Search Report and Written Opinion for Application No. PCT/EP2018/057834, mailed on Nov. 6, 2018, 20 Pages.
International Search Report and Written Opinion for Application No. PCT/GB2013/052433, mailed Jun. 30, 2014, 16 pages.
International Search Report and Written Opinion for Application No. PCT/GB2017/051139, mailed on Aug. 9, 2017, 14 pages.
International Search Report and Written Opinion for International Application No. PCT/EP2012/003103, mailed Nov. 26, 2012, 6 pages.
International Search Report and Written Opinion for PCT/GB2014/051333 mailed Jul. 17, 2014, 10 pages.
International Search Report and Written Opinion mailed Feb. 6, 2013 for PCT/EP2012/070647 filed Oct. 18, 2012, 9 pages.
International Search Report and Written Opinion received for Application No. PCT/US2012/066523, mailed on May 29, 2013, 7 pages.
International Search Report and Written Opinion received for PCT Patent Application No. PCT/EP2020/056231, mailed on Jul. 15, 2020, 11 pages.
International Search Report and Written Opinion received for PCT Patent Application No. PCT/AT2012/000017, mailed on Jul. 3, 2012, 13 pages.
International Search Report and Written Opinion received for PCT Patent Application No. PCT/EP2018/057835, mailed on Nov. 6, 2018, 26 Pages.
International Search Report and Written Opinion, Application No. PCT/EP2016/075734, dated Apr. 6, 2017, 12 pages.
International Search Report and Written Opinion, International Application No. PCT/GB2014/051332 mailed Jul. 21, 2014, 8 pages.
International Search Report and Written Opinion, International Application No. PCT/GB2014/051334 mailed Jul. 21, 2014, 8 pages.
International Search Report and Written Opinion, International Application No. PCT/EP2016/075739, mailed Feb. 24, 2017, 10 pages.
International Search Report for corresponding International Application No. PCT/GB2015/051213 mailed on Jul. 16, 2015, 5 pages.
International Search Report for International Application No. PCT/AT2009/000413 mailed on Jan. 25, 2010, 3 pages.
International Search Report for International Application No. PCT/AT2009/000414 mailed on Jan. 26, 2010, 2 pages.
International Search Report received for PCT Application No. PCT/EP2015/064595, mailed on Jan. 5, 2016, 6 pages.
Invitation to Pay Additional Fees received for PCT Patent Application No. PCT/EP2018/057835, mailed on Jul. 17, 2018, 20 Pages.
Invitation to Pay Additional Fees with Partial International Search for Application No. PCT/EP2018/057834 mailed Jul. 13, 2018, 18 Pages.
IPRP mailed Aug. 5, 2015 for International Application No. PCT/GB2014/051333, 12 pages.
Iprp, International Application No. PCT/GB2014/051332 mailed Nov. 12, 2015, 7 pages.
Iprp, International Application No. PCT/GB2014/051334 mailed Nov. 12, 2015, 7 pages.
Japanese Decision to Grant, Application No. 2016-134648, mailed May 22, 2018, 5 pages.
Japanese Decision to Grant, application No. 2011-532464 Aug. 5, 2014, 6 pages.
Japanese Notice of Reasons for Rejection for Japanese Application No. 2015-137361 mailing dated May 31, 2016, 6 pages.
Japanese Notice of Reasons for Rejection mailed Oct. 7, 2013 for Japanese Application No. 2011532464, 6 pages.
Japanese Notice of Reasons for Rejection mailed Sep. 8, 2015 for Japanese Application No. 2014179732, 5 pages.
Japanese Office Action, Application No. 2016-564977, dated Dec. 5, 2017, 6 pages.
Japanese Office Action, Application No. 2018-519865, dated Jun. 25, 2019, 3 pages.
Japanese Reasons for Rejection for Japanese Application No. 2016134648 mailed May 23, 2017, 18 pages.
"Kapton (Polyimide) Flexible Heaters", National Plastic Heater, Sensor and Control Inc., retrieved from https://www.kapton-silicone-flexible-heaters.com/products/kapton_polyimide_flexible_heaters.html on Feb. 23, 2018, 2011, 2 pages.
Korean Office Action Application No. 1020197037986, dated Feb. 6, 2020, 11 pages.
"NeoMax MS-135", from NeoMax Materials Co., Ltd., described at the following URL: http://www.neomax-materials.co.jp/eng/pr0510.htm, Oct. 30, 2015, 2 pages.
Notice of Opposition dated Mar. 7, 2017 for European Application No. 12750770.5, 22 pages.
Notice of Opposition Letter from EPO. Opposition against: EP2358418 dated Mar. 1, 2017, 60 pages.
Notice of Opposition mailed Sep. 20, 2021 for European Application No. 18157257.9 (EP3354144), 31 pages.
Notice of Reasons for Refusal mailed Nov. 2, 2021 for Japanese Application No. 2020- 182712, 6 pages.
Notice of Reasons for Refusal mailed Jan. 25, 2022 for Japanese Application No. 2020-183045, 9 pages.
Notice of Reasons for Rejection for Japanese Application No. 2020-181532, mailed on Jun. 21, 2022, 6 pages.
Notice of Reasons for Rejection for Japanese Application No. 2020-181533, mailed on Apr. 26, 2022, 3 pages.
Notice of Reasons for Rejection for Japanese Application No. 2020-182759, dated Oct. 12, 2021, 5 pages.
Notice of Reasons for Rejection for Japanese Application No. 2020-182762, mailed on Dec. 7, 2021, 9 pages.
Notice of Reasons for Rejection for Japanese Application No. 2021-078359, mailed on Jun. 28, 2022, 6 pages.
Notice of Reasons for Rejection mailed Jan. 19, 2022 for Japanese Application No. 2020-183046, 6 pages.
Notice of Reasons for Rejection mailed Apr. 26, 2022 for Japanese Application No. 2022-013252, 4 pages.
"International Preliminary Report on Patentability for Application No. PCT/EP2019/070708, mailed on Feb. 11, 2021", 10 pages.
"International Search Report and Written Opinion received for PCT Patent Application No. PCT/EP2019/070708, mailed on Oct. 12, 2019", 14 Pages.
"Office Action received for Chinese Patent Application No. 201980051033.X, mailed on Feb. 23, 2022", 31 pages (16 pages of English Translation and 15 pages of Official Copy).
"Office Action received for Korean Patent Application No. 10-2021-7005922, mailed on Jan. 2, 2023", 14 pages (8 pages of English Translation and 6 pages of Official Copy).
"Office Action received for Korean Patent Application No. 10-2023-7019163, mailed on Jul. 11, 2023", 12 pages (7 pages of English Translation and 5 pages of Official Copy).
"Office Action received for Russian Patent Application No. 2021104417, mailed on Nov. 28, 2022", 11 pages (3 pages of English Translation and 8 pages of Official Copy).
"Office Action received for Ukrainian Patent Application No. a202100368, mailed on Jul. 4, 2023", 11 pages (6 pages of English Translation and 5 pages of Official copy).

(56) References Cited

OTHER PUBLICATIONS

Aerosols, "Pulmonary Pharmacology: Delivery Devices and Medications", available at http://www.ceu.org/cecourses/z98207/ch4.htm, Sep. 6, 2017, 2 pages.

"Extended European Search Report received for European Patent Application No. 23185381.3, mailed on Nov. 6, 2023", 10 pages.

"Notice of Reasons for Rejection received for Japanese Patent Application No. 2021-504508, mailed on Aug. 15, 2023", 6 pages (3 pages of English Translation and 3 pages of Official Copy).

"Notice of Reasons for Rejection received for Japanese Patent Application No. 2022-115714, mailed on Jul. 25, 2023", 8 pages (4 pages of English Translation and 4 pages of Official Copy).

"Statement Setting Out the Grounds of Appeal received for European Patent Application No. 18157257.9, mailed on Sep. 5, 2023", 36 pages.

\* cited by examiner

HEATING SMOKEABLE MATERIAL

PRIORITY CLAIM

This application is a continuation application of U.S. patent application Ser. No. 16/948,553, filed Sep. 23, 2020, which is a continuation application of U.S. patent application Ser. No. 14/127,144, filed Mar. 31, 2014, which is a National Stage Entry of and claims priority under 35 U.S.C. §§ 365 and 371 to PCT Application Serial No. PCT/EP2012/066524, filed Aug. 24, 2012 and entitled "Heating Smokeable Material" which in turn claims priority to Russian Application Serial No. 2011136 869, filed Sep. 6, 2011, and entitled "Heating Smokeable Material" and to British Application Serial No. 1207054.6, filed Apr. 23, 2012, and entitled "Heating Smokeable material." The entire contents of the aforementioned applications are herein expressly incorporated by reference.

FIELD

The disclosure relates to heating smokeable material.

BACKGROUND

Smoking articles such as cigarettes and cigars burn tobacco during use to create tobacco smoke. Attempts have been made to provide alternatives to these smoking articles by creating products which release compounds without creating tobacco smoke. Examples of such products are so-called heat-not-burn products which release compounds by heating, but not burning, tobacco.

SUMMARY

According to the disclosure, there is provided an apparatus comprising a heater configured to heat smokeable material to volatilize at least one component of the smokeable material, wherein the heater is elongate and comprises a plurality of independently controllable heating regions arranged sequentially along a longitudinal axis of the heater.

A length of each heating region may be less than a length of the heater.

Each heating region may comprise a longitudinal heating element having a length which is less than a length of the heater.

The heating regions may be arranged in end-to-end relationship along the longitudinal axis of the heater.

The heater may comprise a longitudinal surface which extends over the plurality of heating regions.

The heater may be configured to heat smokeable material located around an outside of the longitudinal surface of the heater.

Each heating region may comprise a disk-shaped section of heater.

The heater may be arranged along a longitudinal axis of the apparatus and smokeable material may be located co-axially outwardly of a longitudinal surface of the heater.

The smokeable material may comprise a substantially tubular body of smokeable material.

The heater may be configured to heat smokeable material located inside a longitudinal surface of the heater.

Each heating region may comprise a ring-shaped section of heater.

The heater may be arranged along a longitudinal axis of the apparatus and smokeable material may be located co-axially inwardly of a longitudinal surface of the heater.

The heater may comprise an embossed exterior surface configured to heat smokeable material.

The heater may be substantially cylindrical in shape.

Each heating region may comprise a substantially cylindrical section of the heater.

The heater may be configured to heat the smokeable material to a temperature in a range of approximately 100° C. to 250° C., such as temperature in a range of approximately 150° C. to approximately 250° C.

Each heating region may be arranged to heat a different section of the smokeable material.

The apparatus may comprise a controller configured to activate the heating regions sequentially over a period of time.

The controller may be configured to activate each heating region in response to a puff.

The heater may be a substantially ceramics heater responsive to electrical energy to emit thermal energy.

The apparatus may be configured to heat the smokeable material without combusting the smokeable material.

According to the disclosure, there is provided a heater configured to heat smokeable material to volatilize at least one component of the smokeable material, wherein the heater comprises a plurality of independently controllable heating regions arranged sequentially along a longitudinal axis of the heater.

According to an aspect of the disclosure, there is provided an apparatus configured to heat smokeable material to volatilize at least one component of the smokeable material, comprising an infra-red heater.

The infra-red heater may comprise a halogen infra-red heater.

BRIEF DESCRIPTION OF THE FIGURES

For exemplary purposes only, embodiments of the disclosure are described below with reference to the accompanying figures in which.

DETAILED DESCRIPTION

Figure 1:
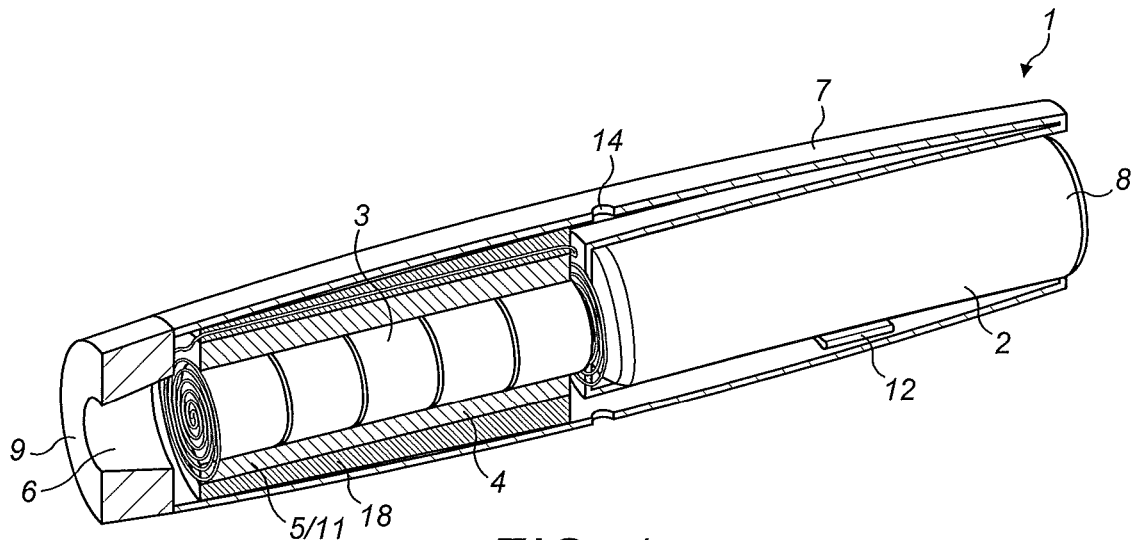
FIG. 1 is a perspective, partially cut-away illustration of an apparatus configured to heat smokeable material to release aromatic compounds and/or nicotine from the smokeable material.

As used herein, the term 'smokeable material' includes any material that provides volatilized components upon heating and includes any tobacco-containing material and may, for example, include one or more of tobacco, tobacco derivatives, expanded tobacco, reconstituted tobacco or tobacco substitutes.

An apparatus 1 for heating smokeable material comprises an energy source 2, a heater 3 and a heating chamber 4. The energy source 2 may comprise a battery such as a Li-ion battery, Ni battery, Alkaline battery and/or the like, and is electrically coupled to the heater 3 to supply electrical energy to the heater 3 when required. The heating chamber 4 is configured to receive smokeable material 5 so that the smokeable material 5 can be heated in the heating chamber 4. For example, the heating chamber 4 may be located adjacent to the heater 3 so that thermal energy from the heater 3 heats the smokeable material 5 therein to volatilize aromatic compounds and nicotine in the smokeable material 5 without burning the smokeable material 5. A mouthpiece 6 is provided through which a user of the apparatus 1 can inhale the volatilized compounds during use of the apparatus 1. The smokeable material 5 may comprise a tobacco blend.

As shown in FIG. 1, the heater 3 may comprise a substantially cylindrical, elongate heater 3 and the heating chamber 4 is located around a circumferential, longitudinal surface of the heater 3. The heating chamber 4 and smokeable material 5 therefore comprise co-axial layers around the heater 3. However, as will be evident from the discussion below, other shapes and configurations of the heater 3 and heating chamber 4 can alternatively be used.

A housing 7 may contain components of the apparatus 1 such as the energy source 2 and heater 3. As shown in FIG. 1, the housing 7 may comprise an approximately cylindrical tube with the energy source 2 located towards its first end 8 and the heater 3 and heating chamber 4 located towards its opposite, second end 9. The energy source 2 and heater 3 extend along the longitudinal axis of the housing 7. For example, as shown in FIG. 1, the energy source 2 and heater 3 can be aligned along the central longitudinal axis of the housing 7 in an end-to-end arrangement so that an end face of the energy source 2 faces an end face of the heater 3. The length of the housing 7 may be approximately 130 mm, the length of energy source may be approximately 59 mm, and the length of the heater 3 and heating region 4 may be approximately 50 mm. The diameter of the housing 7 may be between approximately 15 mm and approximately 18 mm. For example, the diameter of the housing's first end 8 may be 18 mm whilst the diameter of the mouthpiece 6 at the housing's second end 9 may be 15 mm. The diameter of the heater 3 may be between approximately 2.0 mm and approximately 6.0 mm. The diameter of the heater 3 may, for example, be between approximately 4.0 mm and approximately 4.5 mm or between approximately 2.0 mm and approximately 3.0 mm. Heater diameters outside these ranges may alternatively be used. The depth of the heating chamber 4 may be approximately 5 mm and the heating chamber 4 may have an exterior diameter of approximately 10 mm at its outwardly-facing surface. The diameter of the energy source 2 may be between approximately 14.0 mm and approximately 15.0 mm, such as 14.6 mm.

Heat insulation may be provided between the energy source 2 and the heater 3 to prevent direct transfer of heat from one to the other. The mouthpiece 6 can be located at the second end 9 of the housing 7, adjacent the heating chamber 4 and smokeable material 5. The housing 7 is suitable for being gripped by a user during use of the apparatus 1 so that the user can inhale volatilized smokeable material compounds from the mouthpiece 6 of the apparatus 1.

Figure 2:
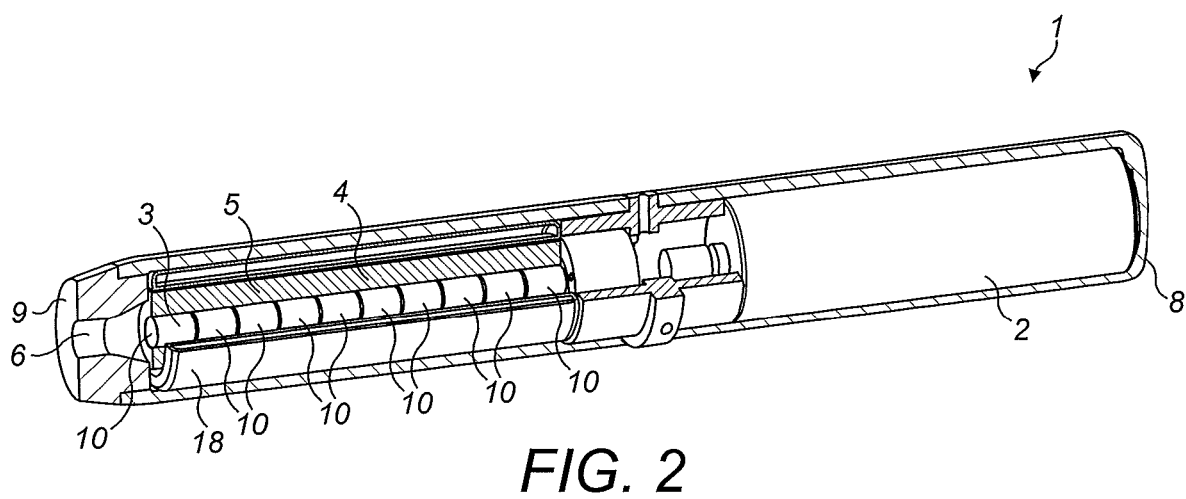
FIG. 2 is a perspective, partially cut-away illustration of an apparatus configured to heat smokeable material, in which the smokeable material is provided around an elongate ceramic heater divided into radial heating sections.
Figure 3:
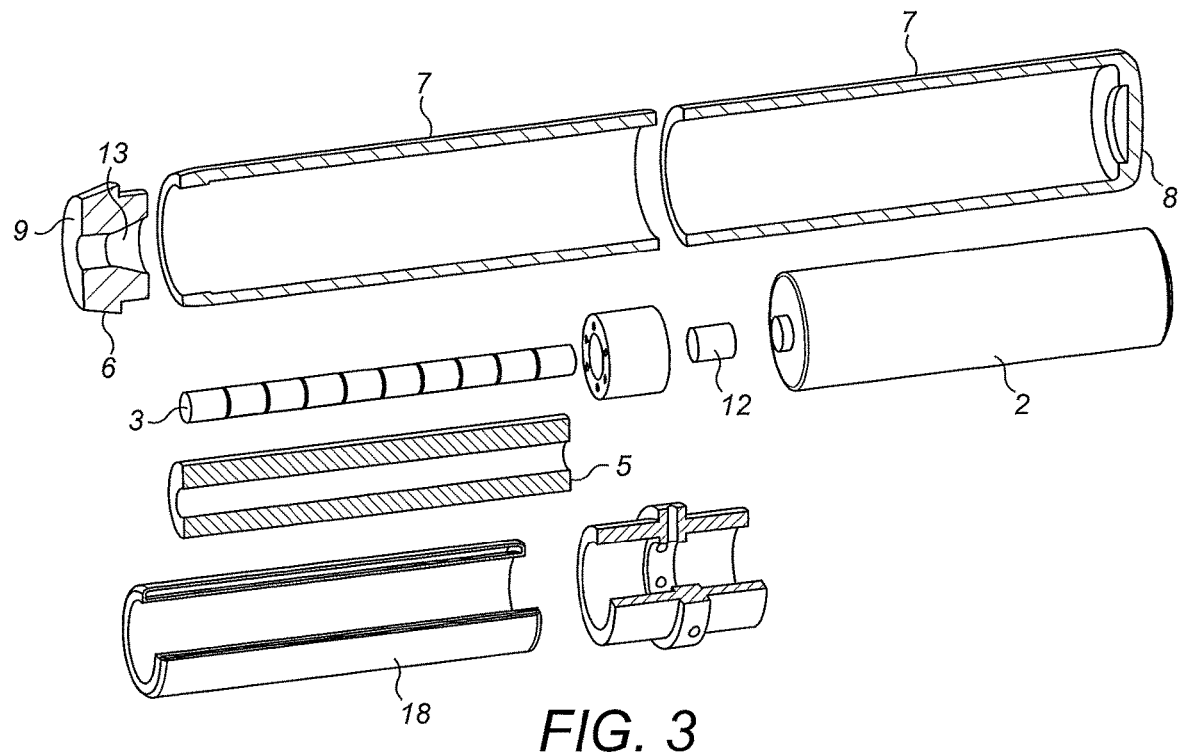
FIG. 3 is an exploded, partially cut-away view of an apparatus configured to heat smokeable material, in which the smokeable material is provided around an elongate ceramic heater divided into radial heating sections.
Figure 4:
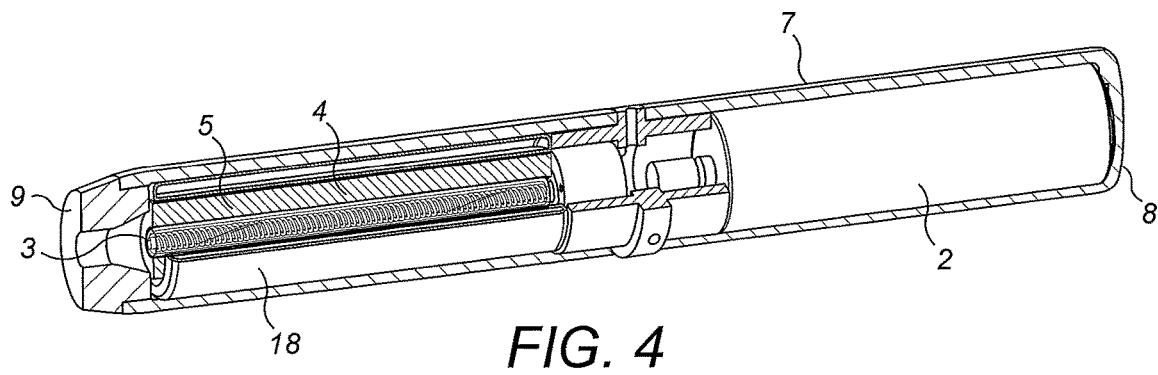
FIG. 4 is a perspective, partially cut-away illustration of an apparatus configured to heat smokeable material, in which the smokeable material is provided around an elongate infra-red heater.
Figure 5:
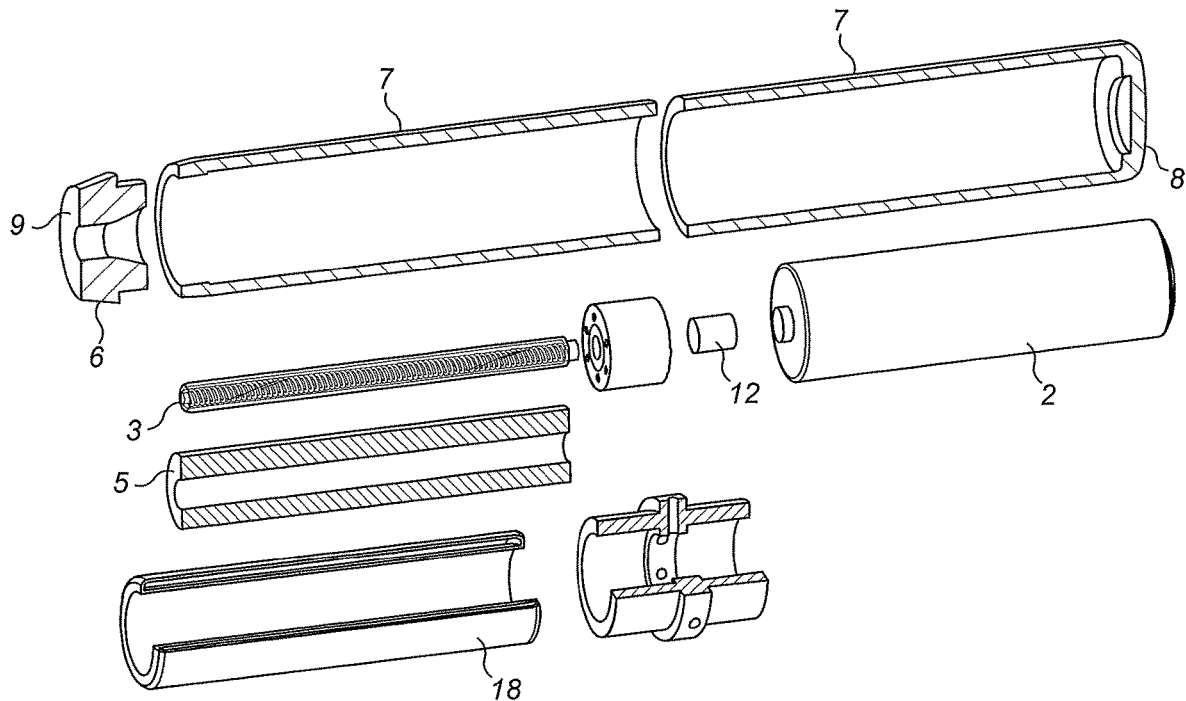
FIG. 5 is an exploded, partially cut-away illustration of an apparatus configured to heat smokeable material, in which the smokeable material is provided around an elongate infra-red heater.

Referring to FIGS. 2 and 3, the heater 3 may comprise a ceramics heater 3. The ceramics heater 3 may, for example, comprise base ceramics of alumina and/or silicon nitride which are laminated and sintered. Alternatively, referring to FIGS. 4 and 5, the heater 3 may comprise an infra-red (IR) heater 3 such as a halogen-IR lamp 3. The IR heater 3 may have a low mass and therefore its use can help to reduce the overall mass of the apparatus 1. For example, the mass of the IR heater may be 20% to 30% less than the mass of a ceramics heater 3 having an equivalent heating power output. The IR heater 3 also has low thermal inertia and therefore is able to heat the smokeable material 5 very rapidly in response to an activation stimulus. The IR heater 3 may be configured to emit IR electromagnetic radiation of between approximately 700 nm and 4.5 μm in wavelength.

As indicated above and shown in FIG. 1, the heater 3 may be located in a central region of the housing 7 and the heating chamber 4 and smokeable material 5 may be located around the longitudinal surface of the heater 3. In this arrangement, thermal energy emitted by the heater 3 travels in a radial direction outwards from the longitudinal surface of the heater 3 into the heating chamber 4 and the smokeable material 5.

The heater 3 may optionally comprise a plurality of individual heating regions 10. The heating regions 10 may be operable independently of one another so that different regions 10 can be activated at different times to heat the smokeable material 5. The heating regions 10 may be arranged in the heater 3 in any geometric arrangement. However, in the examples shown in the figures, the heating regions 10 are geometrically arranged in the heater 3 so that different ones of the heating regions 10 are arranged to predominately and independently heat different regions of the smokeable material 5.

For example, referring to FIG. 2, the heater 3 may comprise a plurality of axially aligned heating regions 10. The regions 10 may each comprise an individual element of the heater 3. The heating regions 10 may, for example, all be aligned with each other along a longitudinal axis of the heater 3, thus providing a plurality of independent heating zones along the length of the heater 3. Each heating region 10 may comprise a heating cylinder 10 having a finite length which is significantly less than the length of the heater 3 as a whole. The arrangement and features of the cylinders 10 are discussed below in terms of heating disks, where each disk has a depth which is equivalent to cylinder length. The heating disks 10 are arranged with their radial surfaces facing one another along the length of the heater 3. The radial surfaces of each disk 10 may touch the radial surfaces of its neighboring disks 10. Alternatively, a heat insulating or heat reflecting layer may be present between the radial surfaces of the disks 10 so that thermal energy emitted from each one of the disks 10 does not substantially heat the neighboring disks 10 and instead travels predominately outwards from the circumferential surface of the disk 10 into the heating chamber 4 and smokeable material 5. Each disk 10 may have substantially the same dimensions as the other disks 10.

In this way, when a particular one of the heating regions 10 is activated, it supplies thermal energy to the smokeable material 5 located radially around the heating region 10 without substantially heating the remainder of the smokeable material 5. For example, referring to FIG. 2, the heated region of smokeable material 5 may comprise a ring of smokeable material 5 located around the heating disk 10 which has been activated. The smokeable material 5 can therefore be heated in independent sections, for example rings, where each section corresponds to smokeable material 5 located directly around a particular one of the heating regions 10 and has a mass and volume which is significantly less than the body of smokeable material 5 as a whole.

Figure 6:
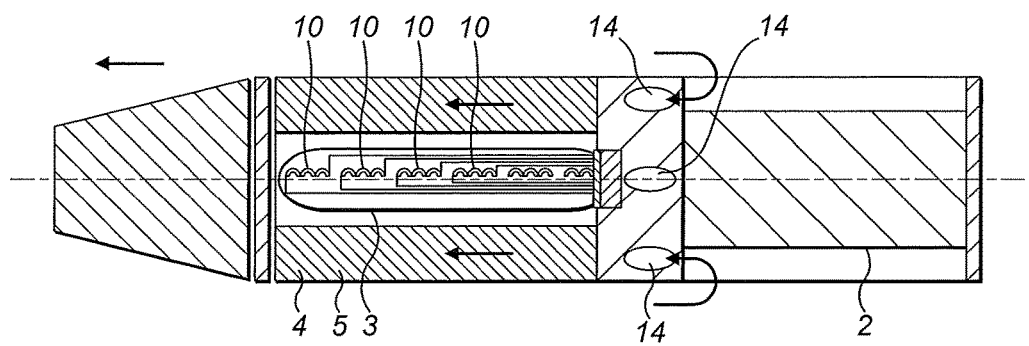
FIG. 6 is a schematic illustration of part of an apparatus configured to heat smokeable material, in which the smokeable material is provided around a plurality of longitudinal, elongate heating sections spaced around a central longitudinal axis.

Additionally or alternatively, referring to FIG. 6, the heater 3 may comprise a plurality of elongate, longitudinally extending heating regions 10 positioned at different locations around the central longitudinal axis of the heater 3. Although shown as being of different lengths in FIG. 6, the longitudinally extending heating regions 10 may be of substantially the same length so that each extends along substantially the whole length of the heater 3. Each heating region 10 may comprise, for example, an individual IR heating element 10 such as an IR heating filament 10. Optionally, a body of heat insulation or heat reflective material may be provided along the central longitudinal axis of the heater 3 so that thermal energy emitted by each heating region 10 travels predominately outwards from the heater 3 into the heating chamber 4 and thus heats the smokeable material 5. The distance between the central longitudinal axis of the heater 3 and each of the heating regions 10 may be substantially equal. The heating regions 10 may optionally be contained in a substantially infra-red and/or heat transparent tube, or other housing, which forms a longitudinal surface of the heater 3. The heating regions 10 may be fixed in position relative to the other heating regions 10 inside the tube.

In this way, when a particular one of the heating regions 10 is activated, it supplies thermal energy to the smokeable material 5 located adjacent to the heating region 10 without substantially heating the remainder of the smokeable material 5. The heated section of smokeable material 5 may comprise a longitudinal section of smokeable material 5 which lies parallel and directly adjacent to the longitudinal heating region 10. Therefore, as with the previous example, the smokeable material 5 can be heated in independent sections.

As will be described further below, the heating regions 10 can each be individually and selectively activated.

The smokeable material 5 may be comprised in a cartridge 11 which can be inserted into the heating chamber 4. For example, as shown in FIG. 1, the cartridge 11 can comprise a smokeable material tube 11 which can be inserted around the heater 3 so that the internal surface of the smokeable material tube 11 faces the longitudinal surface of the heater 3. The smokeable material tube 11 may be hollow. The diameter of the hollow center of the tube 11 may be substantially equal to, or slightly larger than, the diameter of the heater 3 so that the tube 11 is a close fit around the heater 3. The length of the cartridge 11 may be approximately equal to the length of the heater 3 so that the heater 3 can heat the cartridge 11 along its whole length.

Figure 9:
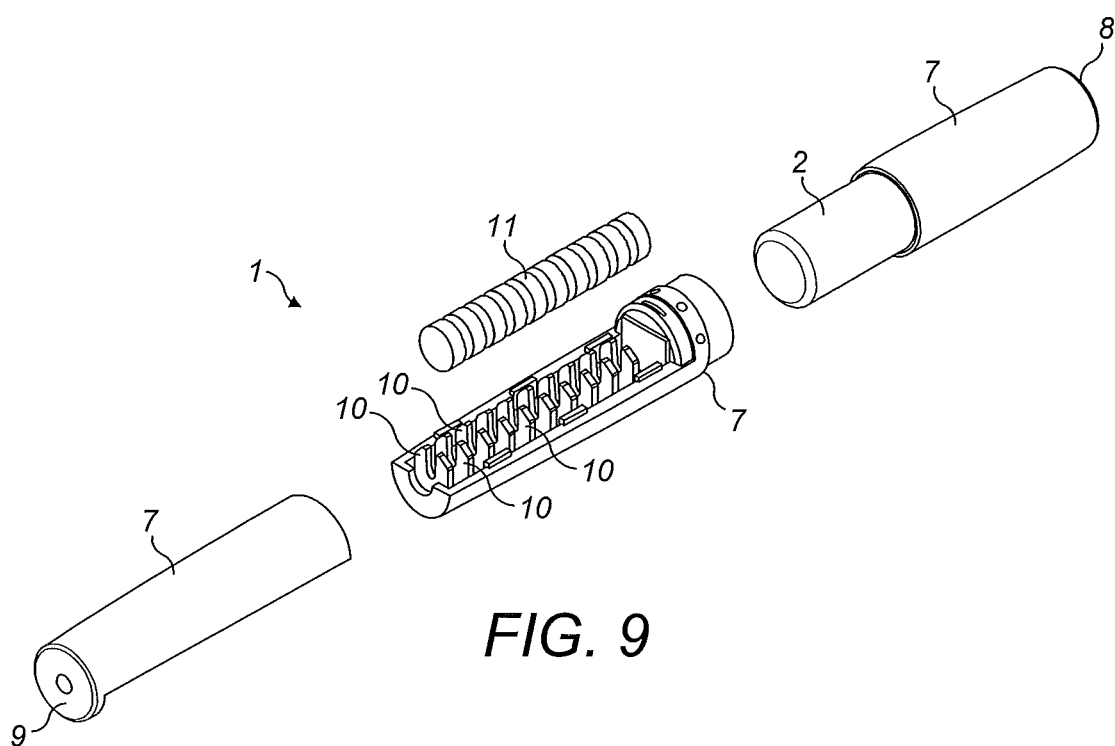
FIG. 9 is an exploded view of part of an apparatus configured to heat smokeable material, in which the regions of smokeable material are provided between pairs of upstanding heating plates.

The housing 7 of the apparatus 1 may comprise an opening through which the cartridge 11 can be inserted into the heating chamber 4. The opening may, for example, comprise a ring-shaped opening located at the housing's second end 9 so that the cartridge 11 can be slid into the opening and pushed directly into the heating chamber 4. The opening is preferably closed during use of the apparatus 1 to heat the smokeable material 5. Alternatively, a section of the housing 7 at the second end 9 is removable from the apparatus 1 so that the smokeable material 5 can be inserted into the heating chamber 4. An example of this is shown in FIG. 9. The apparatus 1 may optionally be equipped with a user-operable smokeable material ejection unit, such as an internal mechanism configured to slide used smokeable material 5 off and/or away from the heater 3. The used smokeable material 5 may, for example, be pushed back through the opening in the housing 7. A new cartridge 11 can then be inserted as required.

In an alternative configuration of heater 3, the heater 3 comprises a spirally shaped heater 3. The spirally shaped heater 3 may be configured to screw into the smokeable material cartridge 11 and may comprise adjacent, axially-aligned heating regions 10 so as to operate in substantially the same manner as described the linear, elongate heater 3 described above.

In an alternative configuration of heater 3 and heating chamber 4, the heater 3 comprises a substantially elongate tube, which may be cylindrical, and the heating chamber 4 is located inside the tube 3 rather than around the heater's outside. The heater 3 may comprise a plurality of axially-aligned heating sections, which may each comprise a heating ring configured to heat smokeable material 5 located radially inwardly from the ring. In this way, the heater 3 is configured to independently heat separate sections of smokeable material 5 in the heating chamber 4 in a manner similar to the heater 3 described above in relation to FIG. 2. The heat is applied radially inwardly to the smokeable material 5, rather than radially outwardly as previously described.

Figure 7:
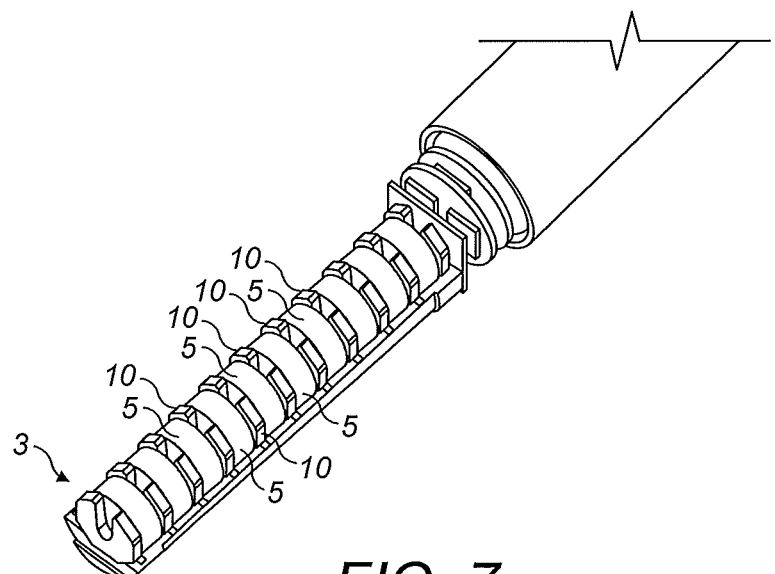
FIG. 7 is a perspective illustration of part of an apparatus configured to heat smokeable material, in which the regions of smokeable material are provided between pairs of upstanding heating plates.
Figure 8:
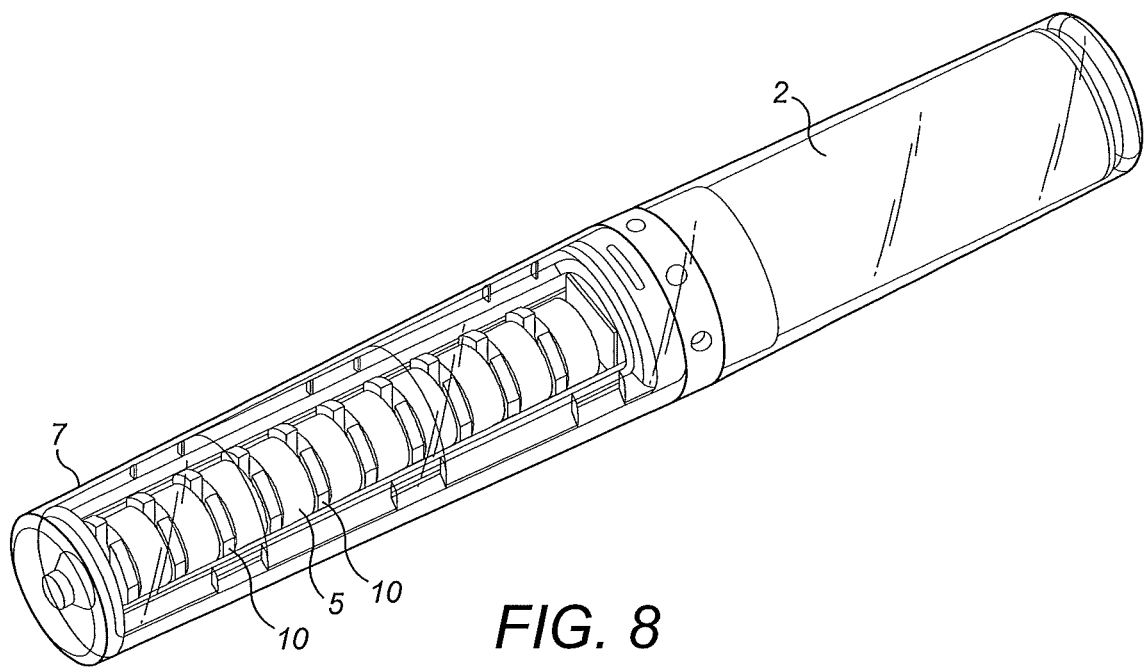
FIG. 8 is a perspective illustration of the apparatus shown in FIG. 7, in which an external housing is additionally illustrated.

Alternatively, referring to FIGS. 7, 8 and 9, a different geometrical configuration of heater 3 and smokeable material 5 can be used. More particularly, the heater 3 can comprise a plurality of heating regions 10 which extend directly into an elongate heating chamber 4 which is divided into sections by the heating regions 10. During use, the heating regions 10 extend directly into an elongate smokeable material cartridge 11 or other substantially solid body of smokeable material 5. The smokeable material 5 in the heating chamber 4 is thereby divided into discrete sections separated from each other by the spaced-apart heating regions 10. The heater 3, heating chamber 4 and smokeable material 5 may extend together along a central, longitudinal axis of the housing 7. As shown in FIGS. 7 and 9, the heating regions 10 may each comprise a projection 10, such as an upstanding heating plate 10, which extends into the body of smokeable material 5. The projections 10 are discussed below in the context of heating plates 10. The principal plane of the heating plates 10 may be substantially perpendicular to the principal longitudinal axis of the body of smokeable material 5 and heating chamber 4 and/or housing 7. The heating plates 10 may be parallel to one another, as shown in FIGS. 7 and 9. Each section of smokeable material 5 is bounded by a main heating surface of a pair of heating plates 10 located either side of the smokeable material section, so that activation of one or both of the heating plates 10 will cause thermal energy to be transferred directly into the smokeable material 5. The heating surfaces may be embossed to increase the surface area of the heating plate 10 against the smokeable material 5. Optionally, each heating plate 10 may comprise a thermally reflective layer which divides the plate 10 into two halves along its principal plane. Each half of the plate 10 can thus constitute a separate heating region 10 and may be independently activated to heat only the section of smokeable material 5 which lies directly against that half of the plate 10, rather than the smokeable material 5 on both sides of the plate 10. Adjacent plates 10, or facing portions thereof, may be activated to heat a section of smokeable material 5, which is located between the adjacent plates, from substantially opposite sides of the section of smokeable material 5.

The elongate smokeable material cartridge or body 11 can be installed between, and removed from, the heating chamber 4 and heating plates 10 by removing a section of the housing 7 at the housing's second end 9, as previously described. The heating regions 10 can be individually and selectively activated to heat different sections of the smokeable material 5 as required.

In this way, when a particular one or pair of the heating regions 10 is activated, it supplies thermal energy to the smokeable material 5 located directly adjacent to the heating region(s) 10 without substantially heating the remainder of the smokeable material 5. The heated section of smokeable material 5 may comprise a radial section of smokeable material 5 located between the heating regions 10, as shown in FIGS. 7 to 9.

The apparatus 1 may comprise a controller 12, such as a microcontroller 12, which is configured to control operation of the apparatus 1. The controller 12 is electronically connected to the other components of the apparatus 1 such as the energy source 2 and heater 3 so that it can control their operation by sending and receiving signals. The controller 12 is, in particular, configured to control activation of the heater 3 to heat the smokeable material 5. For example, the controller 12 may be configured to activate the heater 3, which may comprise selectively activating one or more heating regions 10, in response to a user drawing on the mouthpiece 6 of the apparatus 1. In this regard, the controller 12 may be in communication with a puff sensor 13 via a suitable communicative coupling. The puff sensor 13 is configured to detect when a puff occurs at the mouthpiece 6 and, in response, is configured to send a signal to the controller 12 indicative of the puff. An electronic signal may be used. The controller 12 may respond to the signal from the puff sensor 13 by activating the heater 3 and thereby heating the smokeable material 5. The use of a puff sensor 13 to activate the heater 3 is not, however, essential and other means for providing a stimulus to activate the heater 3 can alternatively be used. The volatilized compounds released during heating can then be inhaled by the user through the mouthpiece 6. The controller 12 can be located at any suitable position within the housing 7. An example position is between the energy source 2 and the heater 3/heating chamber 4, as illustrated in FIG. 3.

If the heater 3 comprises two or more heating regions 10 as described above, the controller 12 may be configured to activate the heating regions 10 in a predetermined order or pattern. For example, the controller 12 may be configured to activate the heating regions 10 sequentially along or around the heating chamber 4. Each activation of a heating region 10 may be in response to detection of a puff by the puff sensor 13 or may be triggered in an alternative way, as described further below.

Figure 10:
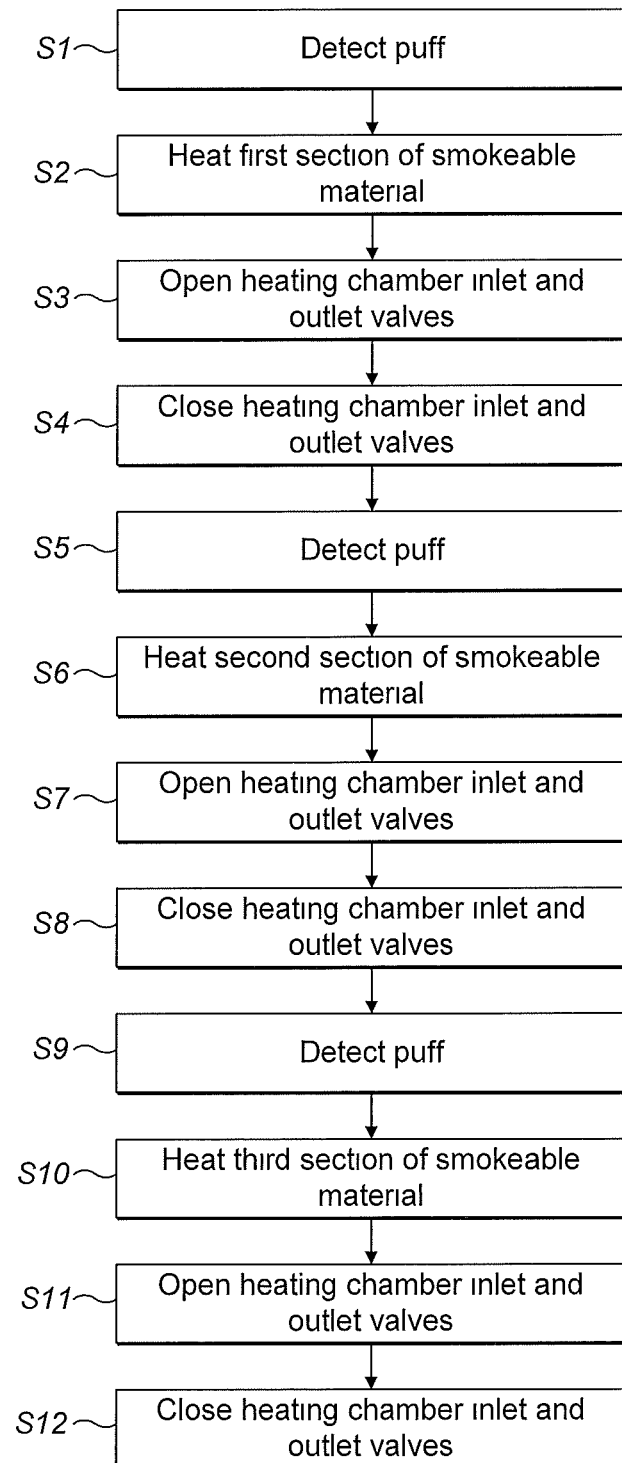
FIG. 10 is a flow diagram showing a method of activating heating regions and opening and closing heating chamber valves during puffing.

Referring to FIG. 10, an example heating method may comprise a first step S1 in which a first puff is detected followed by a second step S2 in which a first section of smokeable material 5 is heated in response to the first puff. In a third step S3, hermetically sealable inlet and outlet valves 24 may be opened to allow air to be drawn through the heating chamber 4 and out of the apparatus 1 through the mouthpiece 6. In a fourth step, the valves 24 are closed. These valves 24 are described in more detail below with respect to FIG. 20. In fifth S5, sixth S6, seventh S7 and eighth S8 steps, a second section of smokeable material 5 may be heated in response to a second puff, with a corresponding opening and closing of the heating chamber inlet and outlet valves 24. In ninth S9, tenth S10, eleventh S11 and twelfth S12 steps, a third section of the smokeable material 5 may be heated in response to a third puff with a corresponding opening and closing of the heating chamber inlet and outlet valves 24, and so on. Means other than a puff sensor 13 could alternatively be used. For example, a user of the apparatus 1 may actuate a control switch to indicate that he/she is taking a new puff. In this way, a fresh section of smokeable material 5 may be heated to volatilize nicotine and aromatic compounds for each new puff. The number of heating regions 10 and/or independently heatable sections of smokeable material 5 may correspond to the number of puffs for which the cartridge 11 is intended to be used. Alternatively, each independently heatable smokeable material section 5 may be heated by its corresponding heating region(s) 10 for a plurality of puffs such as two, three or four puffs, so that a fresh section of smokeable material 5 is heated only after a plurality of puffs have been taken whilst heating the previous smokeable material section.

Instead of activating each heating region 10 in response to an individual puff, the heating regions 10 may alternatively be activated sequentially, one after the other, in response to a single, initial puff at the mouthpiece 6. For example, the heating regions 10 may be activated at regular, predetermined intervals over the expected inhalation period for a particular smokeable material cartridge 11. The inhalation period may, for example, be between approximately one and approximately four minutes. Therefore, at least the fifth and ninth steps S5, S9 shown in FIG. 10 are optional. Each heating region 10 may be activated for a predetermined period corresponding to the duration of the single or plurality of puffs for which the corresponding independently heatable smokeable material section 5 is intended to be heated. Once all of the heating regions 10 have been activated for a particular cartridge 11, the controller 12 may be configured to indicate to the user that the cartridge 11 should be changed. The controller 12 may, for example, activate an indicator light at the external surface of the housing 7.

It will be appreciated that activating individual heating regions 10 in order rather than activating the entire heater 3 means that the energy required to heat the smokeable material 5 is reduced over what would be required if the heater 3 were activated fully over the entire inhalation period of a cartridge 11. Therefore, the maximum required power output of the energy source 2 is also reduced. This means that a smaller and lighter energy source 2 can be installed in the apparatus 1.

Figure 12:
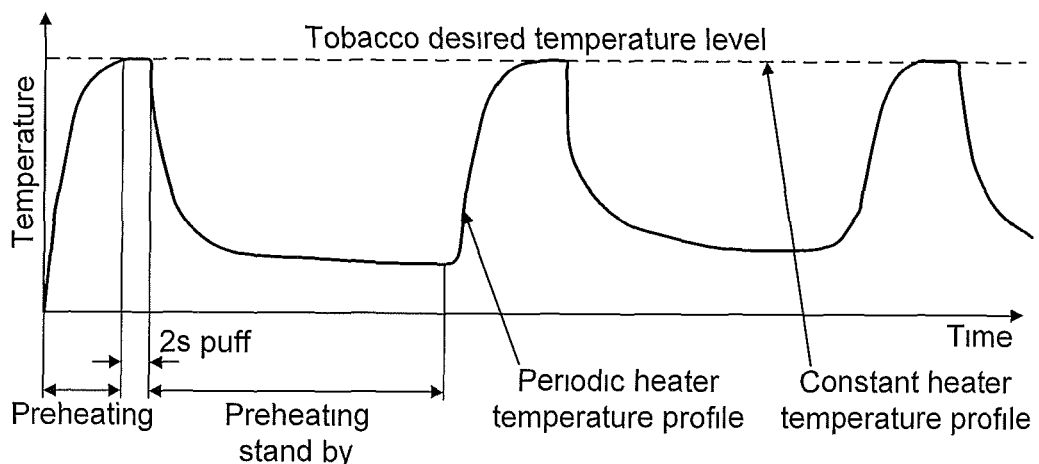
FIG. 12 is a graphical illustration of a heating pattern which can be used to heat smokeable material using a heater.

The controller 12 may be configured to de-activate the heater 3, or reduce the power being supplied to the heater 3, in between puffs. This saves energy and extends the life of the energy source 2. For example, upon the apparatus 1 being switched on by a user or in response to some other stimulus, such as detection of a user placing their mouth against the mouthpiece 6, the controller 12 may be configured to cause the heater 3, or next heating region 10 to be used to heat the smokeable material 5, to be partially activated so that it heats up in preparation to volatilize components of the smokeable material 5. The partial activation does not heat the smokeable material 5 to a sufficient temperature to volatilize nicotine. A suitable temperature could be below 120° C., such as 100° C. or below. An example is a temperature between 60° C. and 100° C., such as a temperature between 80° C. and 100° C. The temperature may be less than 100° C. In response to detection of a puff by the puff sensor 13, the controller 12 can then cause the heater 3 or heating region 10 in question to heat the smokeable material 5 further in order to rapidly volatilize the nicotine and other aromatic compounds for inhalation by the user. If the smokeable material 5 comprises tobacco, a suitable temperature for volatilizing the nicotine and other aromatic compounds may be 100° C. or above, such as 120° C. or above. An example is a temperature between 100° C. and 250° C., such as between 100° C. and 220° C., between 100° C. and 200° C., between 150° C. and 250° C. or between 130° C. and 180° C. The temperature may be more than 100° C. An example full activation temperature is 150° C., although other values such as 250° C. are also possible. A super-capacitor can optionally be used to provide the peak current used to heat the smokeable material 5 to the volatization temperature. An example of a suitable heating pattern is shown in FIG. 12, in which the peaks may respectively represent the full activation of different heating regions 10. As can be seen, the smokeable material 5 is maintained at the volatization temperature for the approximate period of the puff which, in this example, is two seconds.

Three example operational modes of the heater 3 are described below.

In a first operational mode, during full activation of a particular heating region 10, all other heating regions 10 of the heater are deactivated. Therefore, when a new heating region 10 is activated, the previous heating region is deactivated. Power is supplied only to the activated region 10.

Alternatively, in a second operational mode, during full activation of a particular heating region 10, one or more of the other heating regions 10 may be partially activated. Partial activation of the one or more other heating regions 10 may comprise heating the other heating region(s) 10 to a temperature which is sufficient to substantially prevent condensation of components such as nicotine volatized from the smokeable material 5 in the heating chamber 4. The temperature of the heating regions 10 which are partially activated is less than the temperature of the heating region 10 which is fully activated. The smokeable material 10 located adjacent the partially activated regions 10 is not heated to a temperature sufficient to volatize components of the smokeable material 5.

Alternatively, in a third operational mode, once a particular heating region 10 has been activated, it remains fully activated until the heater 3 is switched off. Therefore, the power supplied to the heater 3 incrementally increases as more of the heating regions 10 are activated during inhalation from the cartridge 11. As with the second mode previously described, the continuing activation of the heating regions 10 substantially prevent condensation of components such as nicotine volatized from the smokeable material 5 in the heating chamber 4.

Figure 19:
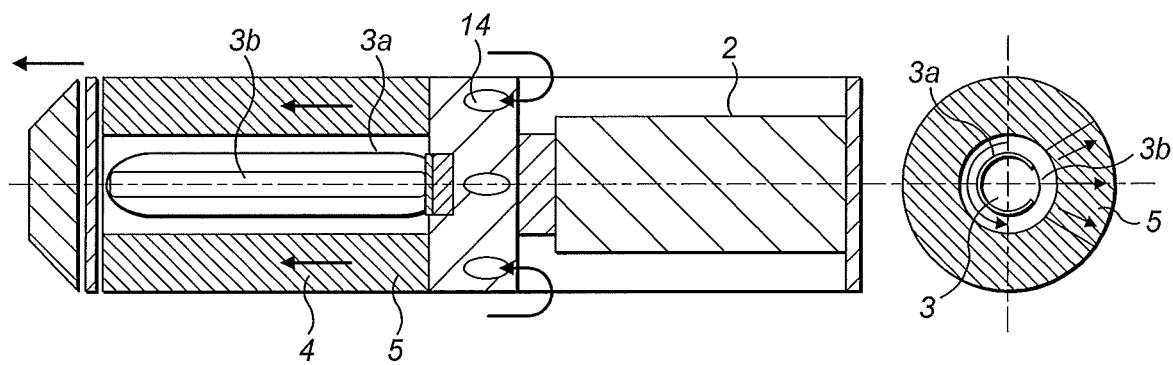
FIG. 19 is a schematic, cross-sectional illustration of a heat shield and a heat-transparent window which are movable relative to a body of smokeable material to selectively allow thermal energy to be transmitted to different sections of the smokeable material through the window.

The apparatus 1 may comprise a heat shield 3a, which is located between the heater 3 and the heating chamber 4/smokeable material 5. The heat shield 3a is configured to substantially prevent thermal energy from flowing through the heat shield 3a and therefore can be used to selectively prevent the smokeable material 5 from being heated even when the heater 3 is activated and emitting thermal energy. Referring to FIG. 19, the heat shield 3a may, for example, comprise a cylindrical layer of heat reflective material which is located co-axially around the heater 3. Alternatively, if the heater 3 is located around the heating chamber 4 and smokeable material 5 as previously described, the heat shield 3a may comprise a cylindrical layer of heat reflective material which is located co-axially around the heating chamber 4 and co-axially inside of the heater 3. The heat shield 3a may additionally or alternatively comprise a heat-insulating layer configured to insulate the heater 3 from the smokeable material 5. The heat shield 3a comprises a substantially heat-transparent window 3b which allows thermal energy to propagate through the window 3b and into the heating chamber 4 and smokeable material 5. Therefore, the section of smokeable material 5 which is aligned with the window 3b is heated whilst the remainder of the smokeable material 5 is not. The heat shield 3a and window 3b may be rotatable or otherwise movable with respect to the smokeable material 5 so that different sections of the smokeable material 5 can be selectively and individually heated by rotating or moving the heat shield 3a and window 3b. The effect is similar to the effect provided by selectively and individually activating the heating regions 10 referred to above. For example, the heat shield 3a and window 3b may be rotated or otherwise moved incrementally in response to a signal from the puff detector 13. Additionally or alternatively, the heat shield 3a and window 3b may be rotated or otherwise moved incrementally in response to a predetermined heating period having elapsed. Movement or rotation of the heat shield 3a and window 3b may be controlled by electronic signals from the controller 12. The relative rotation or other movement of the heat shield 3a/window 3b and smokeable material 5 may be driven by a stepper motor 3c under the control of the controller 12. This is illustrated in FIG. 19. Alternatively, the heat shield 3*a* and window 3*b* may be manually rotated using a user control such as an actuator on the housing 7. The heat shield 3*a* does not need to be cylindrical and may comprise optionally comprise one or more suitably positioned longitudinally extending elements and or/plates.

It will be appreciated that a similar result can be obtained by rotating or moving the smokeable material 5 relative to the heater 3, heat shield 3*a* and window 3*b*. For example, the heating chamber 4 may be rotatable around the heater 3. If this is the case, the above description relating to movement of the heat shield 3*a* can be applied instead to movement of the heating chamber 4 relative to the heat shield 3*a*.

The heat shield 3*a* may comprise a coating on the longitudinal surface of the heater 3. In this case, an area of the heater's surface is left uncoated to form the heat-transparent window 3*b*. The heater 3 can be rotated or otherwise moved, for example under the control of the controller 12 or user controls, to cause different sections of the smokeable material 5 to be heated. Alternatively, the heat shield 3*a* and window 3*b* may comprise a separate shield 3*a* which is rotatable or otherwise movable relative to both the heater 3 and the smokeable material 5 under the control of the controller 12 or other user controls.

Figure 11:
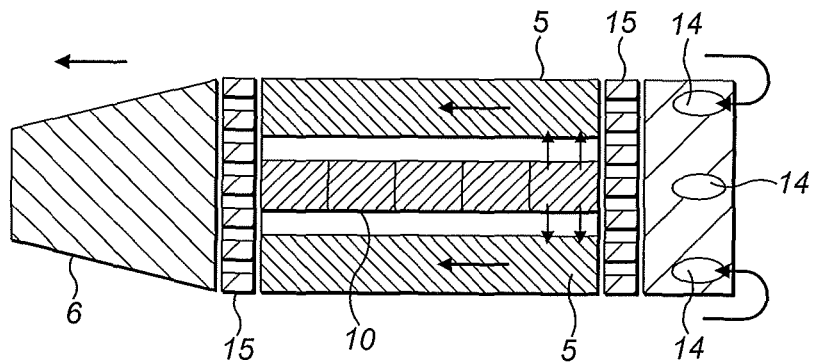
FIG. 11 is a schematic illustration of a gaseous flow through an apparatus configured to heat smokeable material.

Referring to FIG. 6, the apparatus 1 may comprise air inlets 14 which allow external air to be drawn into the housing 7 and through the heated smokeable material 5 during puffing. The air inlets 14 may comprise apertures 14 in the housing 7 and may be located upstream from the smokeable material 5 and heating chamber 4 towards the first end 8 of the housing 7. This is shown in FIG. 1. Another example is shown in FIG. 11. Air drawn in through the inlets 14 travels through the heated smokeable material 5 and therein is enriched with smokeable material vapors, such as aroma vapors, before being inhaled by the user at the mouthpiece 6. Optionally, as shown in FIG. 11, the apparatus 1 may comprise a heat exchanger 15 configured to warm the air before it enters the smokeable material 5 and/or to cool the air before it is drawn through the mouthpiece 6. For example, the heat exchanger 15 may be configured to use heat extracted from the air entering the mouthpiece 6 to warm new air before it enters the smokeable material 5.

The apparatus 1 may comprise a smokeable material compressor 16 configured to cause the smokeable material 5 to compress upon activation of the compressor 16. The apparatus 1 can also comprise a smokeable material expander 17 configured to cause the smokeable material 5 to expand upon activation of the expander 17. The compressor 16 and expander 17 may, in practice, be implemented as the same unit as will be explained below. The smokeable material compressor 16 and expander 17 may optionally operate under the control of the controller 12. In this case, the controller 12 is configured to send a signal, such as an electrical signal, to the compressor 16 or expander 17 which causes the compressor 16 or expander 17 to respectively compress or expand the smokeable material 5. Alternatively, the compressor 16 and expander 17 may be actuated by a user of the apparatus 1 using a manual control on the housing 7 to compress or expand the smokeable material 5 as required.

The compressor 16 is principally configured to compress the smokeable material 5 and thereby increase its density during heating. Compression of the smokeable material increases the thermal conductivity of the body of smokeable material 5 and therefore provides a more rapid heating and consequent rapid volatization of nicotine and other aromatic compounds. This is preferable because it allows the nicotine and aromatics to be inhaled by the user without substantial delay in response to detection of a puff. Therefore, the controller 12 may activate the compressor 16 to compress the smokeable material 5 for predetermined heating period, for example one second, in response to detection of a puff. The compressor 16 may be configured to reduce its compression of the smokeable material 5, for example under the control of the controller 12, after the predetermined heating period. Alternatively, the compression may be reduced or automatically ended in response to the smokeable material 5 reaching a predetermined threshold temperature. A suitable threshold temperature may be in the range of approximately 100° C. to 250° C., such as between 100° C. and 220° C., between 150° C. and 250° C., between 100° C. and 200° C. or between 130° C. and 180° C. The threshold temperature may be above 100° C., such as a value above 120° C., and may be user selectable. A temperature sensor may be used to detect the temperature of the smokeable material 5.

The expander 17 is principally configured to expand the smokeable material 5 and thereby decrease its density during puffing. The arrangement of smokeable material 5 in the heating chamber 4 becomes looser when the smokeable material 5 has been expanded and this aids the gaseous flow, for example air from the inlets 14, through the smokeable material 5. The air is therefore more able to carry the volatilized nicotine and aromatics to the mouthpiece 6 for inhalation. The controller 12 may activate the expander 17 to expand the smokeable material 5 immediately following the compression period referred to above so that air can be drawn more freely through the smokeable material 5. Actuation of the expander 17 may be accompanied by a user-audible sound or other indication to indicate to the user that the smokeable material 5 has been heated and that puffing can commence.

Figure 13:
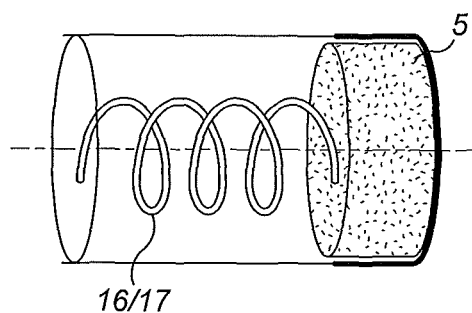
FIG. 13 is a schematic illustration of a smokeable material compressor configured to compress smokeable material during heating.
Figure 14:
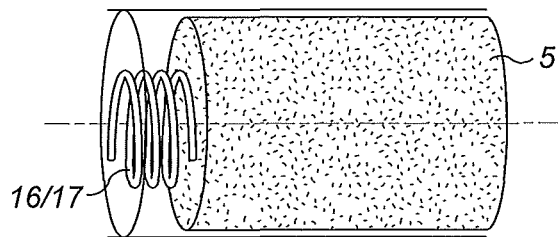
FIG. 14 is a schematic illustration of a smokeable material expander configured to expand smokeable material during puffing.
Figure 15:
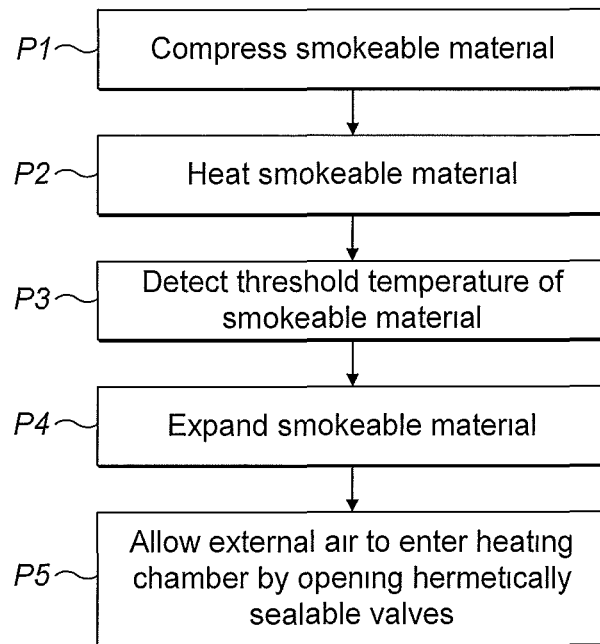
FIG. 15 is a flow diagram showing a method of compressing smokeable material during heating and expanding the smokeable material for puffing.

Referring to FIGS. 13 and 14, the compressor 16 and expander 17 may comprise a spring-actuated driving rod which is configured to compress the smokeable material 5 in the heating chamber 4 when the spring is released from compression. This is schematically illustrated in FIGS. 13 and 14, although it will be appreciated that other implementations could be used. For example, the compressor 16 may comprise a ring, having a thickness approximately equal to the tubular-shaped heating chamber 4 described above, which is driven by a spring or other means into the heating chamber 4 to compress the smokeable material 5. Alternatively, the compressor 16 may be comprised as part of the heater 3 so that the heater 3 itself is configured to compress and expand the smokeable material 5 under the control of the controller 12. For example, where the heater 3 comprises upstanding heating plates 10 of the type previously described, the plates 10 may be independently movable in a longitudinal direction of the heater 3 to expand or compress the sections of smokeable material 5 which are located adjacent to them. A method of compressing and expanding the smokeable material 5 is shown in FIG. 15.

Thermal insulation 18 may be provided between the smokeable material 5 and an external surface 19 of the housing 7 to reduce heat loss from the apparatus 1 and therefore improve the efficiency with which the smokeable material 5 is heated. For example, referring to FIG. 1, a wall of the housing 7 may comprise a layer of insulation 18 which extends around the outside of the heating chamber 4. The insulation layer 18 may comprise a substantially tubular length of insulation 18 located co-axially around the heating chamber 4 and smokeable material 5. This is shown in FIG. 1. It will be appreciated that the insulation 18 could also be comprised as part of the smokeable material cartridge 11, in which it would be located co-axially around the outside of the smokeable material 5.

Figure 16:
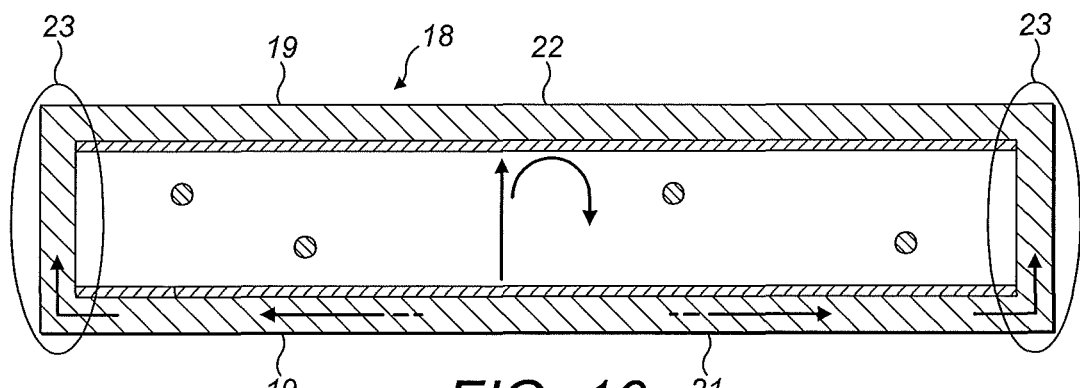
FIG. 16 is a schematic, cross-sectional illustration of a section of vacuum insulation configured to insulate heated smokeable material from heat loss.

Referring to FIG. 16, the insulation 18 may comprise vacuum insulation 18. For example, the insulation 18 may comprise a layer which is bounded by a wall material 19 such as a metallic material. An internal region or core 20 of the insulation 18 may comprise an open-cell porous material, for example comprising polymers, aerogels or other suitable material, which is evacuated to a low pressure. The pressure in the internal region 20 may be in the range of 0.1 to 0.001 mbar. The wall 19 of the insulation 18 is sufficiently strong to withstand the force exerted against it due to the pressure differential between the core 20 and external surfaces of the wall 19, thereby preventing the insulation 18 from collapsing. The wall 19 may, for example, comprise a stainless steel wall 19 having a thickness of approximately 100 μm. The thermal conductivity of the insulation 18 may be in the range of 0.004 to 0.005 W/mK. The heat transfer coefficient of the insulation 18 may be between approximately 1.10 W/(m²K) and approximately 1.40 W/(m²K) within a temperature range of between 100° C. and 250° C., such as between approximately 150 degrees Celsius and approximately 250 degrees Celsius. The gaseous conductivity of the insulation 18 is negligible. A reflective coating may be applied to the internal surfaces of the wall material 19 to minimize heat losses due to radiation propagating through the insulation 18. The coating may, for example, comprise an aluminum IR reflective coating having a thickness of between approximately 0.3 μm and 1.0 μm. The evacuated state of the internal core region 20 means that the insulation 18 functions even when the thickness of the core region 20 is very small. The insulating properties are substantially unaffected by its thickness. This helps to reduce the overall size of the apparatus 1.

As shown in FIG. 16, the wall 19 may comprise an inwardly-facing section 21 and an outwardly-facing section 22. The inwardly-facing section 21 substantially faces the smokeable material 5 and heating chamber 4. The outwardly-facing section 22 substantially faces the exterior of the housing 7. During operation of the apparatus 1, the inwardly-facing section 21 may be warmer due to the thermal energy originating from the heater 3, whilst the outwardly-facing section 22 is cooler due to the effect of the insulation 18. The inwardly-facing section 21 and the outwardly-facing section 22 may, for example, comprise substantially parallel longitudinally-extending walls 19 which are at least as long as the heater 3. The internal surface of the outwardly-facing wall section 22, i.e. the surface facing the evacuated core region 20, may comprise a coating for absorbing gas in the core 20. A suitable coating is a titanium oxide film.

Figure 17:
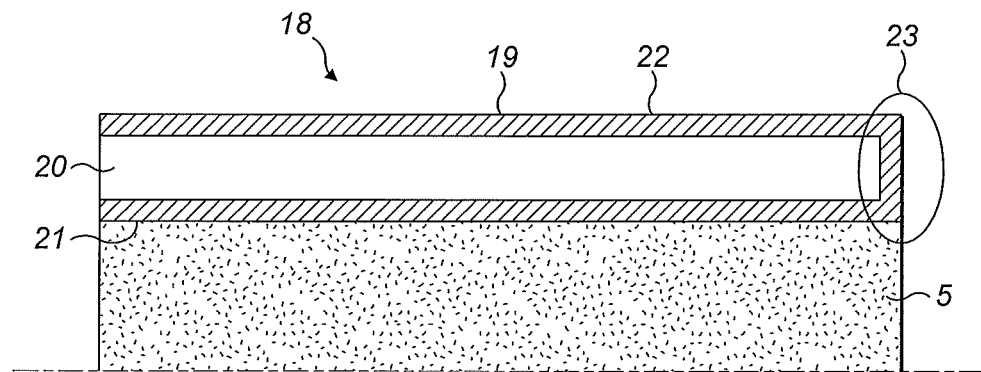
FIG. 17 is another schematic, cross-sectional illustration of a section of vacuum insulation configured to insulate heated smokeable material from heat loss.

Referring to the schematic illustration in FIG. 17, a thermal bridge 23 may connect the inwardly-facing wall section 21 to the outwardly-facing wall section 22 at the edges of the insulation 18 in order to completely encompass and contain the low pressure core 20. The thermal bridge 23 may comprise a wall 19 formed of the same material as the inwardly and outwardly-facing sections 21, 22. A suitable material is stainless steel, as previously discussed. The thermal bridge 23 has a greater thermal conductivity than the insulating core 20 and therefore may undesirably conduct heat out of the apparatus 1 and, in doing so, reduce the efficiency with which the smokeable material 5 is heated.

Figure 18:
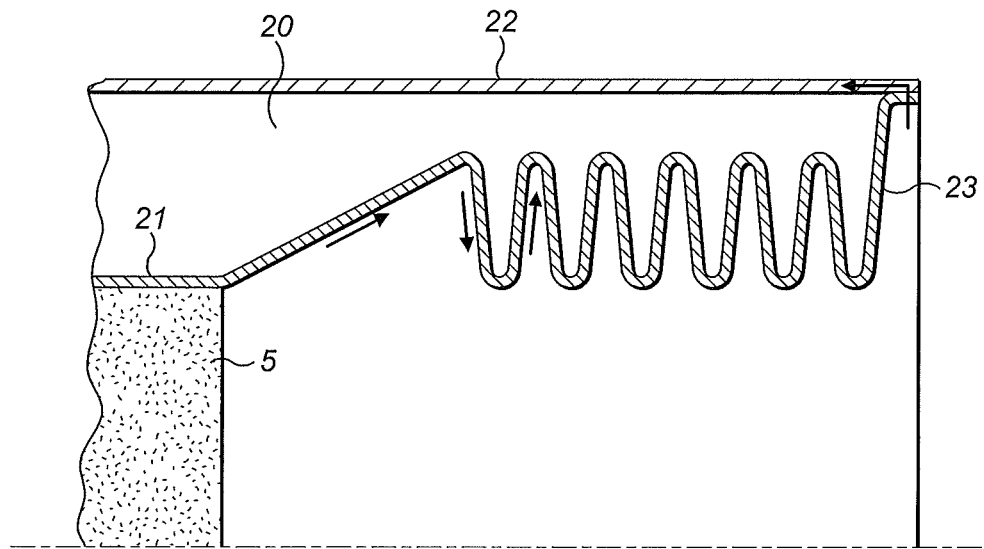
FIG. 18 is a schematic, cross-sectional illustration of a heat resistive thermal bridge which follows an indirect path from a higher temperature insulation wall to a lower temperature insulation wall.

To reduce heat losses due to the thermal bridge 23, the thermal bridge 23 may be extended to increase its resistance to heat flow from the inwardly-facing section 21 to the outwardly-facing section 22. This is schematically illustrated in FIG. 18. For example, the thermal bridge 23 may follow an indirect path between the inwardly-facing section 21 of wall 19 and the outwardly-facing section 22 of wall 19. This may be facilitated by providing the insulation 18 over a longitudinal distance which is longer than the lengths of the heater 3, heating chamber 4 and smokeable material 5 so that the thermal bridge 23 can gradually extend from the inwardly-facing section 21 to the outwardly-facing section 22 along the indirect path, thereby reducing the thickness of the core 20 to zero, at a longitudinal location in the housing 7 where the heater 3, heating chamber 4 and smokeable material 5 are not present.

Figure 20:
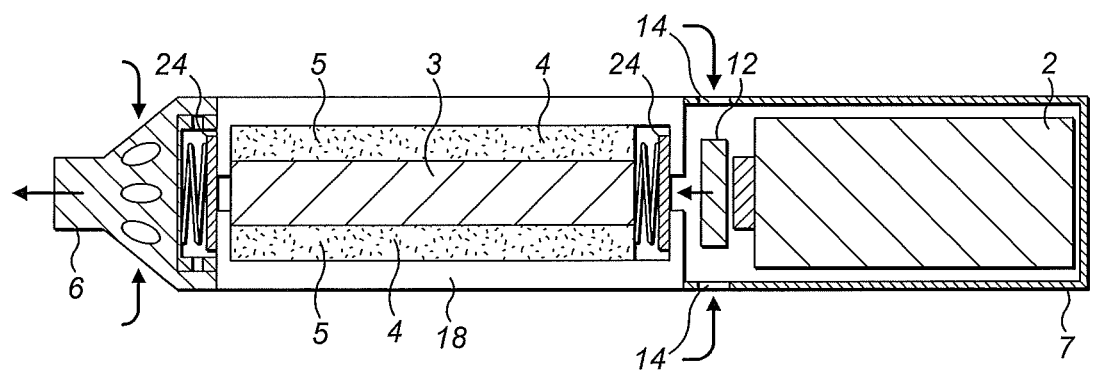
FIG. 20 is schematic, cross sectional illustration of part of an apparatus configured to heat smokeable material, in which a heating chamber is hermetically sealable by check valves.

Referring to FIG. 20, as previously discussed, the heating chamber 4 insulated by the insulation 18 may comprise inlet and outlet valves 24 which hermetically seal the heating chamber 4 when closed. The valves 24 can thereby prevent air from undesirably entering and exiting the chamber 4 and can prevent smokeable material flavors from exiting the chamber 4. The inlet and outlet values 24 may, for example, be provided in the insulation 18. For example, between puffs, the valves 24 may be closed by the controller 12 so that all volatilized substances remain contained inside the chamber 4 in-between puffs. The partial pressure of the volatized substances between puffs reaches the saturated vapor pressure and the amount of evaporated substances therefore depends only on the temperature in the heating chamber 4. This helps to ensure that the delivery of volatilized nicotine and aromatic compounds remains constant from puff to puff. During puffing, the controller 12 is configured to open the valves 24 so that air can flow through the chamber 4 to carry volatilized smokeable material components to the mouthpiece 6. A membrane can be located in the valves 24 to ensure that no oxygen enters the chamber 4. The valves 24 may be breath-actuated so that the valves 24 open in response to detection of a puff at the mouthpiece 6. The valves 24 may close in response to a detection that a puff has ended. Alternatively, the valves 24 may close following the elapse of a predetermined period after their opening. The predetermined period may be timed by the controller 12. Optionally, a mechanical or other suitable opening/closing means may be present so that the valves 24 open and close automatically. For example, the gaseous movement caused by a user puffing on the mouthpiece 6 may be used to open and close the valves 24. Therefore, the use of the controller 12 is not necessarily required to actuate the valves 24.

The mass of the smokeable material 5 which is heated by the heater 3, for example by each heating region 10, may be in the range of 0.2 to 1.0 g. The temperature to which the smokeable material 5 is heated may be user controllable, for example to any temperature within the temperature range of 100° C. to 250° C., such as any temperature within the range of 150° C. to 250° C. and the other volatizing temperature ranges previously described. The mass of the apparatus 1 as a whole may be in the range of 70 to 125 g. A battery 2 with a capacity of 1000 to 3000 mAh and voltage of 3.7V can be used. The heating regions 10 may be configured to individually and selectively heat between approximately 10 and 40 sections of smokeable material 5 for a single cartridge 11.

It will be appreciated that any of the alternatives described above can be used singly or in combination. For example, as discussed above, the heater 3 may be located around the outside of the smokeable material 5 rather than the smokeable material 5 being located around the heater 3. The heater 3 may therefore circumscribe the smokeable material 5 to apply heat to the smokeable material 5 in a substantially radially inward direction.

The invention claimed is:

1. An apparatus comprising:
a smokable material heating chamber; and
a smokable material, wherein the smokable material is comprised in a cartridge comprising a smokable material tube received within the smokable material heating chamber,
the smokable material tube arranged around a smokable material heater so that smokable material is located outwardly of a longitudinal external surface of the heater,
wherein the smokable material heater comprises a plurality of axially-aligned heating regions arranged in a substantially elongate arrangement along a longitudinal axis of the smokable material heater and adjacent to smokable material, and
wherein the length of the cartridge is approximately equal to the length of the heater so that the heater can heat the cartridge along its whole length.

2. The apparatus according to claim 1, further comprising a microcontroller configured to control activation of the heater to heat the smokable material, wherein the microcontroller is communicatively coupled to a puff sensor.

3. The apparatus according to claim 1, wherein the heating regions are operable independently of one another so that different regions can be activated at different times to heat the smokable material.

4. The apparatus according to claim 1, wherein thermal insulation is present between adjacent heating regions.

5. The apparatus according to claim 1, wherein the heating regions comprise solid disks and/or wherein the heating regions comprise hollow rings.

6. The apparatus according to claim 1, comprising a housing, wherein the housing of the apparatus comprises an opening through which the cartridge can be inserted into the heating chamber, wherein the cartridge can be slid into the opening and pushed directly into the heating chamber.

7. The apparatus according to claim 6, wherein the diameter of the housing is less than 18 mm.

8. The apparatus according to claim 6, comprising an energy source, and wherein the housing comprises an approximately cylindrical tube with the energy source located towards its first end (8), with the smokable material, the heater and heating chamber located towards its opposite, second end.

9. The apparatus according to claim 6, wherein the apparatus comprises air inlets (14) which allow external air to be drawn into the housing and through the heated smokable material during puffing.

10. The apparatus according to claim 1, wherein a mouthpiece is provided through which a user of the apparatus can inhale volatised compounds during use of the apparatus.

11. The apparatus according to claim 1, wherein the smokable material heater is configured to heat a first region of the smokable material to a first temperature sufficient to volatize a component of the smokable material and to concurrently heat a second region of the smokable material to a temperature lower than said first temperature but which is sufficient to prevent condensation of the volatized component of the smokable material.

12. The apparatus according to claim 11, wherein the volatizing temperature is 100 degrees Celsius or higher, or 120 degrees Celsius or higher, or between 150 degrees Celsius and 250 degrees Celsius.

13. The apparatus according to claim 11, wherein the lower temperature is less than 120 degrees Celsius, or less than 100 degrees Celsius.

14. The apparatus according to claim 11, wherein the smokable material includes one or more of tobacco, tobacco derivatives, expanded tobacco, reconstituted tobacco or tobacco substitutes.

15. The apparatus according to claim 11, wherein the heater is arranged to heat the smokable material to volatise aromatic compounds and nicotine in the smokable material, without burning the smokable material.

16. An apparatus comprising:
a smokable material heater;
a smokable material heating chamber configured to receive smokable material so that the smokable material can be heated in the heating chamber; and
a smokable material,
wherein the smokable material is comprised in a cartridge inserted into the heating chamber, wherein the cartridge comprises a smokable material tube arranged around the heater so that the internal surface of the smokable material tube faces the longitudinal surface of the heater, and
wherein the smokable material heater comprises a plurality of axially-aligned heating regions arranged in a substantially elongate arrangement along a longitudinal axis of the smokable material heater and adjacent to smokable material, wherein the heating regions comprise solid disks, and wherein the length of the cartridge is approximately equal to the length of the heater so that the heater can heat the cartridge along its whole length.

17. The apparatus according to claim 16, further comprising a microcontroller configured to control activation of the heater to heat the smokable material, wherein the microcontroller is communicatively coupled to a puff sensor.

18. The apparatus according to claim 16, wherein the heating regions are operable independently of one another so that different regions can be activated at different times to heat the smokable material.

19. The apparatus according to claim 16, wherein thermal insulation is present between adjacent heating regions.

20. The apparatus according to claim 16, comprising a housing, wherein the housing of the apparatus comprises an opening through which the cartridge can be inserted into the heating chamber, wherein the cartridge can be slid into the opening and pushed directly into the heating chamber.

* * * * *